United States Patent
Nakayama et al.

(10) Patent No.: US 9,726,932 B2
(45) Date of Patent: *Aug. 8, 2017

(54) OPTICAL FILM, OPTICAL COMPENSATION FILM, POLARIZING PLATE AND LIQUID CRYSTAL DISPLAY

(71) Applicant: FUJIFILM Corporation, Minato-ku, Tokyo (JP)

(72) Inventors: Hajime Nakayama, Minami-Ashigara (JP); Hirofumi Toyama, Minami-Ashigara (JP); Yuta Takahashi, Minami-Ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/133,592

(22) Filed: Apr. 20, 2016

(65) Prior Publication Data
US 2016/0231606 A1    Aug. 11, 2016

Related U.S. Application Data

(63) Continuation of application No. 14/792,835, filed on Jul. 7, 2015, now Pat. No. 9,348,177, which is a (Continued)

(30) Foreign Application Priority Data

Sep. 9, 2005 (JP) .................................. 2005-262304
Mar. 8, 2006 (JP) .................................. 2006-063026

(51) Int. Cl.
*G02F 1/1335* (2006.01)
*G02F 1/13363* (2006.01)
(Continued)

(52) U.S. Cl.
CPC ............ *G02F 1/13363* (2013.01); *C08B 3/00* (2013.01); *C08J 5/18* (2013.01); *G02B 1/04* (2013.01);
(Continued)

(58) Field of Classification Search
CPC ..... G02F 1/13363; G02F 2001/133637; G02F 2202/40; G02B 5/3083
See application file for complete search history.

(56) References Cited

U.S. PATENT DOCUMENTS 6,362,862 B1    3/2002    Itoh et al.
6,565,974 B1    5/2003    Uchiyama et al.
(Continued)

FOREIGN PATENT DOCUMENTS

JP    62-210423    9/1987
JP    9-80424      3/1997
(Continued)

OTHER PUBLICATIONS

Official Action issued Dec. 6, 2011 in corresponding Japanese Patent Application No. 2006-236403, and an English translation thereof.
(Continued)

*Primary Examiner* — Paisley L Arendt
(74) *Attorney, Agent, or Firm* — Buchanan, Ingersoll & Rooney PC

(57) ABSTRACT

An optical film is provided and has retardations satisfying relations (1) to (3):
(1) 0≤Re(550)≤10;
(2) −25≤Rth(550)≤25; and
(3) |I|+|II|+|III|+|IV|>0.5 (nm),
with definitions:
I=Re(450)−Re(550);
II=Re(650)−Re(550);

(Continued)

III=Rth(450)−Rth(550); and
IV=Rth(650)−Rth(550),
wherein Re(450), Re(550) and Re(650) are in-plane retardations measured with lights of wavelength of 450, 550 and 650 nm, respectively; and Rth(450), Rth(550) and Rth(650) are retardations in a thickness direction of the optical film, which are measured with lights of wavelength of 450, 550 and 650 nm, respectively.

14 Claims, 9 Drawing Sheets

Related U.S. Application Data continuation of application No. 14/482,314, filed on Sep. 10, 2014, now Pat. No. 9,097,837, which is a continuation of application No. 14/070,773, filed on Nov. 4, 2013, now abandoned, which is a continuation of application No. 13/609,834, filed on Sep. 11, 2012, now Pat. No. 8,823,909, which is a continuation of application No. 11/515,783, filed on Sep. 6, 2006, now abandoned.

(51) Int. Cl.
  *C08B 3/00* (2006.01)
  *C08J 5/18* (2006.01)
  *G02B 1/04* (2006.01)
  *G02B 5/30* (2006.01)
  *G02F 1/139* (2006.01)

(52) U.S. Cl.
  CPC ........... *G02B 5/305* (2013.01); *G02B 5/3083* (2013.01); *G02F 1/133528* (2013.01); *C08J 2301/10* (2013.01); *G02F 1/1393* (2013.01); *G02F 2001/133531* (2013.01); *G02F 2001/133637* (2013.01); *G02F 2001/133638* (2013.01); *G02F 2202/40* (2013.01); *G02F 2413/02* (2013.01); *Y10T 428/1036* (2015.01)

(56) References Cited

U.S. PATENT DOCUMENTS

| | | |
|---|---|---|
| 7,012,663 B2 | 3/2006 | Ono et al. |
| 7,211,316 B2 | 5/2007 | Ishikawa et al. |
| 2002/0039627 A1 | 4/2002 | Ichihashi et al. |
| 2002/0041352 A1 | 4/2002 | Kuzuhara et al. |
| 2005/0030456 A1 | 2/2005 | Murakami et al. |
| 2005/0163923 A1 | 7/2005 | Sasada |
| 2007/0002228 A1 | 1/2007 | Yano et al. |

FOREIGN PATENT DOCUMENTS

| | | | |
|---|---|---|---|
| JP | 9-292522 | | 11/1997 |
| JP | 10-54982 | | 2/1998 |
| JP | 10-307291 | | 11/1998 |
| JP | 11-133408 | | 5/1999 |
| JP | 11-202323 | | 7/1999 |
| JP | 11-305217 | | 11/1999 |
| JP | 3027805 | | 1/2000 |
| JP | 2001-296423 A | | 10/2001 |
| JP | 2001-296425 | | 10/2001 |
| JP | 2001-318232 A | | 11/2001 |
| JP | 2001-318233 A | | 11/2001 |
| JP | 2001318233 A | * | 11/2001 |
| JP | 2002-156528 A | | 5/2002 |
| JP | 3330574 | | 7/2002 |
| JP | 2002-249599 A | | 9/2002 |
| JP | 2004-4642 | | 1/2004 |
| JP | 2004-046065 A | | 2/2004 |
| JP | 2005-99476 | | 4/2005 |
| JP | 2005-154764 A | | 6/2005 |
| JP | 2005-196015 A | | 7/2005 |
| JP | 2005-206732 A | | 8/2005 |

OTHER PUBLICATIONS

Office Communication from Japanese Patent Office issued in corresponding Japanese Patent Application No. 2006-236403 dated Dec. 7, 2010, with an English translation.
Office Action from Japanese Patent Office issued in corresponding Japanese Patent Application No. 2006-236403 dated Jan. 4, 2011, with an English translation.
Information Statement dated Apr. 4, 2011, submitted by a third party to the Japanese Patent Office in corresponding Japanese Patent Application No. 2006-236403, and English language translation of the Statement.
Third Party's Submission filed on Mar. 13, 2013, in corresponding Japanese Patent Application No. 2012-027821, and an English translation thereof (30 pages).
Notice of Reasons for Rejection issued on Apr. 23, 2013, in corresponding Japanese Patent Application No. 2012-027821, and a partial English translation thereof.

* cited by examiner

PRIOR ART

FIG. 3
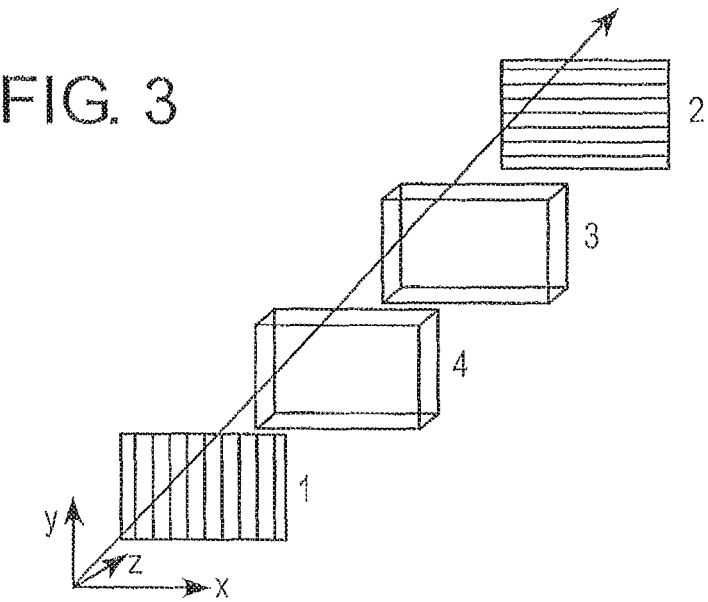
PRIOR ART
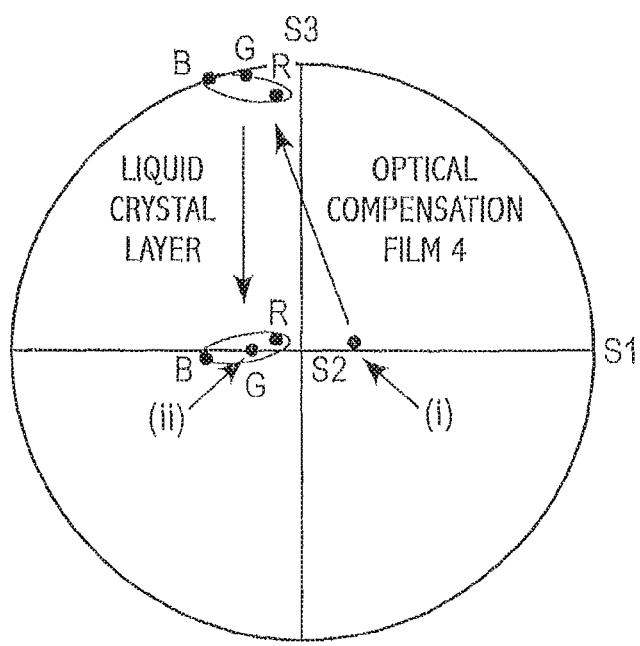
FIG. 4
PRIOR ART

OPTICAL FILM, OPTICAL COMPENSATION FILM, POLARIZING PLATE AND LIQUID CRYSTAL DISPLAY

CROSS-REFERENCE TO RELATED APPLICATIONS

This application is a continuation of U.S. application Ser. No. 14/792,835, filed on Jul. 7, 2015, which in turn is a continuation of U.S. application Ser. No. 14/482,314, filed on Sep. 10, 2014, now U.S. Pat. No. 9,097,837 which in turn is a continuation of U.S. application Ser. No. 14/070,773, filed on Nov. 4, 2013, now abandoned, which in turn is a divisional of U.S. application Ser. No. 13/609,834, filed Sep. 11, 2012, now U.S. Pat. No. 8,823,909, which in turn is a continuation of U.S. application Ser. No. 11/515,783, filed Sep. 6, 2006, now abandoned, which in turn claims priority to Japanese Application Nos. 2005-262304 and 2006-63026, filed Sep. 9, 2005 and Mar. 8, 2006, respectively, the entire content of each of which is incorporated herein by reference.

FIELD OF THE INVENTION

The present invention relates to an optical film adapted for use in a liquid crystal display, and an optical material such as an optical compensation film or a polarizing plate, and a liquid crystal display utilizing the same.

DESCRIPTION OF BACKGROUND ART

Liquid crystal displays are widely utilized for a monitor of a personal computer and a portable equipment, and for televisions, because of various advantages such as a low voltage drive, a lower electric power consumption and possibility for a compactification and a thin structure. Such liquid crystal displays are proposed in various modes depending on the liquid crystal molecules within a liquid crystal cell, but a TN mode, in which the liquid crystal molecules are twisted by about 90° from a lower substrate to an upper substrate of the liquid crystal cell, has been employed principally.

In general, the liquid crystal display is constituted of a liquid crystal cell, an optical compensation sheet, and a polarizer. The optical compensation sheet is used for removing a coloration on the image or expanding a view angle, and a stretched birefringent film or a transparent film coated with a liquid crystal material is used for this purpose. For example JP-A-62-210423 discloses a technology of applying an optical compensation film, which is prepared by coating, aligning and fixing a discotic liquid crystal on a triacetyl cellulose film, to a TN-mode liquid crystal cell, thereby expanding a viewing angle. However, a liquid crystal display for a television use, having a large image size and anticipated for observation from various angles, involves strict requirements for the viewing angle dependence of the image, and even the aforementioned method is unable to meet such requirements. For this reason, liquid crystal displays different from the TN mode are being investigated, such as those of an IPS (in-plane switching) mode, an OCB (optically compensatory bend) mode and a VA (vertically aligned) mode. In particular, the VA mode is attracting attention for use in television, because of a high contrast and a relatively high production yield.

However the VA mode, though being capable of displaying an almost complete black color in a normal direction to the panel, causes a light leakage when the panel is observed from an inclined direction, and thus results in a limited viewing angle. In order to avoid such drawback, it is proposed to position a retardation plate, having a refractive index anisotropy in which a refractive index in a film thickness direction is sufficiently smaller than a refractive index in an in-plane direction, between the liquid crystal layer and at least one of the polarizing plates (for example JP-A-62-210423). It is also proposed to reduce the light leakage, by utilizing, in combination, a first retardation plate having a positive monoaxial refractive index anisotropy and a second retardation plate having a negative refractive index anisotropy in which the refractive index in the film thickness direction is sufficiently smaller than the refractive index in the in-plane direction (for example Japanese Patent No. 3027805). It is further proposed to improve the viewing angle characteristics of a VA-mode liquid crystal display, utilizing an optically biaxial retardation plate, having refractive indexes different in three-dimensional directions of a film (for example Japanese Patent No. 3330574).

On the other hand, also in the IPS mode, a slight light leakage in a diagonally inclined incident direction in a black display state is recognized as a cause of deterioration in the display quality. For improving the displayed color and the viewing angle in the black display state, it is being considered, also in the IPS mode, to provide an optical compensation material with birefringent characteristics, between the liquid crystal layer and the polarizing plate. It is disclosed, for example, that the coloration of the image, when a white display or a display of an intermediate tone is observed from an inclined direction, can be improved by positioning a birefringent medium, having mutually orthogonal optical axes and capable of compensating a change in the retardation of the liquid crystal layer in an inclined position, between a substrate and a polarizing plate (see JP-A-9-80424). There are also disclosed a method of utilizing an optical compensation film, formed by a styrenic polymer or a discotic liquid crystalline compound, having a negative intrinsic birefringence (see JP-A-10-54982, JP-A-11-202323 and JP-A-9-292522), a method of combining, as an optical compensation film, a film having a positive birefringence and having an optical axis in the plane of the film and a film having a positive birefringence and having an optical axis in a normal direction to the film (see JP-A-11-133408), a method of utilizing a biaxial optical compensation sheet with a retardation of a half wavelength (see JP-A-11-305217), and a method of utilizing a film having a negative retardation as a protective film of a polarizing plate and providing a surface of such film with an optical compensation layer having a positive retardation (see JP-A-10-307291). Also disclosed is an invention of utilizing a retardation film having Nz of from 0.4 to 0.6 and an in-plane retardation of from 200 to 350 nm thereby suppressing a light leakage, caused by an aberration in a crossing angle of the polarizing axes from an orthogonal relationship, experienced when orthogonally disposed polarizing plates are observed from an inclined direction (see JP-A-2004-4642).

However, the aforementioned methods reduces the light leakage only in a certain wavelength region (for example green light around 550 nm), and do not take into consideration the light leakage in other wavelength regions (for example blue light around 450 nm and red light around 650 nm). Therefore, so-called color shift phenomenon, in which a black display is colored blue or red when observed from an inclined direction, has not been resolved.

SUMMARY OF THE INVENTION

An object of an illustrative, non-limiting embodiment of the invention is to provide an optical film, having a high contrast ratio over a wide range and capable of suppressing a color shift (color shift when observed from an inclined direction), and to provide an optical material such as an optical compensation film or a polarizing plate and a liquid crystal display, utilizing such optical film.

The above-mentioned object can be accomplished by following means.

1. An optical film having retardations satisfying relations (1) to (3):
   (1) $0 \leq Re(550) \leq 10$;
   (2) $-25 \leq Rth(550) \leq 25$; and
   (3) $|I|+|II|+|III|+|IV| > 0.5$ (nm),
   with definitions:
   $I = Re(450) - Re(550)$;
   $II = Re(650) - Re(550)$;
   $III = Rth(450) - Rth(550)$; and
   $IV = Rth(650) - Rth(550)$,
   wherein Re(450), Re(550) and Re(650) are in-plane retardations measured with lights of wavelength of 450, 550 and 650 nm, respectively; and Rth(450), Rth(550) and Rth(650) are retardations in a thickness direction of the optical film, which are measured with lights of wavelength of 450, 550 and 650 nm, respectively.

2. The optical film according to the item 1, wherein I, II, III and IV satisfy relations (4-A) to (7-A):
   (4-A) $-50 \leq I \leq 0$;
   (5-A) $0 \leq II \leq 50$;
   (6-A) $-50 \leq III < 0$; and
   (7-A) $0 < IV \leq 50$.

3. The optical film according to the item 1, wherein I, II, III and IV satisfy relations (4-B) to (7-B):
   (4-B) $-50 \leq I < 0$;
   (5-B) $0 < II \leq 50$;
   (6-B) $0 \leq III \leq 50$; and
   (7-B) $-50 \leq IV \leq 0$.

4. The optical film according to the item 1, wherein I, II, III and IV satisfy relations (4-C) to (7-C):
   (4-C) $0 \leq I \leq 50$;
   (5-C) $-50 \leq II \leq 0$;
   (6-C) $0 < III \leq 50$; and
   (7-C) $-50 \leq IV < 0$.

5. The optical film according to the item 1, wherein I, II, III and IV satisfy relations (4-D) to (7-D):
   (4-D) $0 < I \leq 50$;
   (5-D) $-50 \leq II < 0$;
   (6-D) $-50 \leq III \leq 0$; and
   (7-D) $0 \leq IV \leq 50$.

6. The optical film according to any one of the items 1 to 5, which is formed from a cellulose acylate a raw material polymer of the optical film.

7. The optical film according to the item 6, wherein the cellulose acylate has an acyl substituent, the acyl substituent is substantially only an acetyl group, and a total substitution degree of the acyl substituent is from 2.56 to 3.00.

8. The optical film according to the item 6, wherein the cellulose acylate has an acyl substituent, the acyl substituent is substantially at least two of acetyl group, propionyl group and butanoyl group, and a total substitution degree of the acyl substituent is from 2.50 to 3.00.

9. The optical film according to any one of the items 1 to 8, which comprises a compound capable of reducing Rth (550) within a range satisfying relations (8) and (9):
   (8) $(Rth(A)-Rth(0))/A \leq -1.0$; and
   (9) $0.01 \leq A \leq 30$,
wherein:
   Rth(A) means Rth(nm) at 550 nm of the optical film containing the compound capable of reducing Rth(550) by A %;
   Rth(0) means Rth(nm) at 550 nm of the optical film not containing the compound capable of reducing Rth (550); and
   A means a weight % of the compound capable of reducing Rth(550) with respect to a weight of a raw material polymer of the optical film, which is taken as 100.

10. The optical film according to the items 1 to 9, which comprises a compound capable of increasing $\Delta Rth$, which is represented by a relation (10), within a range satisfying relations (11) and (12):
    (10) $\Delta Rth = Rth(450) - Rth(650)$;
    (11) $(\Delta Rth(B) - \Delta Rth(0))/B \geq 1.0$; and
    (12) $0.01 \leq B \leq 30$,
wherein:
    $\Delta Rth(B)$ means $\Delta Rth$(nm) of the optical film containing the compound capable of increasing $\Delta Rth$ by B %;
    $\Delta Rth(0)$ means $\Delta Rth$(nm) of the optical film not containing the compound capable of increasing $\Delta Rth$; and
    B means a weight (%) of the compound capable of increasing $\Delta Rth$ with respect to a weight of a raw material polymer of the optical film, which is taken as 100.

11. The optical film according to the items 1 to 10, which has a thickness of 20 to 200 μm.

12. An optical compensation film comprising: an optical film according to any one of the items 1 to 11; and an optically anisotropic layer satisfying relations (13) and (14):
    (13) $0 \leq Re \leq 400$; and
    (14) $-400 \leq Rth \leq 400$,
    wherein Re and Rth are an in-plane retardation and a retardation in a thickness direction of the optically anisotropic layer, respectively, which are measured with a light having a wavelength within a visible region.

13. The optical compensation film according to the item 12, wherein the optically anisotropic layer contains a discotic liquid crystal.

14. The optical compensation film according to the item 12 or 13, wherein the optically anisotropic layer contains a cholesteric liquid crystal.

15. The optical compensation film according to any one of the items 12 to 14, wherein the optically anisotropic layer contains a rod-shaped liquid crystal.

16. The optical compensation film according to any one of the items 12 to 15, wherein the optically anisotropic layer contains a polymer film.

17. The optical compensation film according to any one of the items 12 to 16, wherein the polymer compound constituting the optically anisotropic layer contains at least a polymer material selected from the group consisting of polyamide, polyimide, polyester, polyether ketone, polyamidimide, polyesterimide, and polyarylether ketone.

18. A polarizing plate comprising: a polarizer; and an optical film according to any one of the items 1 to 11 or an optical compensation film according to any one of the items 12 to 17.

19. A liquid crystal display comprising an optical film according to any one of the items 1 to 11, at least one optical compensation film according to any one of the items 12 to 17 or a polarizing plate according to the item 18.

20. A liquid crystal display comprising: an optical film according to any one of the items 1 to 11, at least one optical compensation film according to any one of the items 12 to 17 or a polarizing plate according to the item 18; and an optically anisotropic layer satisfying relations (15) and (16):

(15) 0≤Re≤400; and

(16) −400≤Rth≤400, wherein Re and Rth are an in-plane retardation and a retardation in a thickness direction of the optically anisotropic layer, respectively, which are measured with a light having a wavelength within a visible region.

21. The liquid crystal display according to the item 20, wherein the optically anisotropic layer contains a discotic liquid crystal.

22. The liquid crystal display according to the item 20 or 21, wherein the optically anisotropic layer contains a cholesteric liquid crystal.

23. The liquid crystal display according to any one of the items 20 to 22, wherein the optically anisotropic layer contains a rod-shaped liquid crystal.

24. The liquid crystal display according to any one of the items 20 to 23, wherein the optically anisotropic layer contains a polymer film.

25. The liquid crystal display according to any one of the items 20 to 24, wherein the polymer compound constituting the optically anisotropic layer contains at least a polymer material selected from the group consisting of polyamide, polyimide, polyester, polyether ketone, polyamidimide, polyesterimide, and polyarylether ketone.

26. The liquid crystal display according to any one of the items 19 to 25, which further comprises a liquid crystal cell containing liquid crystal molecules aligned in one of a vertical alignment, a parallel alignment and a bent alignment in a black display state of the liquid crystal display.

27. The liquid crystal display according to the item 26, wherein the liquid crystal molecules are aligned in the vertical alignment in the black display state, and the liquid crystal display comprises an optically anisotropic layer, the optically anisotropic layer including a layer satisfying relations (17) and (18):

(17) 10≤Re≤150; and

(18) 50≤Rth≤400, wherein Re and Rth are an in-plane retardation and a retardation in a thickness direction of the optically anisotropic layer, respectively, which are measured with a light having a wavelength within a visible region.

28. The liquid crystal display according to the item 26, wherein the liquid crystal molecules are aligned in the parallel alignment in the black display state, and the liquid crystal display comprises an optically anisotropic layer, the optically anisotropic layer including a layer satisfying any one of relations from (19) to (22):

(19) 100≤Re≤400, and −50≤Rth≤50;

(20) 0≤Re≤20, and −400≤Rth≤−50;

(21) 60≤Re≤200, and 20≤Rth≤120; and

(22) 30≤Re≤150, and 100≤Rth≤400, wherein Re and Rth are an in-plane retardation and a retardation in a thickness direction of the optically anisotropic layer, respectively, which are measured with a light having a wavelength within a visible region.

29. The liquid crystal display according to the item 26, wherein the liquid crystal molecules are aligned in the bent alignment in the black display state, and the liquid crystal display comprises an optically anisotropic layer, the optically anisotropic layer including a layer containing a discotic liquid crystal compound.

BRIEF DESCRIPTION OF THE DRAWINGS

The features of the invention will appear more fully upon consideration of the exemplary embodiments of the invention, which are schematically set forth in the drawings, in which:

FIG. 3 is a schematic view showing an example of a liquid crystal display of the background art;

FIG. 4 is a schematic view of a Poincare sphere, used for explaining a change in a polarized state of an incident light in a liquid crystal display of the background art;

DETAILED DESCRIPTION OF THE EXEMPLARY EMBODIMENTS

Although the invention will be described below with reference to the exemplary embodiments thereof, the following exemplary embodiments and modifications do not restrict the invention.

An exemplary embodiment of the invention allows, through suitable selection of materials and producing process, to independently control a wavelength-dependent dispersion of an in-plane retardation and a retardation in a thickness direction of the optical compensation film and to determine optically optimum values, thereby enabling a view angle compensation, at all the wavelengths, in a black display state of the liquid display cell. More specifically, as to the raw materials, selections are made on a polymer raw material, and on a type and an amount of an additive for controlling optical characteristics. As a result, a liquid crystal display of an exemplary embodiment of the present invention is improved in a light leakage in an inclined direction in a black display state, with a significant improvement in a contrast over a wide viewing angle. Also the liquid crystal display, being capable of suppressing a light leakage in an inclined direction in a black display state over the entire visible wavelength region, is significantly improved on a color aberration on the black display state, which is dependent on the viewing angle and which has been a drawback in the prior technology.

Figure 1:
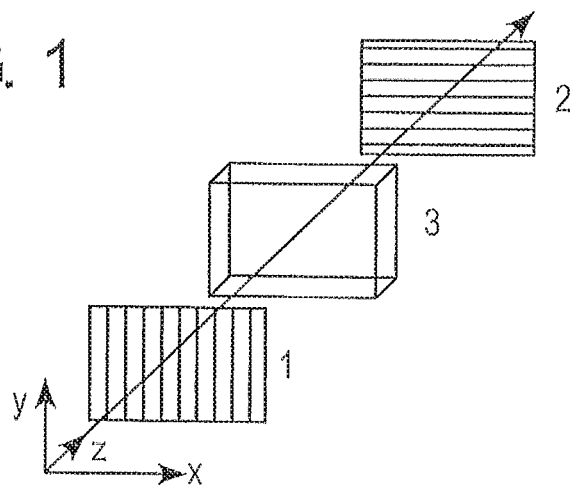
FIG. 1 is a schematic view showing an example of a liquid crystal display of the background art.

In the following, an exemplary embodiment of the present invention will be explained with reference to accompanying drawings. One aspect of the present invention is effective in all the liquid crystal modes, regardless of the driving system of the liquid crystal display, but FIG. 1 shows, as an example, a schematic view illustrating a structure of a liquid crystal display of an ordinary VA mode. The liquid crystal display of VA mode includes a liquid crystal cell 3 containing a liquid crystal layer, in which liquid crystals are aligned perpendicularly to a substrate surface in the absence of a voltage application, namely in a black display state, and polarizing plates 1, 2 so positioned that the liquid crystal cell 3 is sandwiched therebetween and that directions of transmission axes thereof (indicated by stripes in FIG. 1) are perpendicular each other. In FIG. 1, a light is assumed to enter from the side of the polarizing plate 1. When a light enters along z-axis in the absence of a voltage application, the light transmitted by the polarizing plate 1 is transmitted by the liquid crystal cell 3 while maintaining a linearly polarized state, and is completely intercepted by the polarizing plate 2. As a result, a high contrast image can be displayed.

Figure 2:
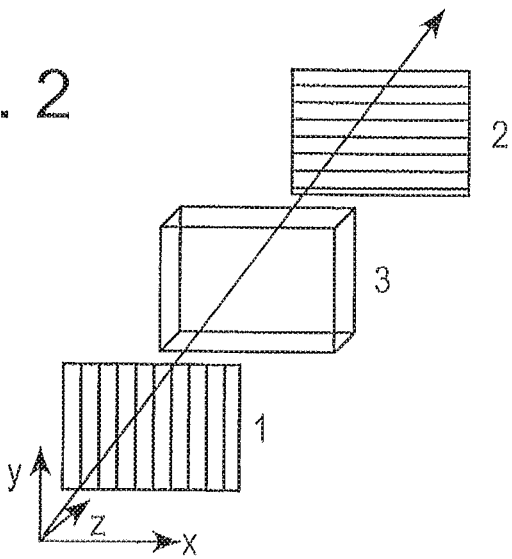
FIG. 2 is a schematic view showing an example of a liquid crystal display of the background art.

However, the situation becomes different in case of an inclined incident light, as shown in FIG. 2. When a light enters from an inclined direction different from the direction of z-axis and inclined with respect to the polarizing directions of the polarizing plates 1, 2 (so-called off-axis direction), the incident light is influenced, upon passing through the vertically aligned liquid crystal layer of the liquid crystal cell 3, by a retardation in an inclined direction thereby causing a change in the polarization state. Also the apparent transmission axes of the polarizing plates 1 and 2 are displaced from an orthogonal relationship. Because of these two factors, the incident light from an inclined off-axis direction is not completely intercepted by the polarizing plate 2 to induce a light leakage in a black display state, thereby reducing the contrast.

Now a polar angle and an azimuthal angle are defined as follows. The polar angle means an inclination angle from a normal direction to the film surface, namely from z-axis in FIGS. 1 and 2, and, for example, a normal direction to the film surface is a direction with a polar angle=0°. The azimuthal angle means a direction measured counterclockwise from a positive x-axis, and, for example, the positive direction of x-axis has an azimuthal angle=0°, and the positive direction of y-axis has an azimuthal angle=90°. The inclined off-axis direction mentioned above means a case where the polar angle is non-zero, and principally indicates a case where the azimuthal angle is 45, 135, 225 or 315°.

FIG. 3 is a schematic view showing a structure for explaining the function of a polarized light in an ordinary liquid crystal display. The structure shown in FIG. 3 includes, in addition to the structure shown in FIG. 1, an optical compensation film 4 between the liquid crystal cell 3 and the polarizing plate 1. In the VA-mode liquid crystal display of such structure, the optical compensation film 4 generally has, at a wavelength of 550 nm, Re(550) of from about 20 to 100 nm and Rth(550) of from about 100 to 300 nm. Also when the optical compensation film 4 is prepared from a material having a positive refractive index anisotropy, it generally meets conditions of Re(450)≥Re(550)≥Re(650) and Rth(450)≥Rth(550)≥Rth(650), thus having Re and Rth larger at a shorter wavelength.

FIG. 4 explains the compensation mechanism shown in FIG. 3, by a Poincare sphere. The Poincare sphere is a three-dimensional map describing a polarization state, wherein a position on an equator of the sphere indicates a linearly polarized light. The light propagates in a direction with an azimuthal angle of 45° and a polar angle of 34°. In FIG. 4, an S2-axis perpendicularly penetrates the plane of drawing from above to below, and FIG. 4 shows a view of the Poincare sphere from the positive side of the S2-axis. In FIG. 4 which is a planar representation, a displacement between points before and after a change in the polarization state is represented by a linear arrow shown therein, but a change in the polarization state by passing through the liquid crystal layer or the optical compensation film is represented, on the actual Poincare sphere, by a rotation by a specified angle about a specified axis determined according to the optical characteristics.

A polarization state of the incident light, after passing the polarizing plate 1 in FIG. 3, corresponds to a point (i) in FIG. 4, and a polarization state to be intercepted by the absorption axis of the polarizing plate 2 in FIG. 3 corresponds to a point (ii) in FIG. 4. In the prior VA-mode liquid crystal display, a light leakage in the inclined off-axis direction results from a fact that the points (i) and (ii) are displaced each other. The optical compensation film is generally used for changing the polarization state of the incident light from the point (i) to the point (ii), including a change in the polarization state in the liquid crystal layer. Since the liquid crystal layer of the liquid crystal cell 3 shows a positive refractive index anisotropy and has a vertical alignment, a change in the polarization state of the incident light, caused by passing the liquid crystal layer, is represented, on the Poincare sphere, by a downward arrow in FIG. 4 or a rotation about an S1-axis.

A rotation angle about the S1-axis is proportional to a value $\Delta n'd'/\lambda$ obtained by dividing an effective retardation $\Delta n'd'$ in an inclined direction of the liquid crystal layer with the wavelength $\lambda$ of the light, so that the rotation angle becomes different among the different wavelengths of R, G and B. Therefore, after the rotation, a light of either of the wavelengths R, G and B becomes displaced from the point (ii). The light of such displaced wavelength is not intercepted by the polarizing plate 2, thereby causing a light leakage. Since a color of the light is defined by a sum of R, G and B, a light leakage of a specified wavelength results in a change in the proportion, in the sum of R, G and B, thereby causing a color shift. This phenomenon is observed as a "color shift" when a liquid crystal display is observed from an inclined direction.

In the present specification, the lights of R, G and B are represented respectively by wavelengths of 650 nm for R, 550 nm for G and 450 nm for B. These wavelengths may not necessarily represent the lights or R, G and B, but are considered suitable for defining optical characteristics providing the effects of the present invention.

As explained above, when the optical compensation film 4 is prepared from a material having a positive refractive index anisotropy, it generally meet conditions of Re(450)≥Re(550)≥Re(650) and Rth(450)≥Rth(550)≥Rth(650), thus having Re and Rth larger at a shorter wavelength, so that, when the liquid crystal display is observed from an inclined direction, the effective retardation becomes larger for a shorter wavelength (R≤G≤B). As the displacement amount from the point (i) is dependent on the magnitude of such effective retardation, the displacement amounts become R≤G≤B so that the three points do not match mutually.

Also as to the change in the polarization state of the light upon passing through the liquid crystal cell, since the liquid crystal molecules of the liquid crystal cell generally have a positive intrinsic birefringence and have Re and Rth larger in a shorter wavelength, the effective retardation when the liquid crystal display is observed from an inclined direction becomes larger for a shorter wavelength. Therefore the displacement to the point (ii) becomes larger for a shorter wavelength and the lights of R, G and B assume a positional relationship as shown in FIG. 4.

Figure 5:
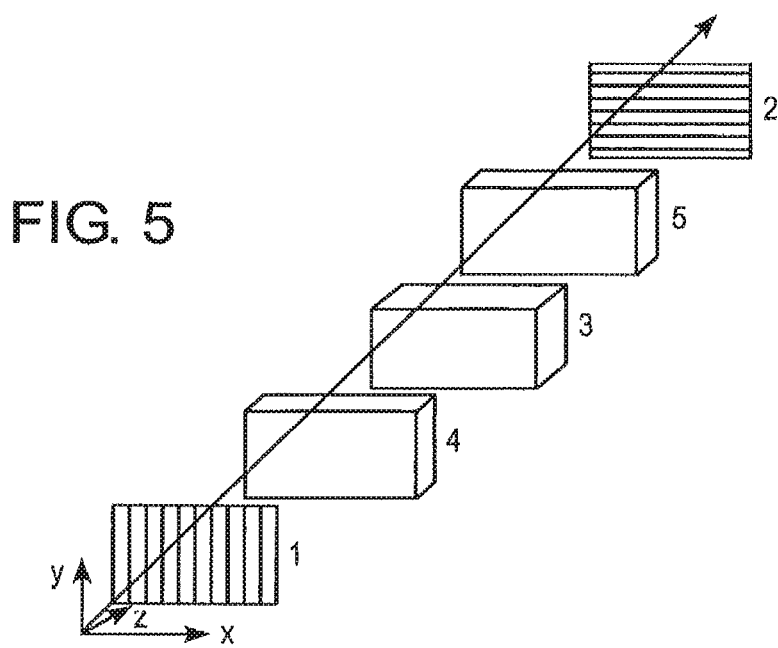
FIG. 5 is a schematic view showing an example of a liquid crystal display of the present invention.

According to one aspect of the present invention, therefore, an optical film 5 is employed for matching the positions of R, G and B at the point (ii). FIG. 5 is a schematic view showing an example of structure, for explaining a function of the present invention. The optical film 5 of the invention is positioned between the liquid crystal cell 3 and the polarizing plate 2, but such position is not particularly restricted in the present invention.

Figure 6:
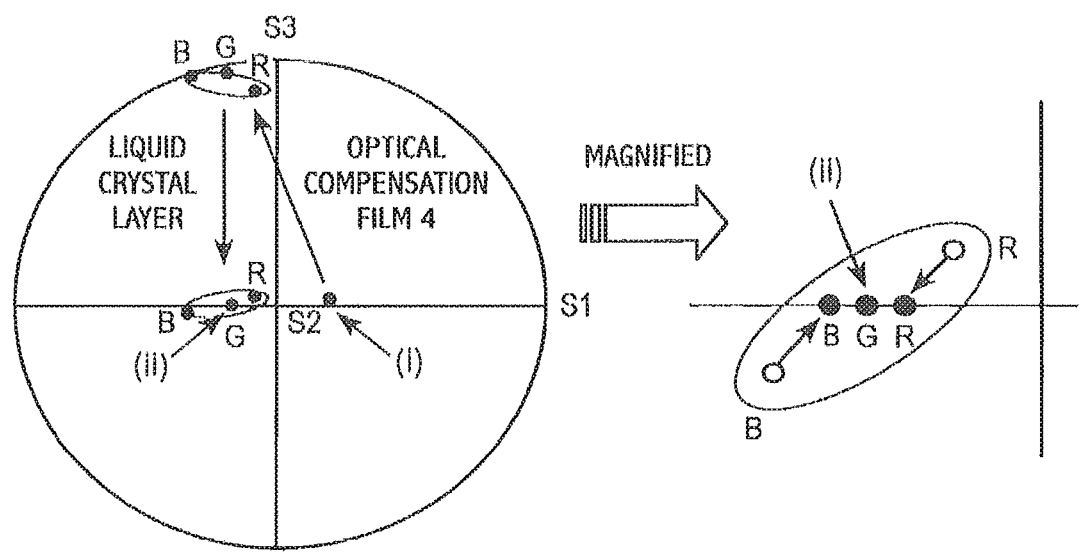
FIG. 6 is a schematic view of a Poincare sphere, used for explaining a change in a polarized state of an incident light in a liquid crystal display of the present invention.
Figure 7:
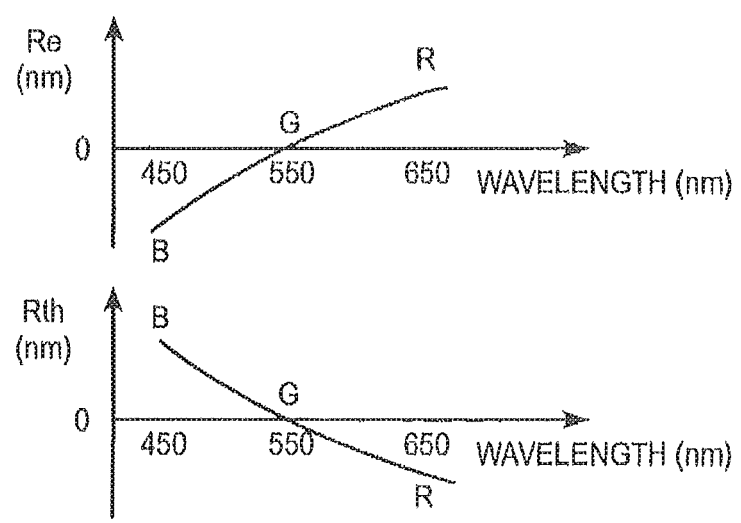
FIG. 7 is a graph showing optical characteristics in an example of an optical film employed in the present invention.

FIG. 6 is a view explaining a compensation mechanism in the structure shown in FIG. 5, utilizing a Poincare sphere. Insertion of an optical film 5 allows to match the lights of R, G and B at a substantially same point. More specifically, optical compensations are made on the lights of wavelengths R, G and B, entering in an inclined direction, with a phase retarding axis and a retardation respectively different for each wavelength. More specifically, among R, G and B, a wavelength R (650 nm) is in a position at upper right to the point (ii), and a left-downward displacement to the point (ii) requires a positive Re(650) and a negative Rth(650) in the optical film 5. Similarly, as a wavelength G (550 nm) need not be displaced from the point (ii), Re(550) and Rth(550) may both be zero. Also a wavelength B (450 nm) is in a position at lower left to the point (ii), and a right-upward displacement to the point (ii) requires a negative Re(450) and a positive Rth(450) in the optical film 5. In the optical film 5 having such optical characteristics, the wavelength dependences of Re and Rth are shown in FIG. 7.

Figure 8:
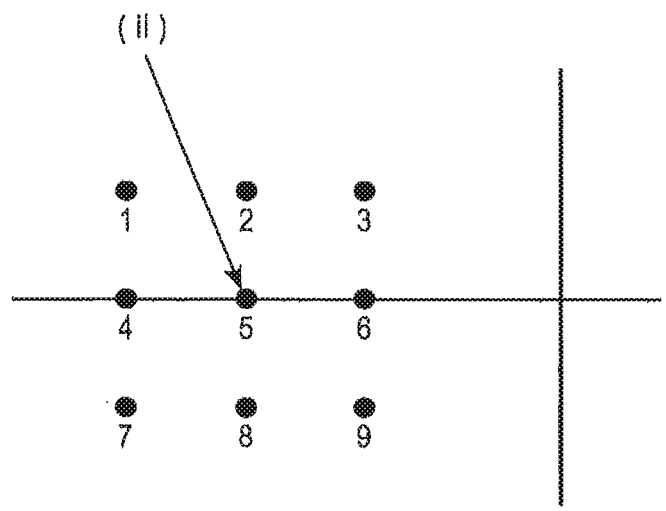
FIG. 8 is a schematic view of a Poincare sphere, used for explaining a polarized state.

The foregoing discussion is applicable, in the optical compensation in an ordinary liquid crystal display, to all the cases where a central wavelength G (550 nm) is matched with the point (ii) but wavelengths R and B are not matched with this point. FIG. 8 is a magnified view of a peripheral area around the point (ii) on the Poincare sphere, with points 1-9 displaced from the point (ii), and Table 1 shows the properties required for the optical film 5 for displacing these points 1-9 to the point (ii). In FIG. 8 and Table 1, a point 5 is same as the point (ii).

TABLE 1

| position | Re | Rth |
|---|---|---|
| 1 | negative | negative |
| 2 | 0 | negative |
| 3 | positive | negative |
| 4 | negative | 0 |
| 5 | 0 | 0 |
| 6 | positive | 0 |
| 7 | negative | positive |
| 8 | 0 | positive |
| 9 | positive | positive |

The cases where, among the wavelengths R, G and B, the wavelength G (550 nm) is matched with the target point 5 but wavelengths R and B cannot be matched with the point 5, can be divided into cases (1) to (8) in Table 2, utilizing the points 1 to 9 in FIG. 8, and these cases can be classified into four classes A=(1) and (2), B=(3) and (4), C=(5) and (6) and D=(7) and (8) (cf. Table 2). The Re and Rth values required for the optical film 5 are obtained from Table 1, and the wavelength dependences of Re and Rth are summarized in FIGS. 14A and 14B.

TABLE 2

| | | Position | | |
|---|---|---|---|---|
| class | case | B (450 nm) | G (550 nm) | R (650 nm) |
| A | (1) | 2 | 5 | 8 |
|   | (2) | 1 | 5 | 9 |
| B | (3) | 4 | 5 | 6 |
|   | (4) | 7 | 5 | 3 |
| C | (5) | 8 | 5 | 2 |
|   | (6) | 9 | 5 | 1 |
| D | (7) | 6 | 5 | 4 |
|   | (8) | 3 | 5 | 7 |
|   | Ideal | 5 | 5 | 5 |

In the foregoing description, there is shown a case where, among the wavelengths R, G and B, the central wavelength G (550 nm) becomes an ideal point (ii), where both Re(550) and Rth(550) are zero, but, in an actual liquid crystal display, it may be difficult to realize a situation where both Re(550) and Rth(550) are completely zero. Though it is desirable that Re(550) and Rth(550) are both zero as far as possible, the present inventors find, as a range where Re(550) and Rth (550) are close to zero and color shifts are tolerable, that the optical film of the invention should have optical performances of $0 \leq Re(550) \leq 10$ nm and $-25 \leq Rth(550) \leq 25$ (nm), preferably $0 \leq Re(550) \leq 5$ nm and $-15 \leq Rth(550) \leq 15$ (nm).

Figure 14A:
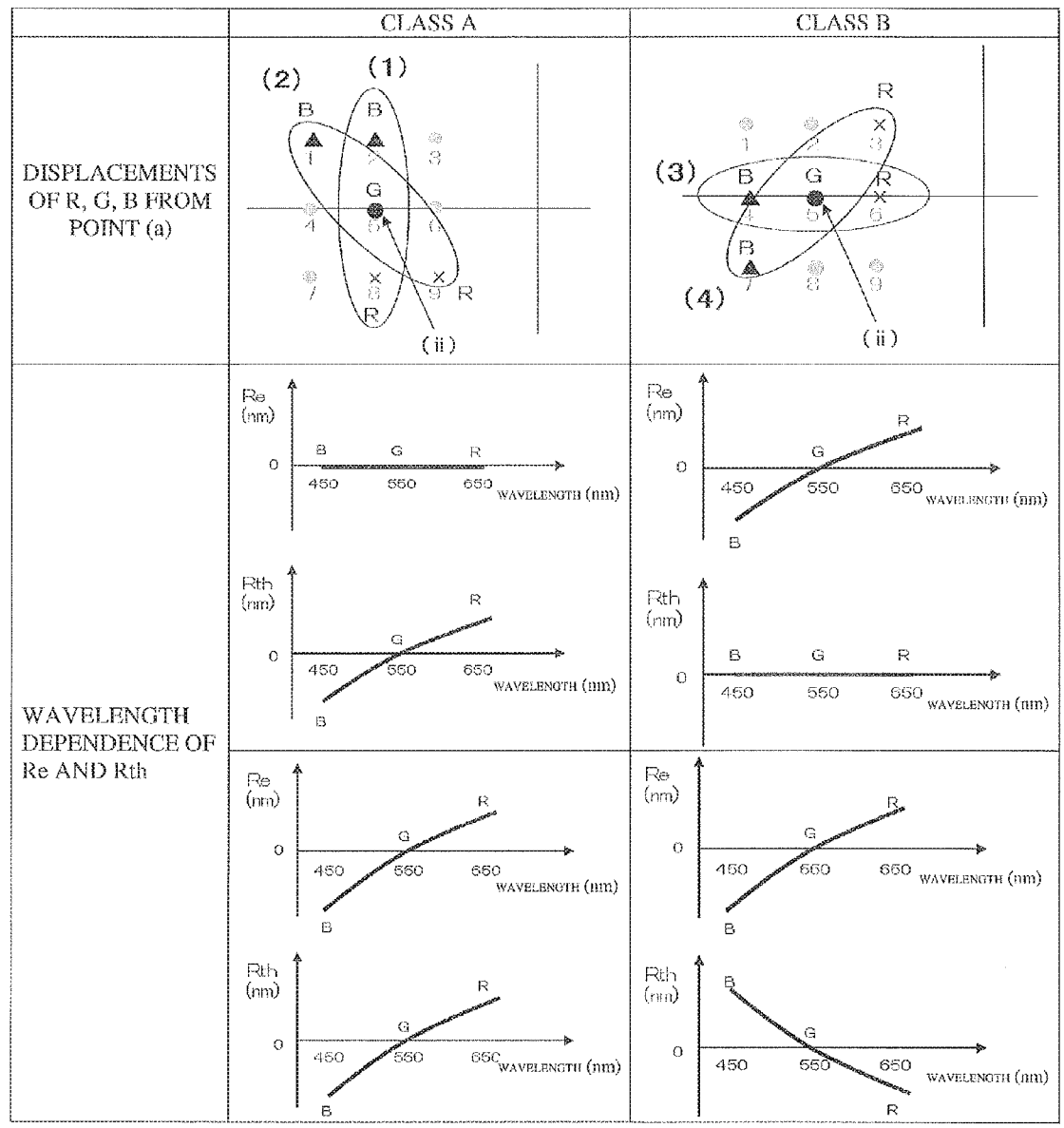
FIGS. 14A and 14B illustrate displacements of R, G, B from point (ii) and wavelength dependences of Re and Rth.
Figure 14B:
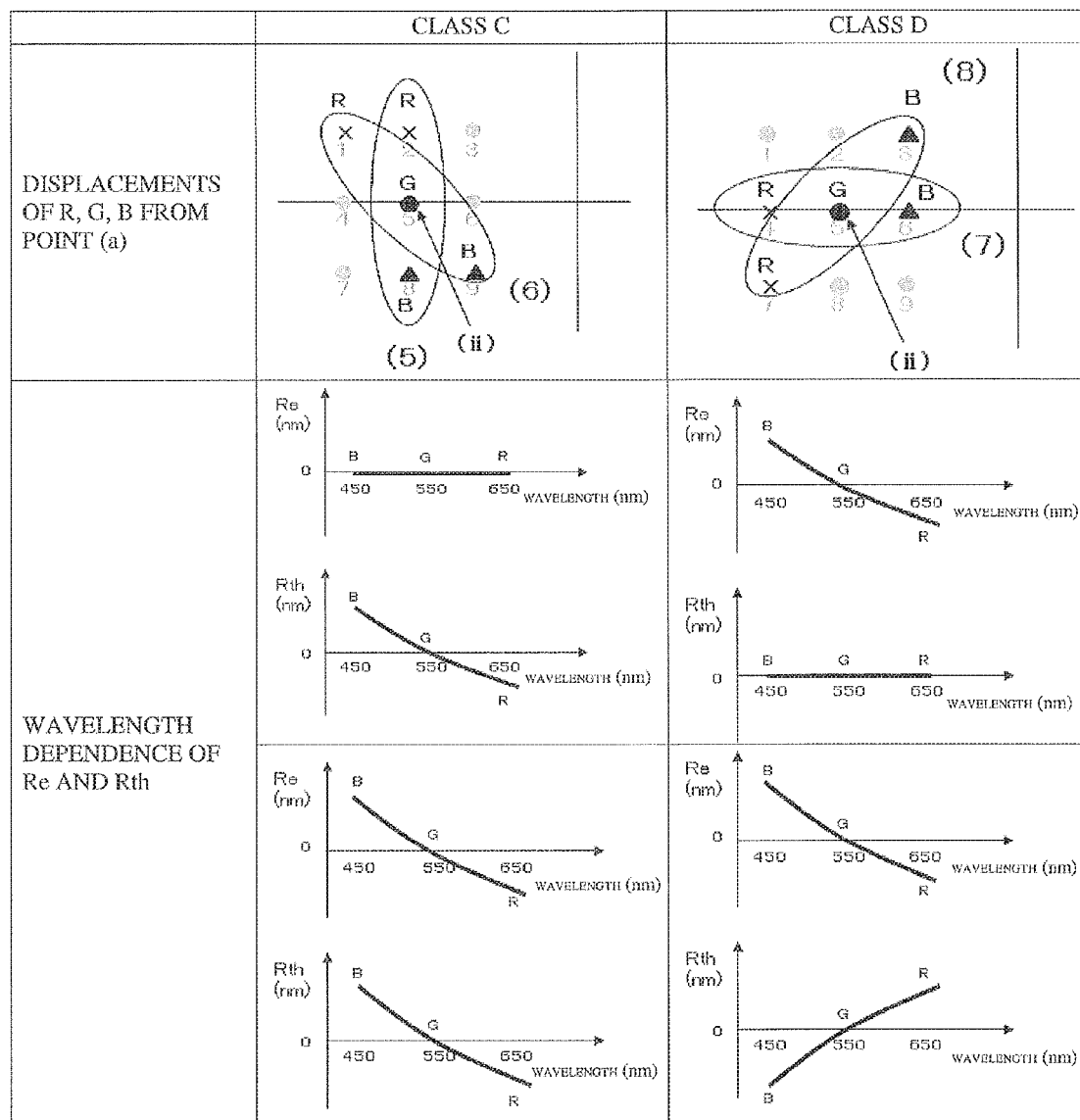

Thus, according to one aspect of the present invention, the wavelengths R, G and B, which are separated in front of the polarizing plate at the exit side of the liquid crystal display, may be made to coincide thereby avoiding the light leakage, by utilizing an optical film of a wavelength dependence selected among A, B, C and D classified in FIGS. 14A and 14B. Therefore, in any liquid crystal mode or in the structure with any optical material or any optical components, the optical film of the invention allows to prevent a color shift in an observation from an inclined direction, by wavelength dependences of Re and Rth selected among A, B, C and D classified in FIGS. 14A and 14B. Thus the scope of the present invention is not restricted by the display mode of the liquid crystal layer but is applicable to the liquid crystal display with the liquid crystal layer of any display mode, such as a VA mode, an IPS mode, an OCB mode, a TN mode or an ECB mode.

An optical film of the present invention is characterized in that a retardation thereof satisfies relations (1) to (3):

(1) $0 \leq Re(550) \leq 10$;
(2) $-25 \leq Rth(550) \leq 25$; and
(3) $|I|+|II|+|III|+|IV|>0.5$ (nm), wherein:
I=Re(450)−Re(550);
II=Re(650)−Re(550);
III=Rth(450)−Rth(550); and
IV=Rth(650)−Rth(550).

The relations (1) and (2) indicate, as described above, that Re(550) and Rth(550) have to be as close to zero as possible in the optical film of the invention. The relation (3) indicates that appropriate wavelength dependences are necessary for Re and Rth, in order to match R, G and B on the liquid crystal display. A film of an optical performance not satisfying the relation (3) has scarce wavelength dependences for Re and Rth, and is incapable of reducing the color shift found when the liquid crystal display is observed from an inclined direction.

The relation (3) is preferably
|I|+|II|+|III|+|IV|>2.0 (nm),
more preferably
|I|+|II|+|III|+|IV|>4.0 (nm).

The optical film of the invention can be classified into A, B, C and D as described above, which respectively have following optical performances.

Among the optical films of the invention, an optical film belonging to the class A meets the relations (1) to (3) above and preferably satisfies following relations (4-A) to (7-A):
  (4-A) −50≤I≤0;
  (5-A) 0≤II≤50;
  (6-A) −50≤III<0; and
  (7-A) 0<IV≤50,
and more preferably:
  (4-A') −25≤I≤0;
  (5-A') 0≤II≤25;
  (6-A') −25≤III<0; and
  (7-A') 0<IV≤25.

Among the optical films of the invention, an optical film belonging to the class B meets the relations (1) to (3) above and preferably satisfies following relations (4-B) to (7-B):
  (4-B) −50≤I<0;
  (5-B) 0<II≤50;
  (6-B) 0≤III≤50; and
  (7-B) −50≤IV≤0,
and more preferably:
  (4-B') −25≤I<0;
  (5-B') 0<II≤25;
  (6-B') 0≤III≤25; and
  (7-B') −25≤IV≤0.

Among the optical films of the invention, an optical film belonging to the class C meets the relations (1) to (3) above and preferably satisfies following relations (4-C) to (7-C):
  (4-C) 0≤I≤50;
  (5-C) −50≤II≤0;
  (6-C) 0<III≤50; and
  (7-C) −50≤IV<0,
and more preferably:
  (4-C') 0≤I≤25;
  (5-C') −25≤II≤0;
  (6-C') 0<III≤25; and
  (7-C') −25≤IV<0.

Among the optical films of the invention, an optical film belonging to the class D meets the relations (1) to (3) above and preferably satisfies following relations (4-D) to (7-D):
  (4-D) 0<I≤50;
  (5-D) −50≤II<0;
  (6-D) −50≤III≤0; and
  (7-D) 0≤IV≤50,
and more preferably:
  (4-D') 10≤I≤50;
  (5-D') −50≤II≤−10;
  (6-D') −50≤III≤−30; and
  (7-D') 30≤IV≤50.

(Retardation and Wavelength-Dependent Dispersion Thereof)

In the present specification, Re(λ) and Rth(λ) respectively indicate an in-plane retardation and a retardation in a thickness direction, at a wavelength λ. Re(λ) can be measured, in an instrument KOBRA 21ADH (manufactured by Oji Scientific Instruments Ltd.), by introducing a light of a wavelength of λ nm in a normal direction to the film surface. Rth(λ) can be obtained by measuring Re(λ) at 11 points with a light of a wavelength of λ nm introduced with inclination angles of from −50° to +50° at a pitch of 10° with respect to the normal direction to the film surface, taking an in-plane phase-retarding axis (judged by KOBRA 21ADH) as an inclination axis (rotation axis), and by a calculation executed by KOBRA 21ADH based on thus measured retardations, an assumed average refractive index and an entered film thickness. In case of an IPS mode, Rth(λ) is obtained by measuring Re(λ) at 6 points with a light of a wavelength of λ nm introduced with inclination angles of from a normal direction to the film surface to 50° at a pitch of 10° with respect to the normal direction, taking an in-plane phase-retarding axis (judged by KOBRA 21ADH) as an inclination axis (rotation axis) (in the absence of a phase-retarding axis, an arbitrary direction in the film plane being taken as a rotary axis), and by a calculation executed by KOBRA 21ADH based on thus measured retardations, an assumed average refractive index and an entered film thickness. It is also possible to measure retardations at two arbitrary directions, taking the phase-retarding axis as an inclination axis (rotation axis) (in the absence of a phase-retarding axis, an arbitrary direction in the film plane being taken as a rotary axis), and to calculate Rth based on thus measured values, an assumed average refractive index and an entered film thickness, according to following equations (1) and (2). The assumed average refractive index may be obtained from Polymer Handbook (John Wiley & Sons, Inc.) or from catalog values of various optical films. An average refractive index, if not already known, may be obtained by a measurement with Abbe's refractometer. Examples of the average refractive index on principal optical films are as follows: cellulose acylate 1.48, cycloolefin polymer 1.52, polycarbonate 1.59, polymethyl methacrylate 1.49, and polystyrene 1.59. The KOBRA 21ADH calculates nx, ny and nz based on such assumed average refractive index and a film thickness, and further calculates Nz=(nx−nz)/(nx−ny) based on thus calculated nx, ny and nz.

$$Re(\theta) = \left[ nx - \frac{ny \times nz}{\sqrt{\left\{ ny\, \sin\left(\sin^{-1}\left(\frac{\sin(-\theta)}{nx}\right)\right)\right\}^2 + \left\{ nz\, \cos\left(\sin^{-1}\left(\frac{\sin(-\theta)}{nx}\right)\right)\right\}^2}} \right] \times \frac{d}{\cos\left\{\sin^{-1}\left(\frac{\sin(-\theta)}{nx}\right)\right\}} \quad (1)$$

Note: Re(θ) indicates a retardation in a direction inclined by an angle θ from the normal direction.

$$Rth = ((nx+ny)/2 - nz) \times d \quad (2)$$

In the equations (1) and (2), d indicates a film thickness.

(Material for Optical Film)

A material constituting the optical film of the invention is preferably a polymer satisfactory in optical performance, transparency, mechanical strength, thermal stability, moisture shielding property, isotropic property and the like, and may be any material having Re and Rth within the ranges meeting the aforementioned optical performances. Examples of such polymer include a polycarbonate-type polymer, a polyester polymer such as polyethylene terephthalate or polyethylene naphthalate, an acrylic polymer such as polymethyl methacrylate, and a styrenic polymer such as polystyrene or an acrylonitrile-styrene copolymer (AS resin). Examples further include a polyolefin such as polyethylene or polypropylene, a polyolefinic polymer such as an ethylene-propylene copolymer, a vinyl chloride-based polymer, an amide-based polymer such as nylon or an aromatic polyamide, an imide-based polymer, a sulfone-based polymer, a polyethersulfone-type polymer, a polyether ether ketone-type polymer, a polyphenylene sulfide-type polymer, a vinylidene chloride-based polymer, a vinyl alcohol-based polymer, a vinyl butyral-based polymer, an allylate-based polymer, a polyoxymethylene-type polymer, an epoxy polymer, and a polymer mixture thereof.

Also as the material constituting the optical film of the invention, a thermoplastic norbornene resin may be employed preferably, such as Zeonex or Zeonor manufactured by Nippon Zeon Ltd. or Arton manufactured by JSR Corp.

Also as the material constituting the optical film of the invention, a cellulose-based polymer (hereinafter called cellulose acylate), that has been employed as a transparent protective film for a polarizing plate, may be employed particularly preferably. Representative examples of cellulose acylate include triacetyl cellulose. In the following, cellulose acylate will be explained in detail.

(Raw Material Cotton for Cellulose Acylate)

Raw material cellulose for the cellulose acylate to be employed in the optical film of the invention includes cotton linter and wood pulp (broad-leaf pulp or needle-leaf pulp), and cellulose acylate obtained from any raw material cellulose may be usable, eventually as a mixture of plural kinds. Such raw material cellulose is described in detail, for example, in *Plastic Zairyo Koza* (17), cellulose fibers (Marusawa & Uda, Nikkan Kogyo Shimbun, 1970) and in Japan Institute of Invention and Innovation, Journal of Technical Disclosure 2001-1745 (p. 7-8), and any cellulose described therein may be utilized without any particular restriction for the cellulose acylate film.

(Substitution Degree of Cellulose Acylate)

In the following, cellulose acylate produced from the aforementioned cellulose will be explained. The cellulose acylate is obtained by acylating hydroxyl groups of cellulose, with a substituent that may be any one from an acetyl group containing 2 carbon atoms to a substituent containing 22 carbon atoms. Cellulose acylate is not particularly restricted in a substitution degree in the hydroxyl groups of cellulose, but a substitution degree can be obtained by measuring and calculating a bonding degree of acetic acid and/or a fatty acid containing 3 to 22 carbon atoms, substituted on the hydroxyl groups of cellulose. The measurement may be executed according to ASTM D-817-91.

In cellulose acylate, the substitution degree in the hydroxyl groups of cellulose is not particularly restricted as described above, but is preferably within a range of from 2.50 to 3.00, more preferably from 2.56 to 3.00 and further preferably from 2.75 to 3.00. A higher acyl substitution degree allows to reduce the optical anisotropy of the film.

Among acetic acid and/or a fatty acid containing 3 to 22 carbon atoms, to be substituted on the hydroxyl groups of cellulose, an acyl group containing 2 to 22 carbon atoms may be an aliphatic group or an aryl group, and may be a single group or a mixture of plural groups. Examples thereof include an alkyl carbonyl ester, an alkenyl carbonyl ester, an aromatic carbonyl ester or an aromatic alkyl carbonyl ester of cellulose, each of which may further have a substituent. Preferred examples of such acyl group include acetyl, propionyl, butanoyl, heptanoyl, hexanoyl, octanoyl, decanoyl, dodecanoyl, tridecanoyl, tetradecanoyl, hexadecanoyl, octadecanoyl, iso-butanoyl, t-butanoyl, cyclohexanecarbonyl, oleoyl, benzoyl, naphthylcarbonyl, and cinnamoyl. Among these, acetyl, propionyl, butanoyl, dodecanoyl, octadecanoyl, t-butanoyl, oleoyl, benzoyl, naphthylcarbonyl, and cinnamoyl are preferable, and acetyl, propionyl and butanoyl are more preferable.

As a result of intensive investigations undertaken by the present inventors, it is found that, in the case where the acyl substituents on the hydroxyl groups of cellulose are substantially at least two kinds selected from an acetyl group, a propionyl group and a butanoyl group, the optical anisotropy of the cellulose acylate film can be reduced when the total substitution degree is within a range of from 2.50 to 3.00. The acyl substitution degree is more preferably from 2.60 to 3.00, and further preferably from 2.65 to 3.00.

(Polymerization Degree of Cellulose Acylate)

The cellulose acylate advantageously employed in the invention has a polymerization degree, in a viscosity-average polymerization degree, of from 180 to 700, and, in the case of cellulose acetate, it is more preferably from 180 to 550, further preferably from 180 to 400 and particularly preferably from 180 to 350. An excessively high polymerization degree increases the viscosity of a dope solution of cellulose acylate, whereby a film preparation by a casting method may become difficult. Also an excessively low polymerization degree reduces the strength of the prepared film. An average polymerization degree can be measured by a limit viscosity method proposed by Uda et al. (Kazuo Uda and Hideo Saito, J. of Soc. of Fiber Science and Technology, vol. 18, No. 1, p. 105-120, 1962), and described in detail in JP-A-9-95538. The optical film of the invention, prepared from cellulose acylate in which acyl substituents are substantially constituted of acetyl groups only and which has an average polymerization degree of from 180 to 550, can exhibit particularly satisfactory performances.

In cellulose acylate advantageously employed in the invention, a molecular weight distribution is evaluated by gel permeation chromatography, and preferably has a narrow distribution with a small dispersion index Mw/Mn (Mw: weight-average molecular weight, Mn: number-average molecular weight), preferably within a range of from 2.0 to 4.0, more preferably from 2.0 to 3.5, and most preferably from 2.3 to 3.3

Elimination of low-molecular components is effective as it reduces the viscosity than in ordinary cellulose acylate, in spite of an increase in the average molecular weight (polymerization degree). Cellulose acylate with reduced low-molecular components may be obtained by removing low-molecular components from cellulose acylate synthesized by an ordinary method. The removal of the low-molecular components may be executed by washing cellulose acylate with an appropriate organic solvent. In case of producing cellulose acylate with reduced low-molecular components, an amount of sulfuric acid catalyst in the acylation reaction is preferably regulated to 0.5 to 25 parts by weight, with respect to 100 parts by weight of cellulose. The sulfuric acid catalyst, employed in an amount of the aforementioned range, allows to synthesize cellulose acylate that is preferable also in the molecular weight distribution (having a uniform molecular weight distribution). At the manufacture of cellulose acylate, it has a water content preferably of 2 wt % or less, more preferably 1 wt % or less, and particularly preferably 0.7 wt % or less. Cellulose acylate generally contains water, normally about 2.5 to 5 wt %. In order to realize the aforementioned water content in the invention, a drying is necessary, and it may be executed by any method as long as a desired water content is attained. For the cellulose acylate to be employed in the invention, a raw material cotton and a synthesizing method are described in detail in Japan Institute of Invention and Innovation, Journal of Technical Disclosure (No. 2001-1745, issued Mar. 15, 2001, JIII), p. 7-12.

Cellulose acylate, having substituents, a substitution degree, a polymerization degree and a molecular weight distribution within the aforementioned ranges, may be employed singly or in a mixture of two or more different cellulose acylates.

(Additives to Optical Film)

In a solution for preparing the optical film of the invention, various additives (such as a compound for reducing optical anisotropy, a compound for increasing optical anisotropy, an agent for regulating wavelength-dependent dispersion, an ultraviolet absorber, a plasticizer, an anti-aging agent, fine particles and an optical characteristics regulating agent) may be added according to the purpose in each preparation step, and such additives will be explained below. Also such addition may be executed at any timing within a dope preparing process, or in an additive-adding step, to be added after a final adjustment step in the dope preparation process.

(Compound for Reducing Rth)

The optical film of the invention preferably contains at least a compound capable of reducing a retardation Rth(550) in the thickness direction of the film (such compound being hereinafter referred to as Rth reducing agent), within a range capable of meeting relations (8) and (9):

(8) $(Rth(A)-Rth(0))/A \leq -1.0$; and (9) $0.01 \leq A \leq 30$.

The relations (8) and (9) are more preferably represented as:

(8') $(Rth(A)-Rth(0))/A \leq -2.0$; and (9') $0.01 \leq A \leq 20$, and further preferably represented as:

(8") $(Rth(A)-Rth(0))/A \leq -3.0$; and (9") $0.01 \leq A \leq 15$, wherein:

Rth(A) means Rth(nm) at 550 nm of an optical film containing the compound capable of reducing Rth(550) by A %;

Rth(0) means Rth(nm) at 550 nm of an optical film not containing the compound capable of reducing Rth(550); and A means a weight (%) of the compound capable of reducing Rth(550) with respect to the weight (taken as 100) of the raw material polymer of the optical film.

(Structural Characteristics of Rth Reducing Agent)

A structure and a function of the Rth reducing agent, in the optical film of the invention, will be explained below. In order to sufficiently reduce the optical anisotropy and to bring both Re and Rth close to zero, it is preferable to utilize a compound capable of suppressing the high-molecular polymer in the optical film from being aligned in the in-plane direction and in the thickness direction. Also the compound for reducing optical anisotropy is preferably sufficiently soluble mutually with the high-molecular polymer and is preferably free from a rod-shaped structure or a planar structure in the compound itself. More specifically, when the compound has plural planar functional groups such as aromatic groups, such functional groups preferably are not positioned on a common plane but are provided in a non-planar structure.

The Rth reducing agent may or may not include an aromatic group. Also the Rth reducing agent has a molecular weight preferably within a range of from 150 to 3,000, more preferably from 170 to 2,000, and particularly preferably from 200 to 1,000. Within such molecular weight range, it may have a specified monomer structure, or an oligomer structure or a polymer structure in which a plurality of such monomer units are bonded.

(Log P Value)

In the preparation of an optical film of the invention, in case of employing a hydrophilic polymer such as cellulose acylate as a raw material, it is preferable to utilize, as the Rth reducing agent for suppressing the high-molecular polymer in the film from being aligned in the in-plane direction and in the thickness direction, a compound having an octanol-water distribution coefficient (log P value) within a range of from 0 to 7. A compound having a log P value of 7 or less shows an excellent mutual solubility with the high-molecular polymer, thus not causing drawbacks such as white turbidity or dusty surface in the film. Also a compound having a log P value of 0 or more does not become excessively hydrophilic, thus not causing a drawback such as a deteriorated water resistance of the cellulose acetate film. The log P value is more preferably within a range of from 1 to 6, and particularly preferably from 1.5 to 5.

The octanol-water distribution coefficient (log P value) can be measured by a flask shaking method described in JIS Z-7260-107(2000). Also the octanol-water distribution coefficient (log P value) may be estimated, instead of an actual measurement, by a chemical calculational method or an empirical method. The preferred calculational methods include Crippen's fragmentation method {J. Chem. Inf. Comput. Sci., vol. 27, p. 21(1987)}, Viswanadhan's fragmentation method {J. Chem. Inf. Comput. Sci., vol. 29, p. 163(1989)}, and Broto's fragmentation method {Eur. J. Med. Chem.—Chim. Theor., vol. 19, p. 71(1984)}, among which Crippen's fragmentation method is more preferable. When a compound shows different log P values by the measuring method and the calculational method, whether such compound is within the scope of the invention is to be judged by Crippen's fragmentation method.

(Physical Properties of Rth Reducing Agent)

The Rth reducing agent is preferably a liquid at 25° C. or a solid having a melting point of from 25 to 250° C., and more preferably a liquid at 25° C. or a solid having a melting point of from 25 to 200° C. Also the Rth reducing agent preferably does not evaporate in the steps of dope casting and drying in preparing the high-molecular polymer film.

The Rth reducing agent is preferably added in an amount of from 0.01 to 30 wt % of the high-molecular polymer, more preferably from 0.05 to 25 wt % and particularly preferably from 0.1 to 20 wt %.

The Rth reducing agent may be employed singly or in a mixture of two or more compounds in an arbitrary ratio. The Rth reducing agent may be added at any step in the dope preparing process, or at the end of the dope preparing process.

For such Rth reducing agent, compounds disclosed in JP-A-2005-139304 may be employed advantageously. Among these, preferred is a compound represented by a following formula (1), which will be explained below:

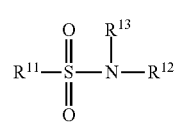

Formula (1)

In the formula (1), $R^{11}$ represents an alkyl group or an aryl group; and $R^{12}$ and $R^{13}$ each independently represents a hydrogen atom, an alkyl group or an aryl group. $R^{11}$, $R^{12}$ and $R^{13}$ particularly preferably contain 10 or more carbon atoms in total, and the alkyl group or the aryl group may further have a substituent.

The substituent is preferably a fluorine atom, an alkyl group, an aryl group, an alkoxy group, a sulfone group or a sulfonamide group, and particularly preferably an alkyl group, an aryl group, an alkoxy group, a sulfone group or a sulfonamide group.

The alkyl group may be linear, branched or cyclic, and preferably contains 1 to 25 carbon atoms, more preferably 6 to 25 carbon atoms and particularly preferably 6 to 20 carbon atoms (such as methyl, ethyl, propyl, isopropyl, butyl, isobutyl, t-butyl, amyl, isoamyl, t-amyl, hexyl, cyclohexyl, heptyl, octyl, bicyclooctyl, nonyl, adamantyl, decyl, t-octyl, undecyl, dodecyl, tridecyl, tetradecyl, pentadecyl, hexadecyl, heptadecyl, octadecyl, nonadecyl or didecyl).

The aryl group preferably contains 6 to 30 carbon atoms, and particularly preferably 6 to 24 carbon atoms (such as phenyl, biphenyl, terphenyl, naphthyl, binaphthyl or triphenylphenyl). Preferable examples of the compound represented by the formula (1) are shown below, but the present invention is not limited to such specific examples.

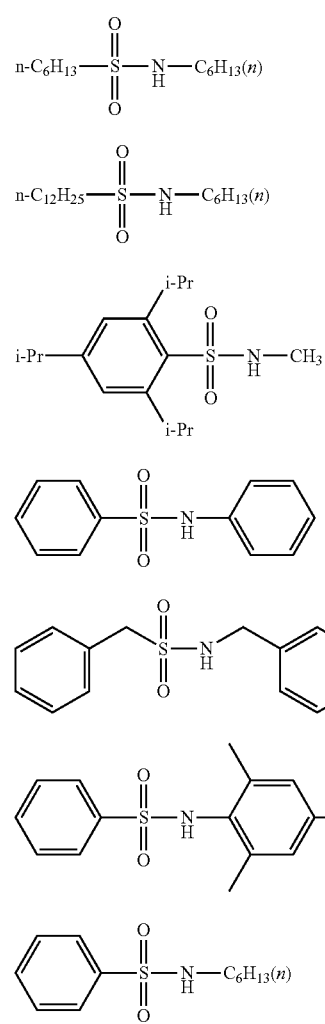

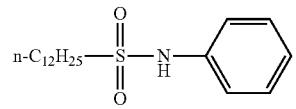

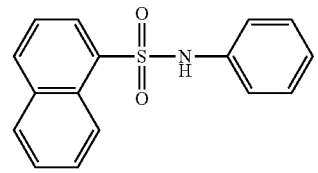

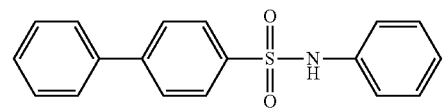

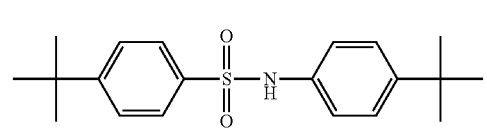

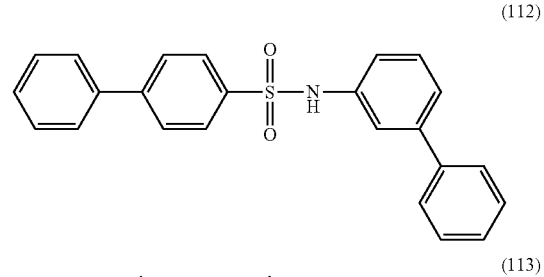

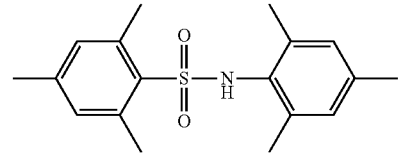

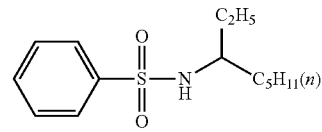

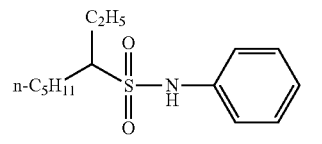

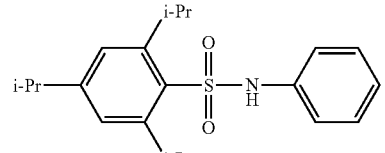

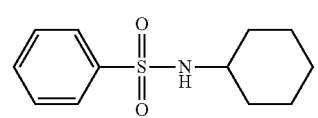

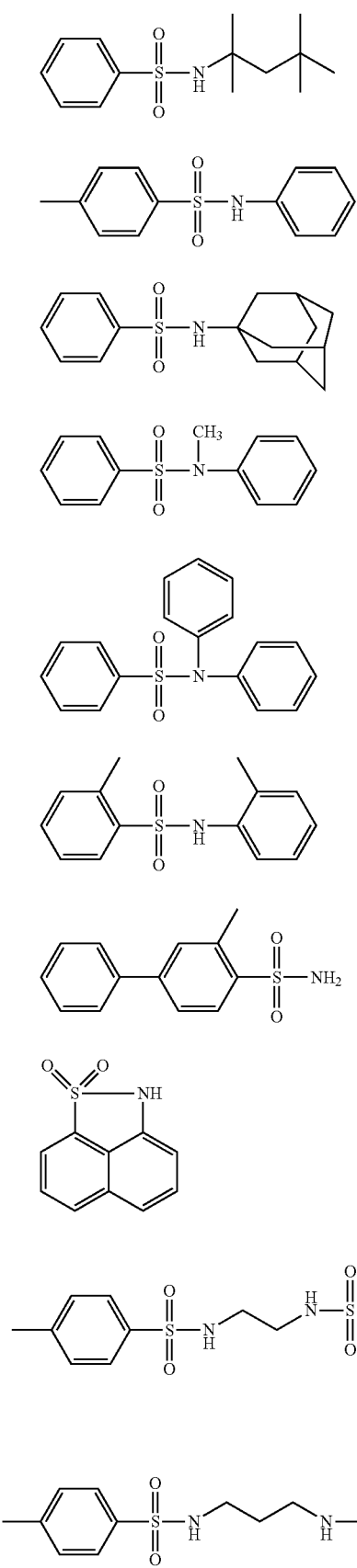
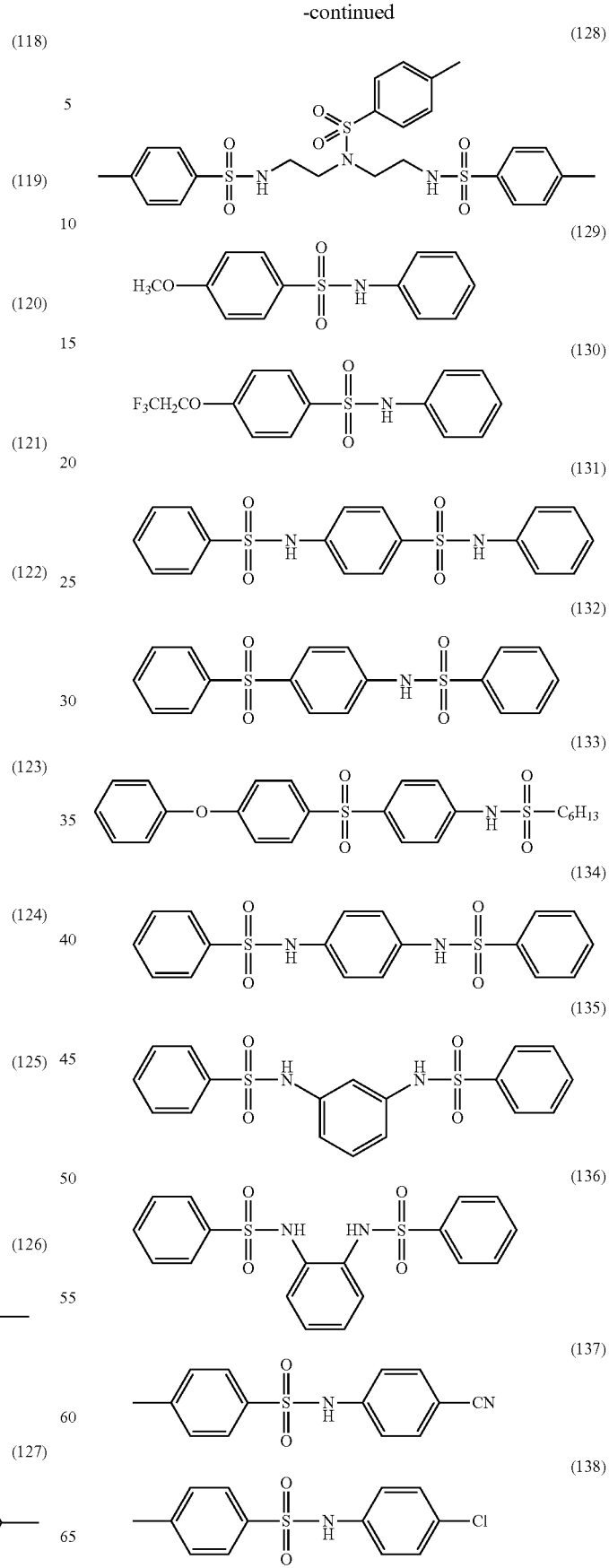

-continued
(139)
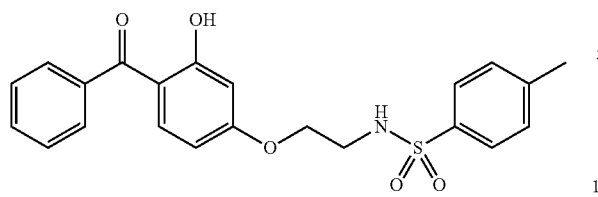
(140)
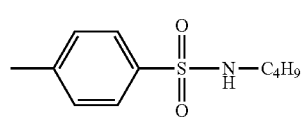
(141)
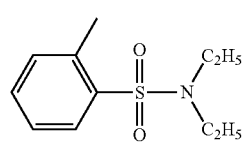
(142)
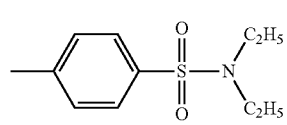
(143)
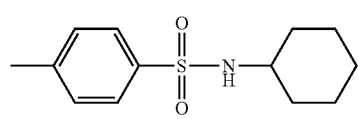
(144)
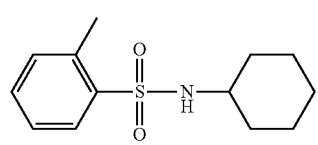
(145)
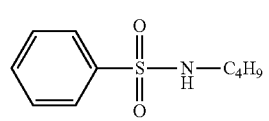
(146)
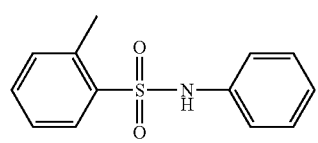
(147)
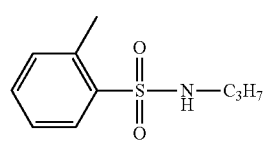
(148)
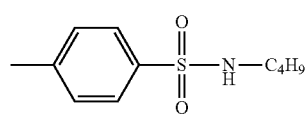
(149)
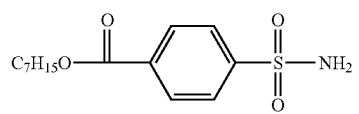
-continued
(150)
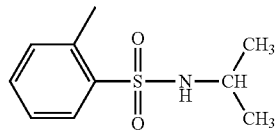
(151)
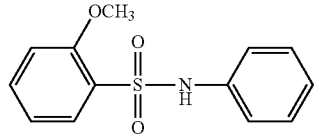
(152)
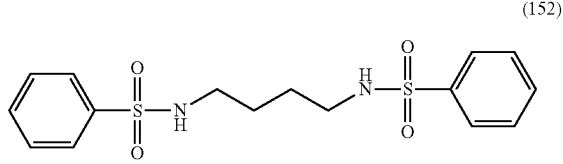
(153)
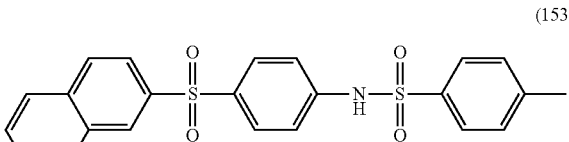
(154)
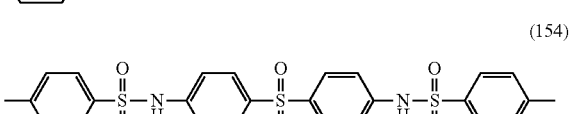
(155)
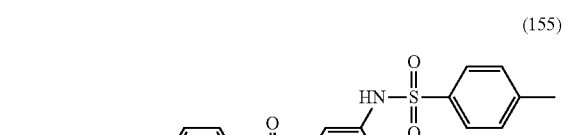
(156)
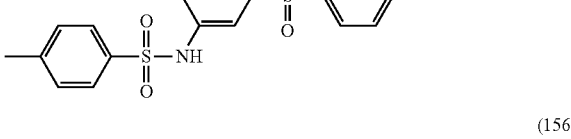
(157)
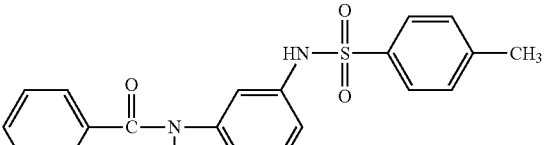
(158)

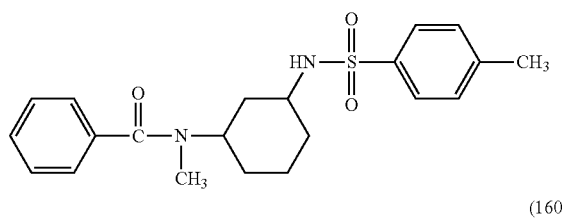
(159)

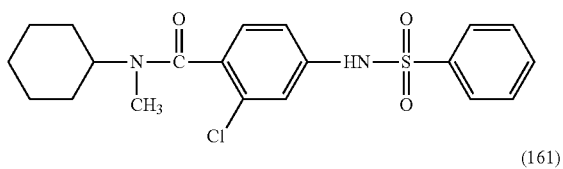
(160)

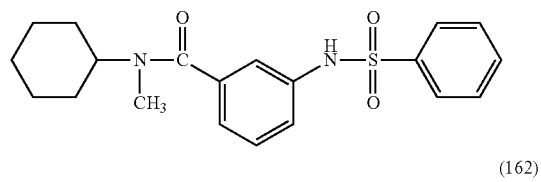
(161)

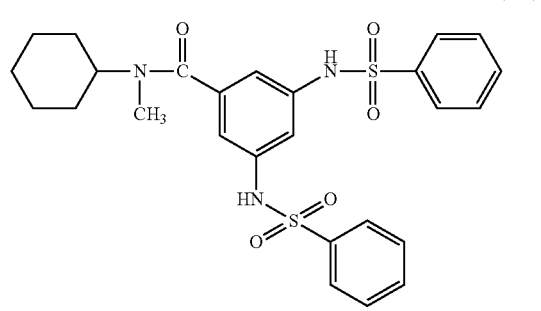
(162)

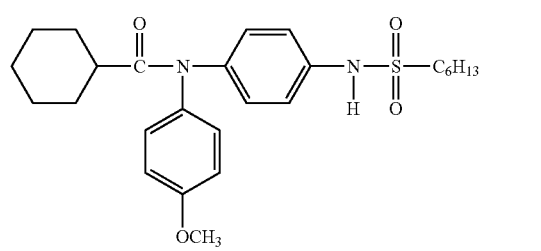
(163)

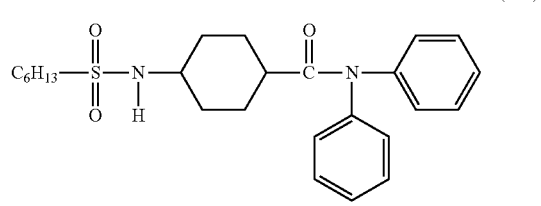
(164)

Other examples of the Rth reducing agent include a compound represented by a following formula (2):

Formula (2)

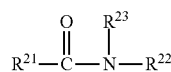

In the formula (2), $R^{21}$ represents an alkyl group or an aryl group; and $R^{22}$ and $R^{23}$ each independently represents a hydrogen atom, an alkyl group or an aryl group. The alkyl group may be linear, branched or cyclic, and preferably contains 1 to 20 carbon atoms, more preferably 1 to 15 carbon atoms and most preferably 1 to 12 carbon atoms. The cyclic alkyl group is particularly preferably a cyclohexyl group. The aryl group preferably contains 6 to 36 carbon atoms, and more preferably 6 to 24 carbon atoms. Also $R^{21}$ and $R^{22}$ preferably contain 10 or more carbon atoms in total, and the alkyl group or the aryl group may further have a substituent.

The alkyl group or aryl group may have a substituent, and such substituent is preferably a halogen atom (such as chlorine, bromine, fluorine or iodine), an alkyl group, an aryl group, an alkoxy group, an aryloxy group, an acyl group, an alkoxycarbonyl group, an aryloxycarbonyl group, an acyloxy group, a sulfonylamino group, a hydroxyl group, a cyano group, an amino group or an acylamino group, more preferably a halogen atom, an alkyl group, an aryl group, an alkoxy group, an aryloxy group, a sulfonylamino group or an acylamino group, and particularly preferably an alkyl group, an aryl group, a sulfonylamino group or an acylamino group.

Preferable examples of the compound represented by the formula (2) are shown below, but the present invention is not limited to such specific examples.

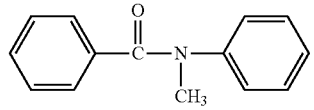
(201)

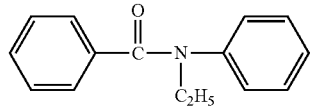
(202)

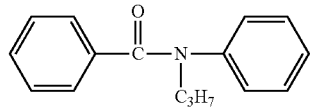
(203)

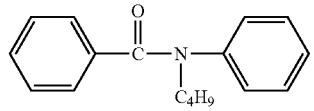
(204)

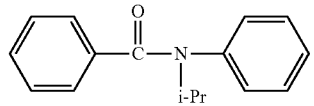
(205)

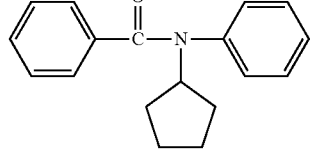
(206)

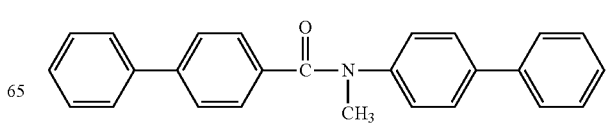
(207)

-continued
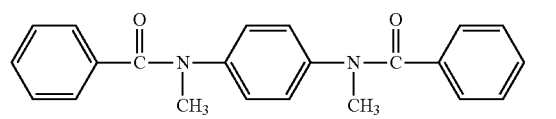 (208)
 (209)
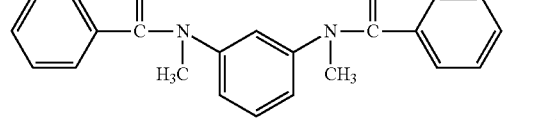 (210)
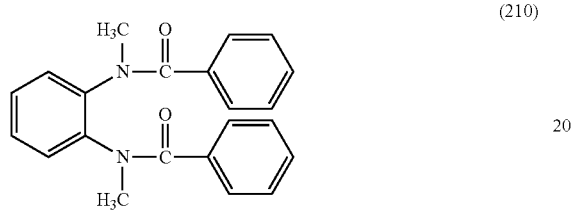 (211)
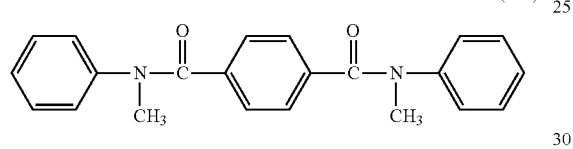 (212)
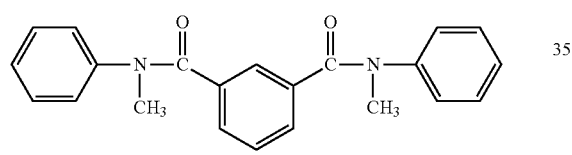 (213)
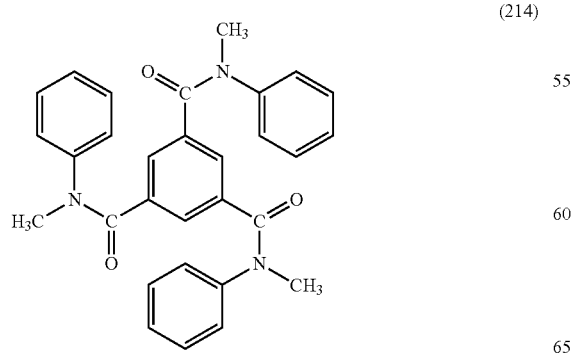 (214)
-continued
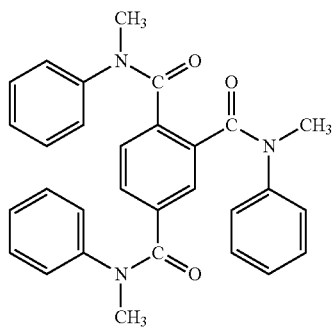 (215)
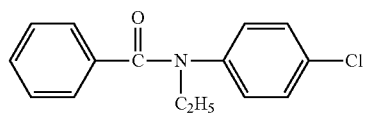 (216)
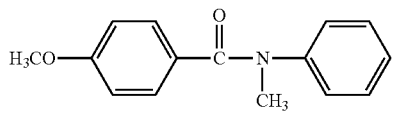 (217)
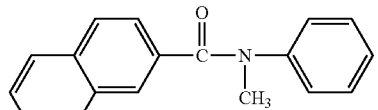 (218)
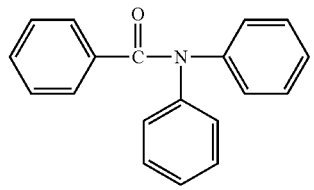 (219)
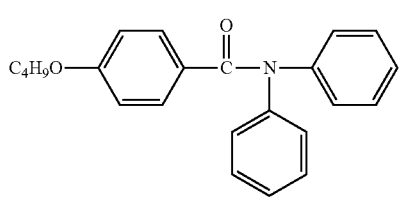 (220)
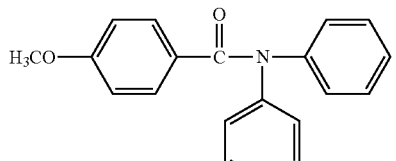 (221)
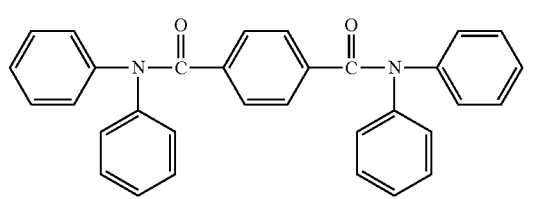 (222)

(223)
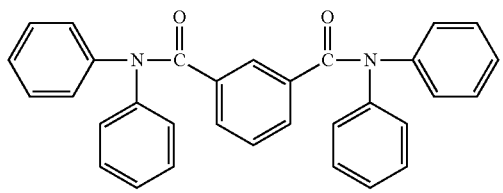
(224)
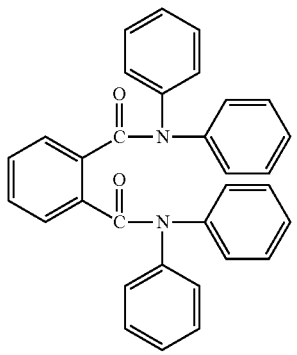
(225)
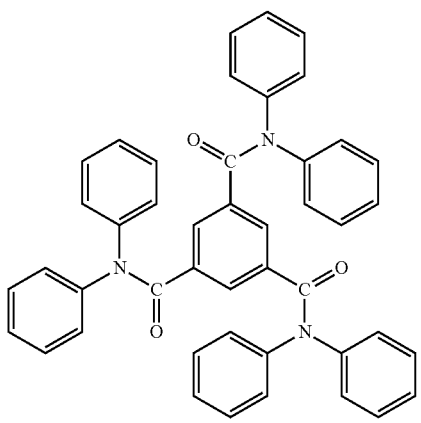
(226)
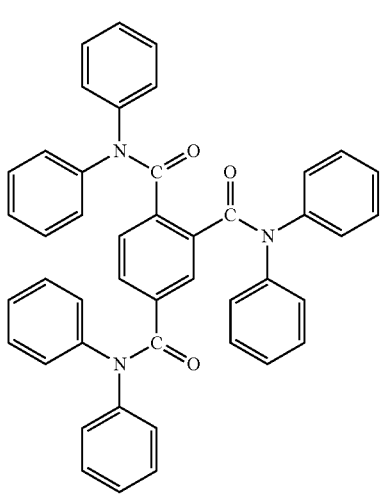
(227)
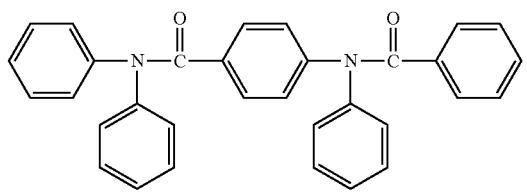
(228)
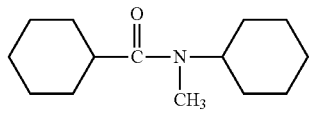
(229)
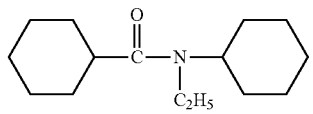
(230)
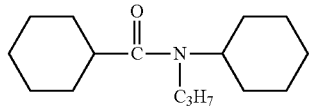
(231)
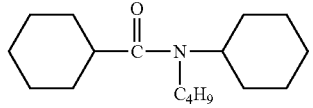
(232)
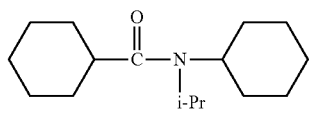
(233)
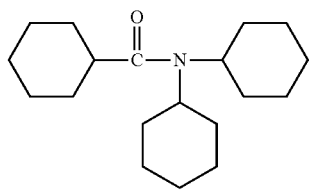
(234)
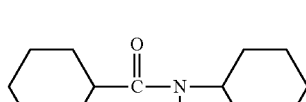
(235)
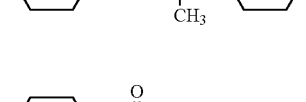
(236)
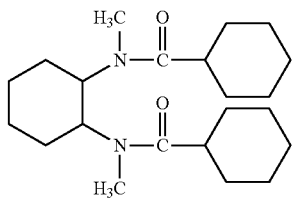

(237)
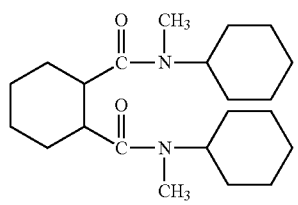
(238)
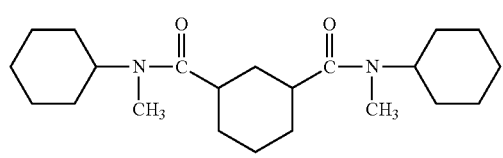
(239)
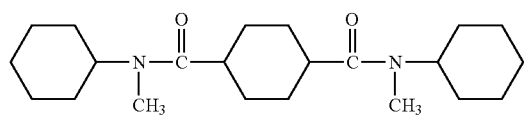
(240)
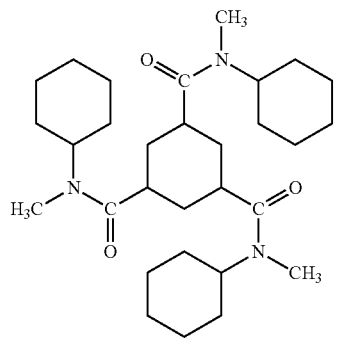
(241)
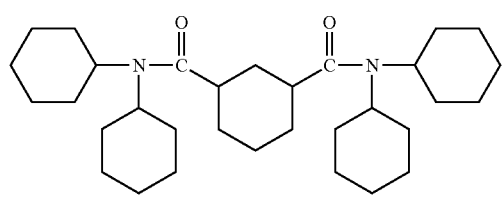
(242)
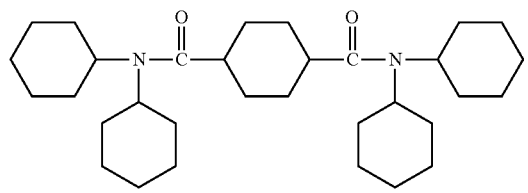
(243)
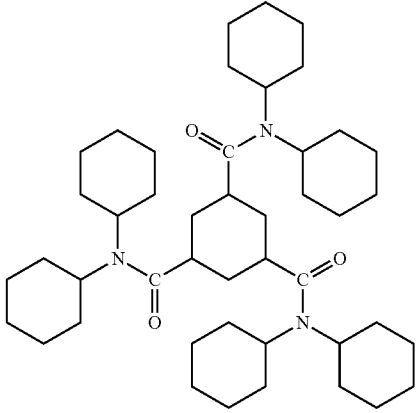
(244)
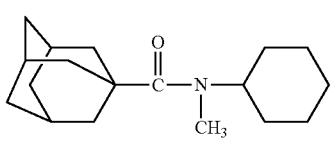
(245)
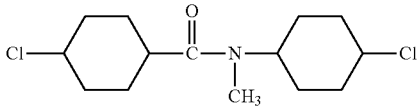
(246)
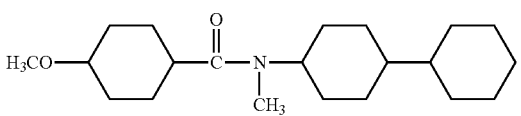
(247)
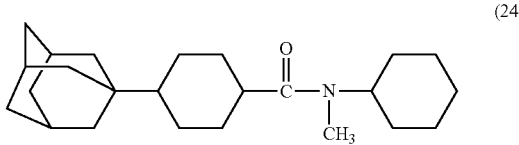
(248)
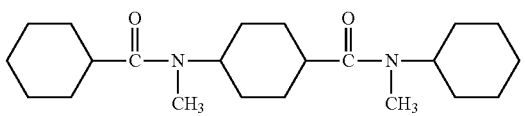
(249)
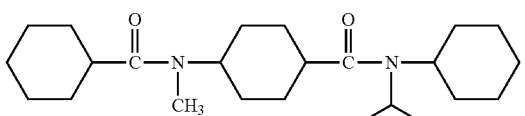
(250)
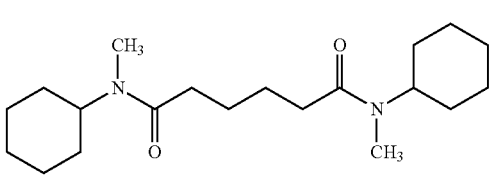

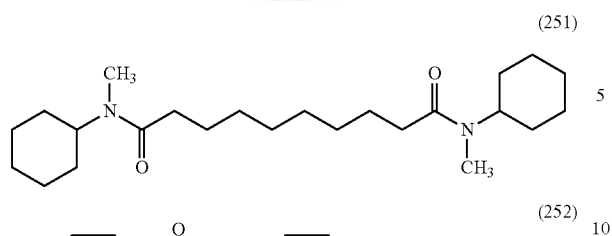
(251)
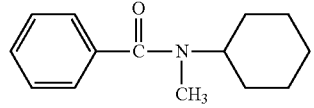
(252)
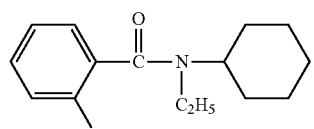
(253)
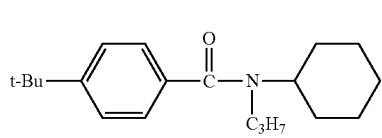
(254)
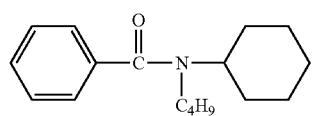
(255)
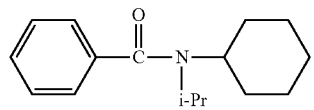
(256)
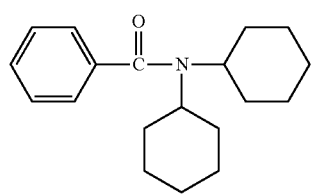
(257)
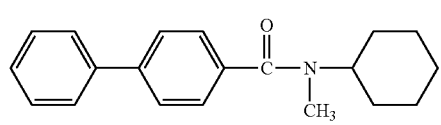
(258)
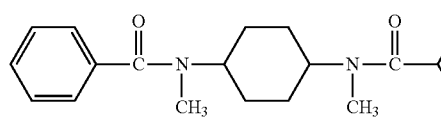
(259)
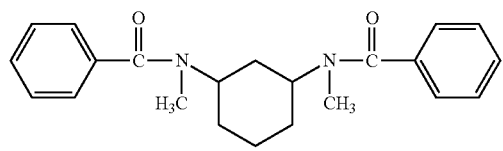
(260)
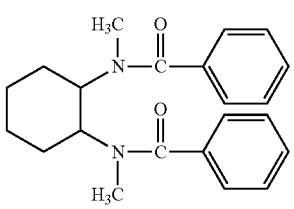
(261)
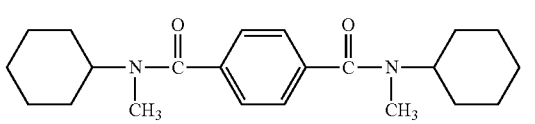
(262)
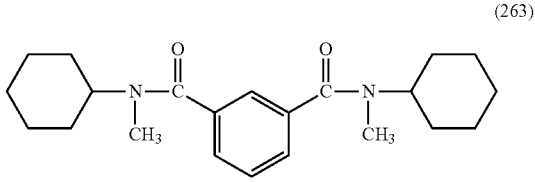
(263)
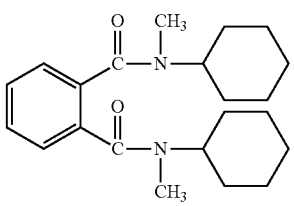
(264)
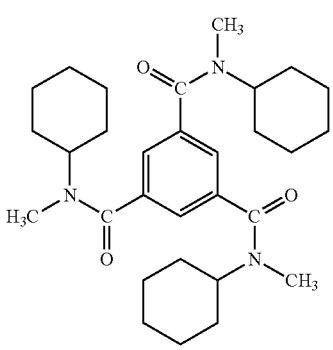
(265)
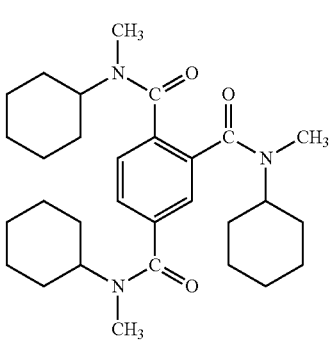
(266)
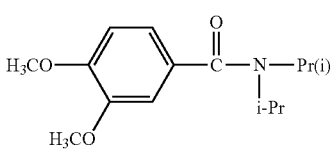
(267)

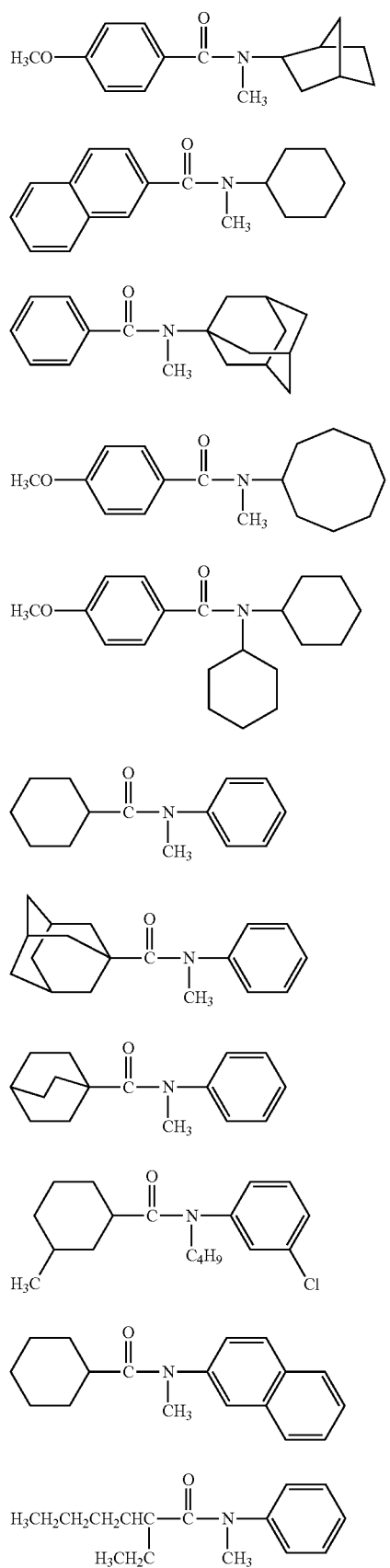
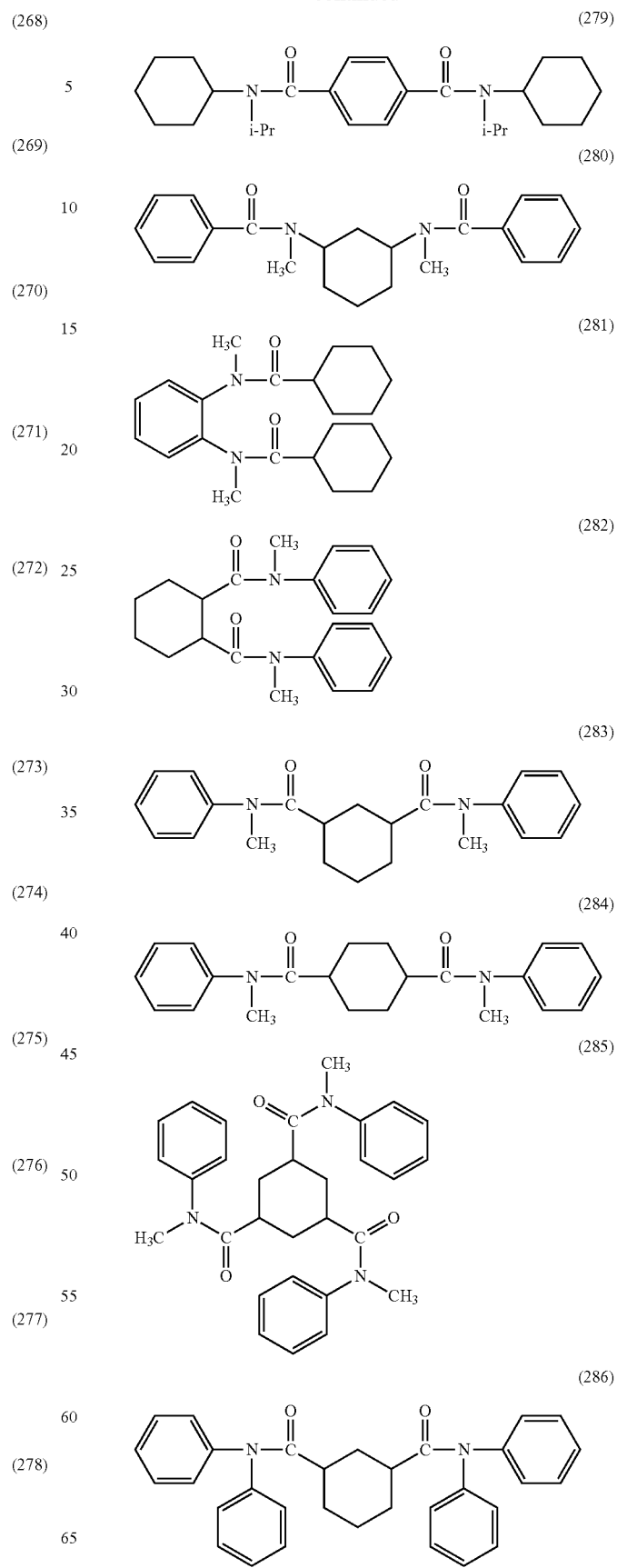

(287) 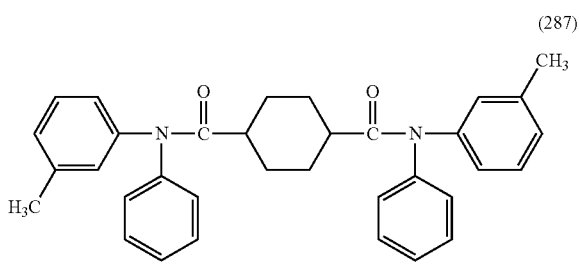

(288) 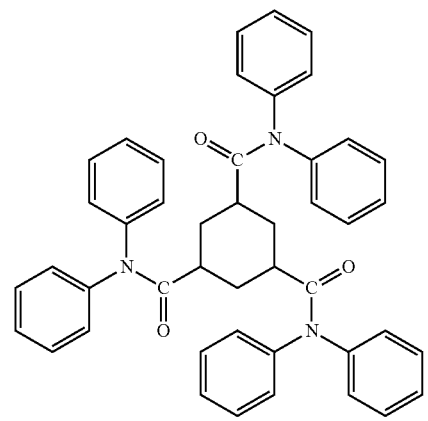

(289) 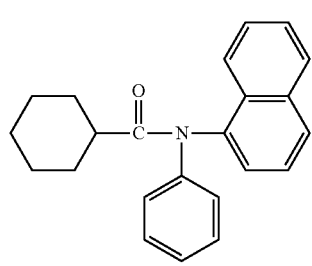

(290) 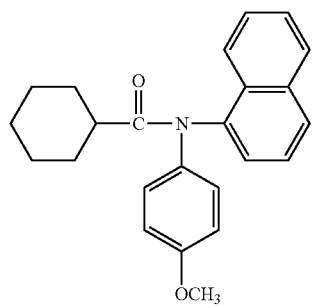

(291) 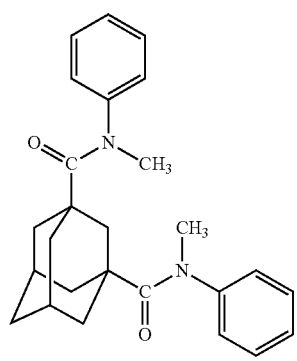

(292) 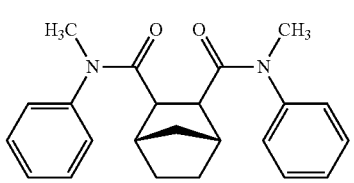

(Wavelength-Dependent Dispersion Regulating Agent)

The optical film of the invention preferably contains, in case of increasing the optical anisotropy at the shorter wavelength side, at least a compound capable of increasing ΔRth and represented by a following formula (10) (such compound being hereinafter called a wavelength-dependent dispersion regulating agent), within a range capable of meeting relations (11) and (12). Though depending on the type of polymer employed as the raw material for the optical film and on a combination with other additives such as the Rth reducing agent, it is preferable, in case of increasing Rth at the shorter wavelength side (class B or C in FIGS. 14A and 14B), to increase the amount of the wavelength-dependent dispersion regulating agent with respect to a unit amount of the raw material polymer for the film. On the other hand, in case of decreasing Rth at the shorter wavelength side (class A or D in FIGS. 14A and 14B), it is preferable to decrease the amount of the wavelength-dependent dispersion regulating agent or not to use the same:

(10) ΔRth=Rth(450)−Rth(650);
(11) (ΔRth(B)−ΔRth(0))/B≥1.0; and
(12) 0.01≤B≤30.

The relations (11) and (12) are more preferably represented as:

(11') (ΔRth(B)−ΔRth(0))/B≥5.0; and
(12') 0.05≤B≤20, and further preferably represented as:

(11") (ΔRth(B)−ΔRth(0))/B≥10.0; and
(12") 0.1≤B≤10, wherein:

ΔRth(B) means ΔRth(nm) of an optical film containing the compound capable of increasing ΔRth, by B %;

ΔRth(0) means ΔRth(nm) of an optical film not containing the compound capable of increasing ΔRth; and B means a weight (%) of the compound capable of increasing ΔRth with respect to the weight (taken as 100) of the raw material polymer of the optical film.

As the wavelength-dependent dispersion regulating agent, it is preferable to use at least a compound having an absorption within an ultraviolet region of from 200 to 400 nm A compound having an absorption within an ultraviolet region of from 200 to 400 nm has wavelength-dependent dispersion characteristics showing an absorbance larger in a shorter wavelength side than in a longer wavelength side. When such compound is isotropically present inside the optical film, the wavelength-dependent dispersion of the birefringence of the compound itself and also of the optical characteristics is estimated to be larger in the shorter wavelength side, as in the wavelength-dependent dispersion of the absorbance.

Therefore, the aforementioned compound, which has an absorption in the ultraviolet region of from 200 to 400 nm and which is assumed to have a wavelength-dependent dispersion of the optical characteristics of the compound itself larger at the shorter wavelength side, allows to regulate the wavelength-dependent dispersion of the optical characteristics of the optical film. For this purpose, the compound for regulating the wavelength-dependent dispersion is required to be sufficiently soluble mutually with the raw material polymer of the film. In such compound, the absorption range in the ultraviolet region is preferably from 200 to 400 nm, more preferably from 220 to 395 nm, and further preferably from 240 to 390 nm.

In recent liquid crystal displays for use in a television, a notebook personal computer or a mobile terminal, optical members to be employed therein are being required to have a high transmittance in order to obtain a higher luminance with a lower electric power. In consideration of this fact, the wavelength-dependent dispersion regulating agent, to be added in the optical film, is required to have a satisfactory spectral transmittance. In the optical film of the invention, it preferably has a spectral transmittance, at a wavelength of 380 nm, of from 45 to 95%, and a spectral transmittance, at a wavelength of 350 nm, of 10% or less.

The aforementioned wavelength-dependent dispersion regulating agent, advantageously employed in the invention, preferably has a molecular weight of from 250 to 1,000 in consideration of volatility, more preferably from 260 to 800, further preferably from 270 to 800, and particularly preferably from 300 to 800. Within such molecular weight range, it may have a specified monomer structure, or an oligomer structure or a polymer structure in which a plurality of such monomer units are bonded.

The aforementioned wavelength-dependent dispersion regulating agent, advantageously employed in the invention, is preferably employed in an amount of from 0.01 to 30 wt % with respect to the raw material polymer of the film, more preferably from 0.1 to 20 wt % and particularly preferably from 0.2 to 10 wt %.

(Method of Addition of Wavelength-Dependent Dispersion Regulating Agent)

The wavelength-dependent dispersion regulating agent may be employed singly or in a mixture of two or more compounds in an arbitrary ratio. The wavelength-dependent dispersion regulating agent may be added at any step in the dope preparing process, or at the end of the dope preparing process.

Specific examples of the wavelength-dependent dispersion regulating agent, advantageously employed in the invention, include a benzotriazole compound, a benzophenone compound, a cyano group-containing compound, an oxybenzophenone compound, a salicylate ester compound and a nickel complex salt compound, but the present invention is not limited to such compounds.

Among the benzotriazole compounds, those represented by a following formula (3) are preferably employed as the wavelength-dependent dispersion regulating agent of the invention:

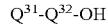   Formula (3)

wherein $Q^{31}$ represents a nitrogen-containing aromatic heterocycle; and $Q^{32}$ represents an aromatic ring.

$Q^{31}$ represents a nitrogen-containing aromatic heterocycle, preferably a 5- to 7-membered nitrogen-containing aromatic heterocycle, and more preferably a 5- to 6-membered nitrogen-containing aromatic heterocycle, such as imidazole, pyrrazole, triazole, tetrazole, thiazole, oxazole, selenazole, benzotriazole, benzothiazole, benzoxazole, benzoselenazole, thiadiazole, oxadiazole, naphthothiazole, naphthooxazole, azabenzimidazole, purin, pyridine, pyrazine, pyrimidine, pyridazine, triazine, triazaindene or tetrazaindene, and further preferably a 5-membered nitrogen-containing aromatic heterocycle, such as imidazole, pyrrazole, triazole, tetrazole, thiazole, oxazole, benzotriazole, benzothiazole, benzoxazole, thiadiazole, or oxadiazole, and particularly preferably benzotriazole.

The nitrogen-containing aromatic heterocycle represented by $Q^{31}$ may further have a substituent, to which applicable is a substituent T to be explained later. Also when plural substituents are present, they may be mutually condensed to further form a ring.

An aromatic ring represented by $Q^{32}$ may be an aromatic hydrocarbon ring or an aromatic heterocycle. Also it may be a single ring or may constitute condensed rings with another ring. The aromatic hydrocarbon ring is preferably a single- or two-ringed aromatic hydrocarbon ring containing 6 to 30 carbon atoms (such as a benzene ring or a naphthalene ring), more preferably an aromatic hydrocarbon ring containing 6 to 20 carbon atoms, further preferably an aromatic hydrocarbon ring containing 6 to 12 carbon atoms, and most preferably a benzene ring.

The aromatic heterocycle is preferably an aromatic heterocycle containing a nitrogen atom or a sulfur atom. Specific examples of the heterocycle include thiophene, imidazole, pyrrazole, pyridine, pyrazine, pyridazine, triazole, triazine, indole, indazole, purin, thiazoline, thiazole, thiadiazole, oxazoline, oxazole, oxadiazole, quinoline, isoquinoline, phthalazine, naphthylidine, quinoxaline, quinazoline, cinnoline, pteridine, acridine, phenanthroline, phenazine, tetrazole, benzimidazole, benzoxazole, benzothiazole, benzotriazole and tetrazaindene. The aromatic heterocycle is preferably pyridine, triazine or quinoline.

The aromatic ring represented by $Q^{32}$ is preferably an aromatic hydrocarbon ring, more preferably a naphthalene ring or a benzene ring, and particularly preferably a benzene ring. $Q^{32}$ may further have a substituent, preferably a substituent T shown below.

Examples of the substituent T include an alkyl group (preferably containing 1 to 20 carbon atoms, more preferably containing 1 to 12 carbon atoms and particularly preferably containing 1 to 8 carbon atoms, such as methyl, ethyl, i-propyl, t-butyl, n-octyl, n-decyl, n-hexadecyl, cyclopropyl, cyclopentyl or cyclohexyl), an alkenyl group (preferably containing 2-20 carbon atoms, more preferably containing 2 to 12 carbon atoms and particularly preferably containing 2 to 8 carbon atoms, such as vinyl, allyl, 2-butenyl or 3-pentenyl), an alkinyl group (preferably containing 2-20 carbon atoms, more preferably containing 2 to 12 carbon atoms and particularly preferably containing 2 to 8 carbon atoms, such as propargyl or 3-pentinyl), an aryl group (preferably containing 6 to 30 carbon atoms, more preferably containing 6 to 20 carbon atoms and particularly preferably containing 6 to 12 carbon atoms, such as phenyl, p-methylphenyl or naphthyl), a substituted or non-substituted amino group (preferably containing 0 to 20 carbon atoms, more preferably containing 0 to 10 carbon atoms and particularly preferably containing 0 to 6 carbon atoms, such as amino, methylamino, dimethylamino, diethylamino or dibenzylamino), an alkoxy group (preferably containing 1-20 carbon atoms, more preferably containing 1 to 12 carbon atoms and particularly preferably containing 1 to 8 carbon atoms, such as methoxy, ethoxy, or butoxy), an aryloxy group (preferably containing 6-20 carbon atoms, more preferably containing 6 to 16 carbon atoms and particularly preferably containing 6 to 12 carbon atoms, such as phenyloxy, or 2-naphthyloxy), an acyl group (preferably containing 1 to 20 carbon atoms, more preferably containing 1 to 16 carbon atoms and particularly preferably containing 1 to 12 carbon atoms, such as acetyl, benzoyl, formyl or pivaloyl), an alkoxycarbonyl group (preferably containing 2 to 20 carbon atoms, more preferably containing 2 to 16 carbon atoms and particularly preferably containing 2 to 12 carbon atoms, such as methoxycarbonyl or ethoxycarbonyl), an aryloxycarbonyl group (preferably containing 7 to 20 carbon atoms, more preferably containing 7 to 16 carbon atoms and particularly preferably containing 7 to 10 carbon atoms, such as phenoxycarbonyl), an acyloxy group (preferably containing 2 to 20 carbon atoms, more preferably containing 2 to 16 carbon atoms and particularly preferably containing 2 to 10 carbon atoms, such as acetoxy or benzoyloxy), an acylamino group (preferably containing 2 to 20 carbon atoms, more preferably containing 2 to 16 carbon atoms and particularly preferably containing 2 to 10 carbon atoms, such as acetylamino or benzoylamino), an alkoxycarbonylamino group (preferably containing 2 to 20 carbon atoms, more preferably containing 2 to 16 carbon atoms and particularly preferably containing 2 to 12 carbon atoms, such as methoxycarbonylamino), an aryloxycarbonylamino group (preferably containing 7 to 20 carbon atoms, more preferably containing 7 to 16 carbon atoms and particularly preferably containing 7 to 12 carbon atoms, such as phenyloxycarbonylamino), a sulfonylamino group (preferably containing 1 to 20 carbon atoms, more preferably containing 1 to 16 carbon atoms and particularly preferably containing 1 to 12 carbon atoms, such as methanesulfonylamino or benzenesulfonylamino), a sulfamoyl group (preferably containing 0 to 20 carbon atoms, more preferably containing 0 to 16 carbon atoms and particularly preferably containing 0 to 12 carbon atoms, such as sulfamoyl, methylsulfamoyl, dimethylsulfamoyl or phenylsulfamoyl), a carbamoyl group (preferably containing 1 to 20 carbon atoms, more preferably containing 1 to 16 carbon atoms and particularly preferably containing 1 to 12 carbon atoms, such as carbamoyl, methylcarbamoyl, diethylcarbamoyl or phenylcarbamoyl), an alkylthio group (preferably containing 1 to 20 carbon atoms, more preferably containing 1 to 16 carbon atoms and particularly preferably containing 1 to 12 carbon atoms, such as methylthio, or ethylthio), an arylthio group (preferably containing 6 to 20 carbon atoms, more preferably containing 6 to 16 carbon atoms and particularly preferably containing 6 to 12 carbon atoms, such as phenylthio), a sulfonyl group (preferably containing 1 to 20 carbon atoms, more preferably containing 1 to 16 carbon atoms and particularly preferably containing 1 to 12 carbon atoms, such as mesyl or tosyl), a sulfinyl group (preferably containing 1 to 20 carbon atoms, more preferably containing 1 to 16 carbon atoms and particularly preferably containing 1 to 12 carbon atoms, such as methanesulfinyl or benzenesulfinyl), an ureido group (preferably containing 1 to 20 carbon atoms, more preferably containing 1 to 16 carbon atoms and particularly preferably containing 1 to 12 carbon atoms, such as ureido, methylureido or phenylureido), a phosphoric acid amide group (preferably containing 1 to 20 carbon atoms, more preferably containing 1 to 16 carbon atoms and particularly preferably containing 1 to 12 carbon atoms, such as diethylphosphoric acid amide or phenylphosphoric acid amide), a hydroxyl group, a mercapto group, a halogen atom (such as a fluorine atom, a chlorine atom, a bromine atom or an iodine atom), a cyano group, a sulfo group, a carboxyl group, a nitro group, a hydroxamic acid group, a sulfino group, a hydrazino group, an imino group, a heterocyclic group (preferably containing 1 to 30 carbon atoms, and more preferably containing 1 to 12 carbon atoms, and including a nitrogen atom, an oxygen atom, or a sulfur atom as a hetero atom, such as imidazolyl, pyridyl, quinolyl, furyl, piperidyl, morpholino, benzoxazolyl, benzimidazolyl or benzothiazolyl), and a silyl group (preferably containing 3 to 40 carbon atoms, more preferably containing 3 to 30 carbon atoms and particularly preferably containing 3 to 24 carbon atoms, such as trimethylsilyl or triphenylsilyl). These substituents may be further substituted. Also when two or more substituents are present, they may be mutually same or different. Also they may be mutually connected to form a ring, if possible.

The compound of the formula (3) is preferably represented by a following formula (3-1).

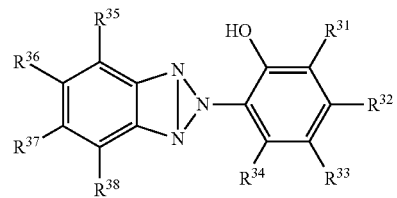

Formula (3-1)

In the formula (3-1), $R^{31}$, $R^{32}$, $R^{33}$, $R^{34}$, $R^{35}$, $R^{36}$, $R^{37}$ and $R^{38}$ each independently represent a hydrogen atom or a substituent, to which the aforementioned substituent T is applicable. Also such substituent may be further substituted with another substituent, and substituents may be mutually condensed to form a ring structure.

$R^{31}$ and $R^{33}$ each is preferably a hydrogen atom, an alkyl group, an alkenyl group, an alkinyl group, an aryl group, a substituted or non-substituted amino group, an alkoxy group, an aryloxy group, a hydroxyl group, or a halogen atom, more preferably a hydrogen atom, an alkyl group, an aryl group, an alkyloxy group, an aryloxy group, or a halogen atom, further preferably a hydrogen atom or an alkyl group containing 1 to 12 carbon atoms, and particularly preferably an alkyl group containing 1 to 12 carbon atoms (preferably containing 4 to 12 carbon atoms).

$R^{32}$ and $R^{34}$ each is preferably a hydrogen atom, an alkyl group, an alkenyl group, an alkinyl group, an aryl group, a substituted or non-substituted amino group, an alkoxy group, an aryloxy group, a hydroxyl group, or a halogen atom, more preferably a hydrogen atom, an alkyl group, an aryl group, an alkyloxy group, an aryloxy group, or a halogen atom, further preferably a hydrogen atom or an alkyl group containing 1 to 12 carbon atoms, and particularly preferably a hydrogen atom or a methyl group, and most preferably a hydrogen atom.

$R^{35}$ and $R^{38}$ each is preferably a hydrogen atom, an alkyl group, an alkenyl group, an alkinyl group, an aryl group, a substituted or non-substituted amino group, an alkoxy group, an aryloxy group, a hydroxyl group, or a halogen atom, more preferably a hydrogen atom, an alkyl group, an aryl group, an alkyloxy group, an aryloxy group, or a halogen atom, further preferably a hydrogen atom or an alkyl group containing 1 to 12 carbon atoms, and particularly preferably a hydrogen atom or a methyl group, and most preferably a hydrogen atom.

$R^{36}$ and $R^{37}$ each is preferably a hydrogen atom, an alkyl group, an alkenyl group, an alkinyl group, an aryl group, a substituted or non-substituted amino group, an alkoxy group, an aryloxy group, a hydroxyl group, or a halogen atom, more preferably a hydrogen atom, an alkyl group, an aryl group, an alkyloxy group, an aryloxy group, or a halogen atom, further preferably a hydrogen atom or a halogen atom, and particularly preferably a hydrogen atom or a chlorine atom.

The compound of the formula (3) is more preferably represented by a following formula (3-2).

Formula (3-2)
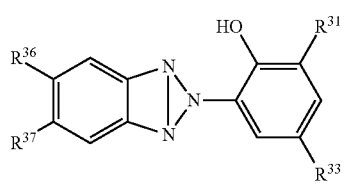
In the formula, $R^{31}$, $R^{33}$, $R^{36}$ and $R^{37}$ have same meaning and same preferable range as those in the formula (3-1).
Specific examples of the compound represented by the formula (3) are shown below, but the present invention is not at all restricted to such examples.
UV-1
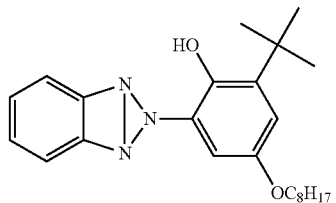
UV-2
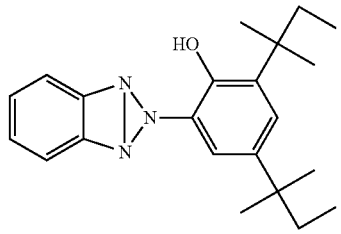
UV-3
UV-4
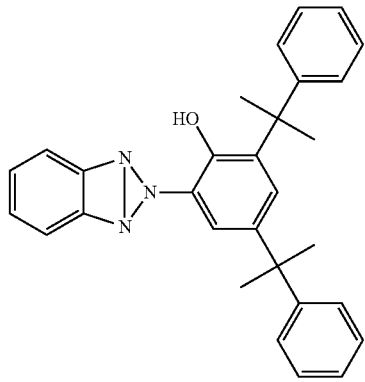
UV-5
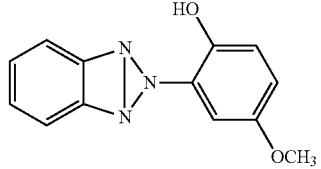
UV-6
UV-7
UV-8
UV-9
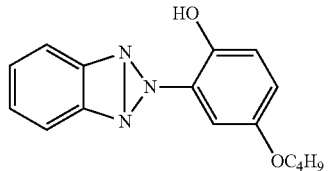
UV-10
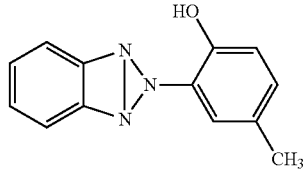
UV-11
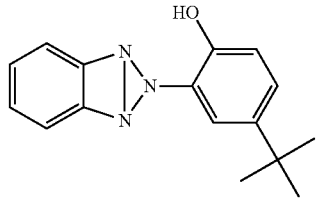
UV-12

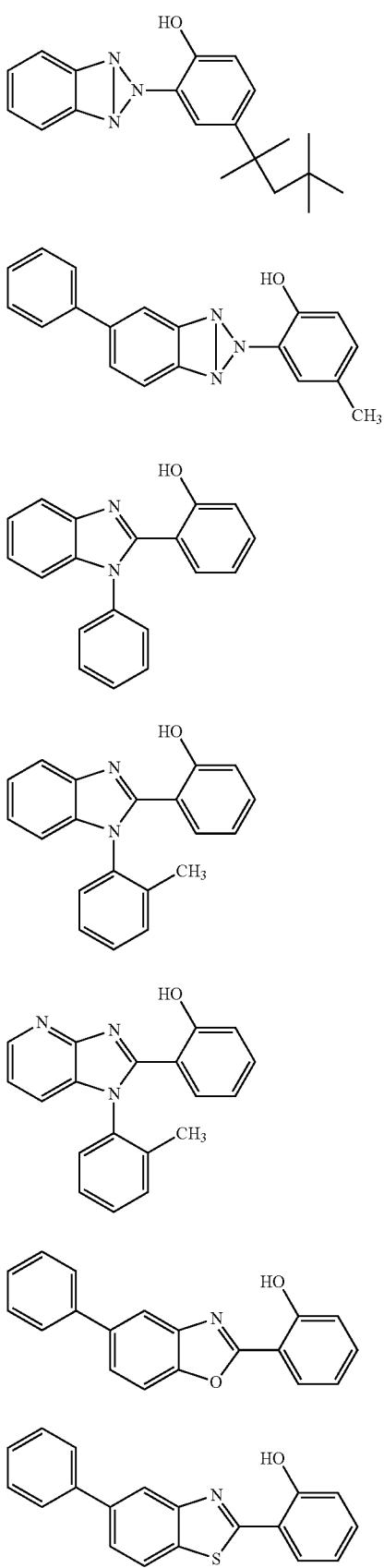

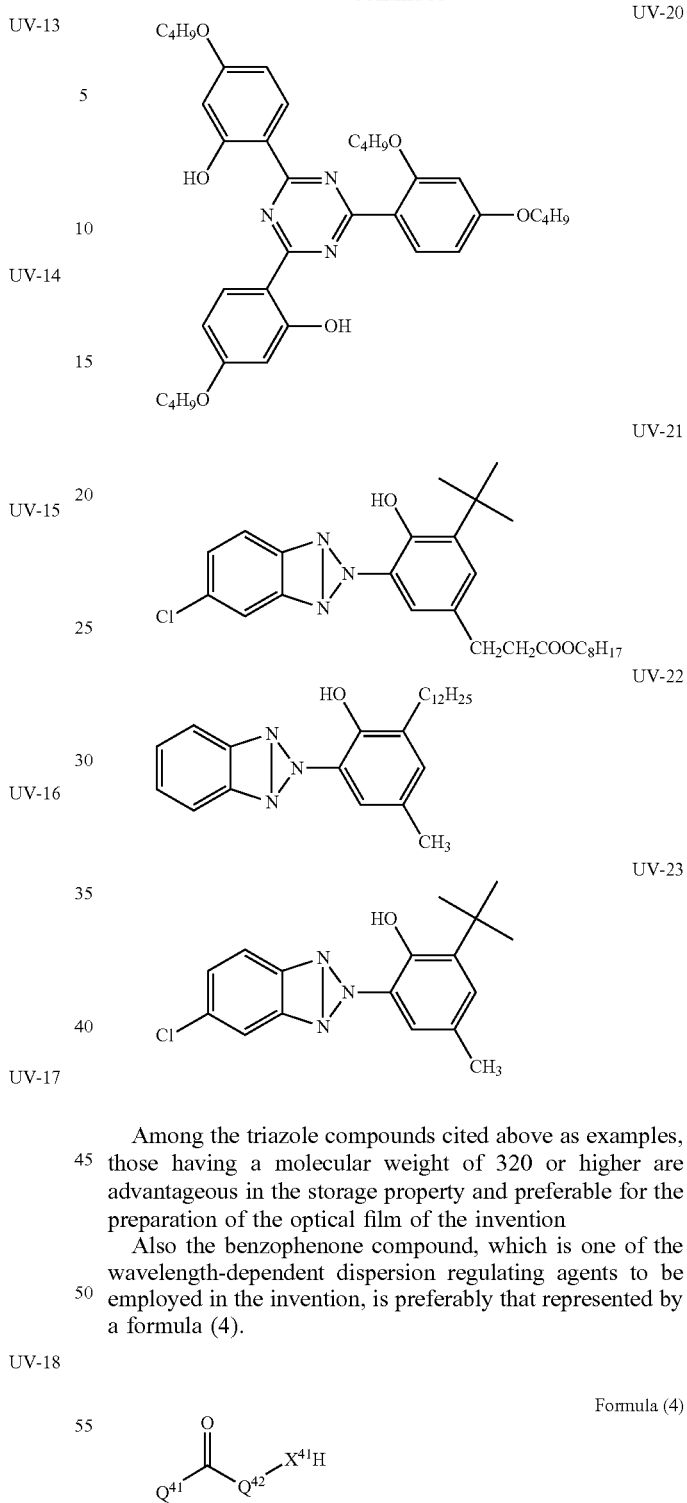

Among the triazole compounds cited above as examples, those having a molecular weight of 320 or higher are advantageous in the storage property and preferable for the preparation of the optical film of the invention Also the benzophenone compound, which is one of the wavelength-dependent dispersion regulating agents to be employed in the invention, is preferably that represented by a formula (4).

Formula (4)

In the formula, $Q^{41}$ and $Q^{42}$ each independently represents an aromatic ring; and $X^{41}$ represents $NR^{41}$ ($R^{41}$ representing a hydrogen atom or a substituent), an oxygen atom or a sulfur atom.

The aromatic ring represented by $Q^{41}$ and $Q^{42}$ may be an aromatic hydrocarbon ring or an aromatic heterocycle. These may be a single ring, or may form a condensed ring with another ring.

The aromatic hydrocarbon ring represented by $Q^{41}$ and $Q^{42}$ is preferably a monocyclic or bicyclic aromatic hydrocarbon ring containing 6 to 30 carbon atoms (such as a benzene ring or a naphthalene ring), more preferably an aromatic hydrocarbon ring containing 6 to 20 carbon atoms, further preferably an aromatic hydrocarbon ring containing 6 to 12 carbon atoms, and still preferably a benzene ring.

The aromatic heterocycle represented by $Q^{41}$ and $Q^{42}$ is preferably an aromatic heterocycle containing at least one of either one of an oxygen atom, a nitrogen atom and a sulfur atom. Specific examples of the heterocycle include furan, pyrrole, thiophene, imidazole, pyrazole, pyridine, pyrazine, pyridazine, triazole, triazine, indole, indazole, purin, thiazoline, thiazole, thiadiazole, oxazoline, oxazole, oxadiazole, quinoline, isoquinoline, phthalazine, naphthyridine, quinoxaline, quinazoline, cinnoline, pteridine, acridine, phenanthroline, phenazine, tetrazole, benzimidazole, benzoxazole, benzothiazole, benzotriazole, and tetrazaindene. The aromatic heterocycle is preferably pyridine, triazine or quinoline.

The aromatic ring represented by $Q^{41}$ and $Q^{42}$ is preferably an aromatic hydrocarbon ring, more preferably an aromatic hydrocarbon ring containing 6 to 10 carbon atoms, and further preferably a substituted or non-substituted benzene ring.

$Q^{41}$ and $Q^{42}$ may further have a substituent, which is preferably the aforementioned substituent T, but the substituent does not include a carboxylic acid, a sulfonic acid or a quaternary ammonium salt. Also when possible, substituents may be linked each other to form a cyclic structure.

$X^{41}$ represents $NR^{42}$ ($R^{42}$ representing a hydrogen atom or a substituent, to which the aforementioned substituent T may be applicable), an oxygen atom or a sulfur atom, and $X^{41}$ is preferably $NR^{42}$ ($R^{42}$ being preferably an acyl group, or a sulfonyl group, and such substituent may be further substituted), or oxygen, and particularly preferably oxygen.
(0123)

The compounds represented by the formula (4) are preferably those represented by a following formula (4-1).

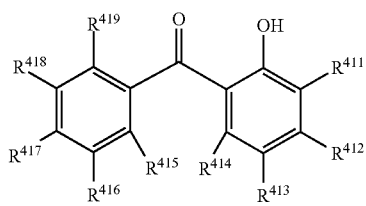

Formula (4-1)

In the formula, $R^{411}$, $R^{412}$, $R^{413}$, $R^{414}$, $R^{415}$, $R^{416}$, $R^{417}$, $R^{418}$ and $R^{419}$ each independently represents a hydrogen atom or a substituent, to which the aforementioned substituent T is applicable. Also these substituents may be further substituted with another substituent, or may be mutually condensed to form a cyclic structure.

$R^{411}$, $R^{413}$, $R^{414}$, $R^{415}$, $R^{416}$, $R^{418}$ and $R^{419}$ each is preferably a hydrogen atom, an alkyl group, an alkenyl group, an alkinyl group, an aryl group, a substituted or non-substituted amino group, an alkoxy group, an aryloxy group, a hydroxyl group, or a halogen atom, more preferably a hydrogen atom, an alkyl group, an aryl group, an alkyloxy group, an aryloxy group, or a halogen atom, further preferably a hydrogen atom or an alkyl group containing 1 to 12 carbon atoms, particularly preferably a hydrogen atom or a methyl group, and most preferably a hydrogen atom.

$R^{412}$ is preferably a hydrogen atom, an alkyl group, an alkenyl group, an alkinyl group, an aryl group, a substituted or non-substituted amino group, an alkoxy group, an aryloxy group, a hydroxyl group, or a halogen atom, more preferably a hydrogen atom, an alkyl group containing 1 to 20 carbon atoms, an amino group containing 0 to 20 carbon atoms, an alkoxy group containing 1 to 12 carbon atoms, an aryloxy group containing 6 to 12 carbon atoms, or a hydroxyl group, further preferably an alkoxy group containing 1 to 20 carbon atoms, and particularly preferably an alkoxy group containing 1 to 12 carbon atoms.

$R^{417}$ is preferably a hydrogen atom, an alkyl group, an alkenyl group, an alkinyl group, an aryl group, a substituted or non-substituted amino group, an alkoxy group, an aryloxy group, a hydroxyl group, or a halogen atom, more preferably a hydrogen atom, an alkyl group containing 1 to 20 carbon atoms, an amino group containing 0 to 20 carbon atoms, an alkoxy group containing 1 to 12 carbon atoms, an aryloxy group containing 6 to 12 carbon atoms, or a hydroxyl group, further preferably a hydrogen atom, or an alkyl group containing 1 to 20 carbon atoms (preferably containing 1 to 12 carbon atoms, more preferably containing 1 to 8 carbon atoms and further preferably a methyl group), and particularly preferably a methyl group or a hydrogen atom.

The compounds represented by the formula (4) are more preferably those represented by a following formula (4-2).

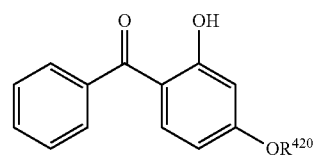

Formula (4-2)

In the formula, $R^{420}$ represents a hydrogen atom, a substituted or non-substituted alkyl group, a substituted or non-substituted alkenyl group, a substituted or non-substituted alkinyl group, or a substituted or non-substituted aryl group, and the aforementioned substituent T is applicable as the substituent. $R^{420}$ is preferably a substituted or non-substituted alkyl group, more preferably a substituted or non-substituted alkyl group containing 5 to 20 carbon atoms, further preferably a substituted or non-substituted alkyl group containing 5 to 12 carbon atoms (such as an n-hexyl group, a 2-ethylhexyl group, an n-octyl group, an n-decyl group, an n-dodecyl group, or a benzyl group), and particularly preferably a substituted or non-substituted alkyl group containing 6 to 12 carbon atoms (such as a 2-ethylhexyl group, an n-octyl group, an n-decyl group, an n-dodecyl group or a benzyl group).

The compounds represented by the formula (4) may be synthesized by a known method, described in JP-A-11-12219.

Specific examples of the compound represented by the formula (4) are shown below, but the present invention is not limited to those specific examples.

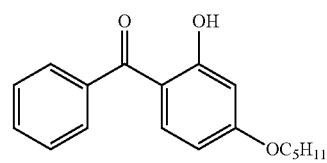

UV-101

-continued
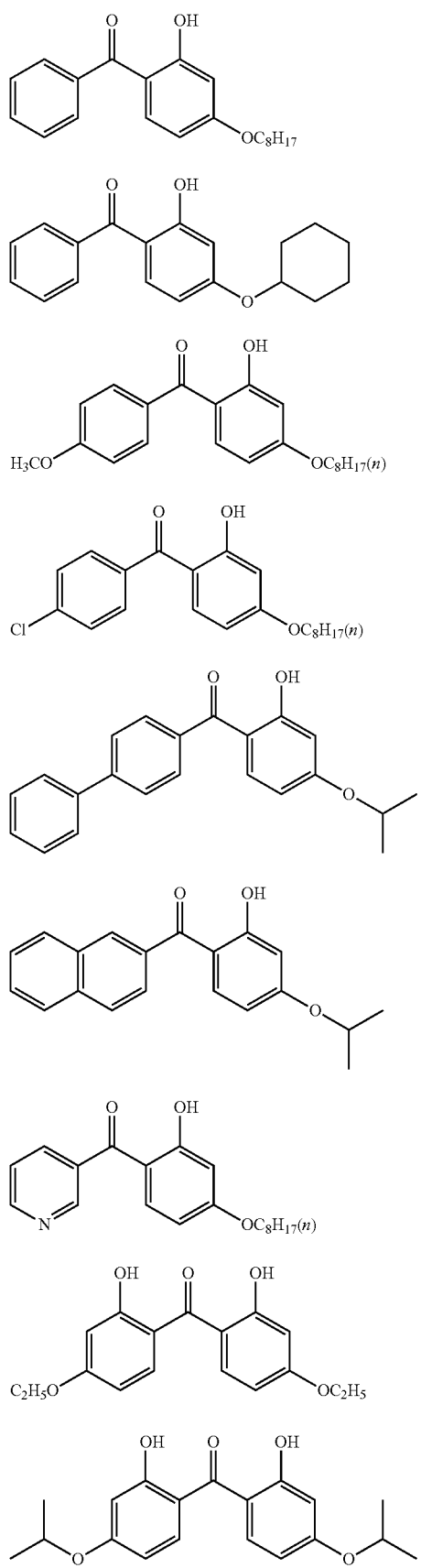
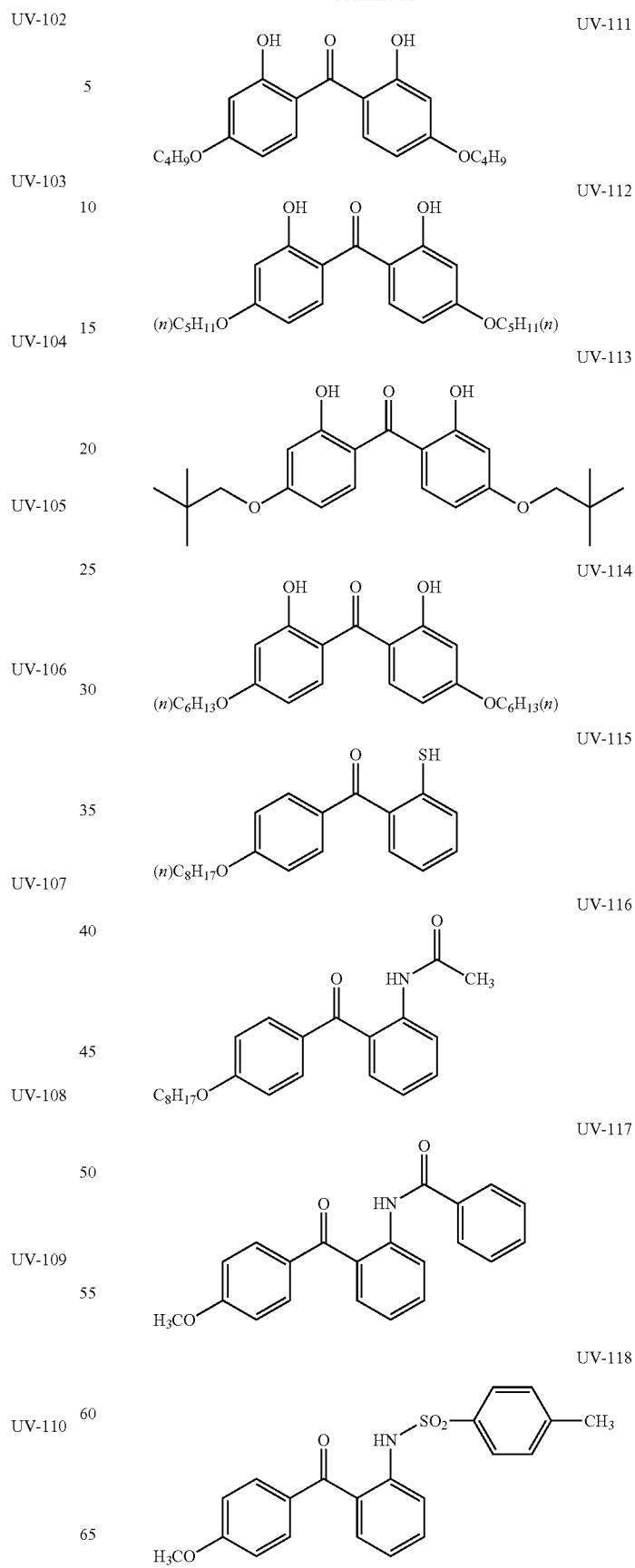

-continued

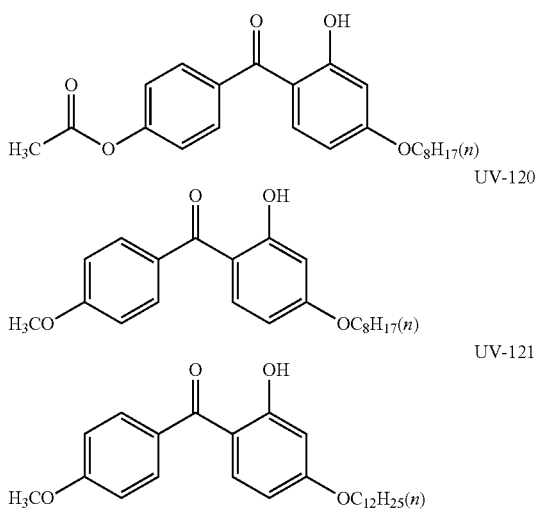

Also the compound containing a cyano group, which is one of the wavelength-dependent dispersion regulating agents to be employed in the invention, is preferably that represented by a formula (5).

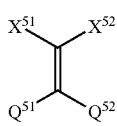

Formula (5)

In the formula, $Q^{51}$ and $Q^{52}$ each independently represents an aromatic ring; and $X^{51}$ and $X^{52}$ each represents a hydrogen atom or a substituent and at least either represents a cyano group, a carbonyl group, a sulfonyl group or an aromatic heterocycle. The aromatic ring represented by $Q^{51}$ and $Q^{52}$ may be an aromatic hydrocarbon ring or an aromatic heterocycle. These may be a single ring, or may form a condensed ring with another ring.

The aromatic hydrocarbon ring is preferably a monocyclic or bicyclic aromatic hydrocarbon ring containing 6 to 30 carbon atoms (such as a benzene ring or a naphthalene ring), more preferably an aromatic hydrocarbon ring containing 6 to 20 carbon atoms, further preferably an aromatic hydrocarbon ring containing 6 to 12 carbon atoms, and still preferably a benzene ring.

The aromatic heterocycle is preferably an aromatic heterocycle containing a nitrogen atom or a sulfur atom. Specific examples of the heterocycle include thiophene, imidazole, pyrazole, pyridine, pyrazine, pyridazine, triazole, triazine, indole, indazole, purin, thiazoline, thiazole, thiadiazole, oxazoline, oxazole, oxadiazole, quinoline, isoquinoline, phthalazine, naphthyridine, quinoxaline, quinazoline, cinnoline, pteridine, acridine, phenanthroline, phenazine, tetrazole, benzimidazole, benzoxazole, benzothiazole, benzotriazole, and tetrazaindene. The aromatic heterocycle is preferably pyridine, triazine or quinoline.

The aromatic ring represented by $Q^{51}$ and $Q^{52}$ is preferably an aromatic hydrocarbon ring, and more preferably a benzene ring. $Q^{51}$ and $Q^{52}$ may further have a substituent, which is preferably the aforementioned substituent T.

$X^{51}$ and $X^{52}$ represents a hydrogen atom or a substituent, and at least either one is a cyano group, a carbonyl group, a sulfonyl group, or an aromatic heterocycle. The aforementioned substituent T may be applicable to the substituent represented by $X^{51}$ and $X^{52}$. Also the substituent represented by $X^{51}$ and $X^{52}$ may be further substituted with another substituent, and $X^{51}$ and $X^{52}$ may be mutually condensed to form a cyclic structure.

$X^{51}$ and $X^{52}$ each is preferably a hydrogen atom, an alkyl group, an aryl group, a cyano group, a nitro group, a carbonyl group, a sulfonyl group or an aromatic heterocycle, more preferably a cyano group, a carbonyl group, a sulfonyl group or an aromatic heterocycle, further preferably a cyano group or a carbonyl group, and particularly preferably a cyano group or an alkoxycarbonyl group $\{-C(=O)\}OR^{51}$ ($R^{51}$ being an alkyl group containing 1 to 20 carbon atoms, an aryl group containing 6 to 12 carbon atoms or a combination thereof)\}.

The compounds represented by the formula (5) are preferably those represented by a following formula (5-1).

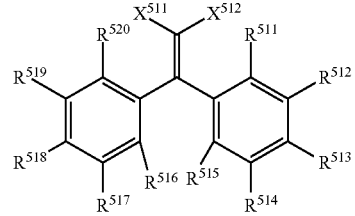

Formula (5-1)

In the formula, $R^{511}$, $R^{512}$, $R^{513}$, $R^{514}$, $R^{515}$, $R^{516}$, $R^{517}$, $R^{518}$, $R^{519}$ and $R^{520}$ each independently represents a hydrogen atom or a substituent, to which the aforementioned substituent T is applicable. Also these substituents may be further substituted with another substituent, or may be mutually condensed to form a cyclic structure. $X^{511}$ and $X^{512}$ have same meanings as $X^{51}$ and $X^{52}$ in the formula (5).

$R^{511}$, $R^{512}$, $R^{514}$, $R^{515}$, $R^{516}$, $R^{517}$, $R^{519}$ and $R^{520}$ each is preferably a hydrogen atom, an alkyl group, an alkenyl group, an alkinyl group, an aryl group, a substituted or non-substituted amino group, an alkoxy group, an aryloxy group, a hydroxyl group, or a halogen atom, more preferably a hydrogen atom, an alkyl group, an aryl group, an alkyloxy group, an aryloxy group, or a halogen atom, further preferably a hydrogen atom or an alkyl group containing 1 to 12 carbon atoms, particularly preferably a hydrogen atom or a methyl group, and most preferably a hydrogen atom.

$R^{513}$ and $R^{518}$ each is preferably a hydrogen atom, an alkyl group, an alkenyl group, an alkinyl group, an aryl group, a substituted or non-substituted amino group, an alkoxy group, an aryloxy group, a hydroxyl group, or a halogen atom, more preferably a hydrogen atom, an alkyl group containing 1 to 20 carbon atoms, an amino group containing 0 to 20 carbon atoms, an alkoxy group containing 1 to 12 carbon atoms, an aryloxy group containing 6 to 12 carbon atoms, or a hydroxyl group, further preferably a hydrogen atom, an alkyl group containing 1 to 12 carbon atoms, or an alkoxy group containing 1 to 12 carbon atoms, and particularly preferably a hydrogen atom.

The compounds represented by the formula (5) are more preferably those represented by a following formula (5-2).

Formula (5-2)

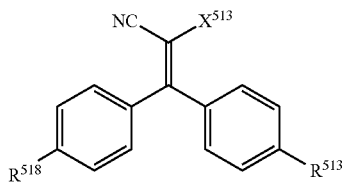

In the formula, $R^{513}$ and $R^{518}$ have same meanings and same preferable range as those in the formula (5-1). $X^{513}$ represents a hydrogen atom or a substituent, to which the aforementioned substituent T is applicable and which may be substituted further with another substituent, when possible.

$X^{513}$ represents a hydrogen atom or a substituent, to which the aforementioned substituent T is applicable and which may be substituted further with another substituent, when possible. $X^{513}$ preferably represents a hydrogen atom, an alkyl group, an aryl group, a cyano group, a nitro group, a carbonyl group, a sulfonyl group, or an aromatic heterocycle, more preferably a cyano group, a carbonyl group, a sulfonyl group, or an aromatic heterocycle, further preferably a cyano group or a carbonyl group, and particularly preferably a cyano group or an alkoxycarbonyl group {—C(=O)}OR$^{52}$ (R$^{52}$ being an alkyl group containing 1 to 20 carbon atoms, an aryl group containing 6 to 12 carbon atoms or a combination thereof)}.

The compounds represented by the formula (5) are further preferably those represented by a following formula (5-3).

Formula (5-3)

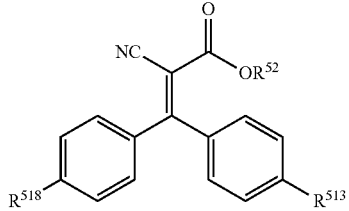

In the formula, $R^{513}$ and $R^{518}$ have same meanings and same preferable range as those in the formula (5-1). $R^{52}$ represents an alkyl group containing 1 to 20 carbon atoms. In a case that $R^{513}$ and $R^{518}$ are both hydrogen atoms, $R^{52}$ is preferably an alkyl group containing 2 to 12 carbon atoms, more preferably an alkyl group containing 4 to 12 carbon atoms, further preferably an alkyl group containing 6 to 12 carbon atoms, particularly preferably an n-octyl group, a t-octyl group, a 2-ethylhexyl group, an n-decyl group, or an n-dodecyl group, and most preferably a 2-ethylhexyl group.

In a case that $R^{513}$ and $R^{518}$ are other than hydrogen atoms, $R^{52}$ is preferably an alkyl group providing the compound of the formula (5-3) with a molecular weight of 300 or higher and containing 20 or less carbon atoms.

In the invention, the compound represented by the formula (5) can be synthesized by a method described in J. Am. Chem. Soc., 63, p. 3452(1941).

Specific examples of the compound represented by the formula (5) are shown below, but the present invention is not limited to those specific examples.

UV-201

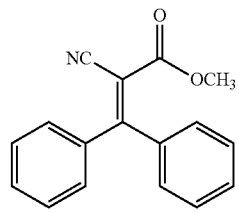

UV-202

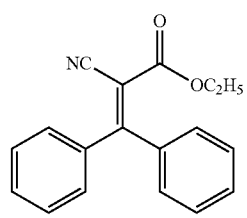

UV-203

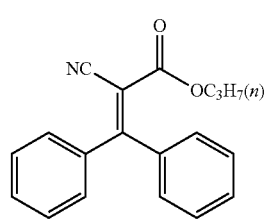

UV-204

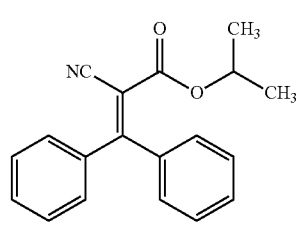

UV-205

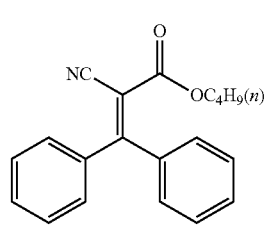

UV-206

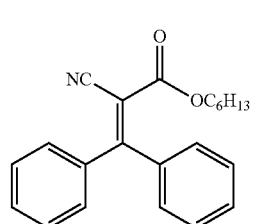

UV-207

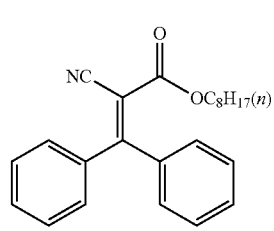

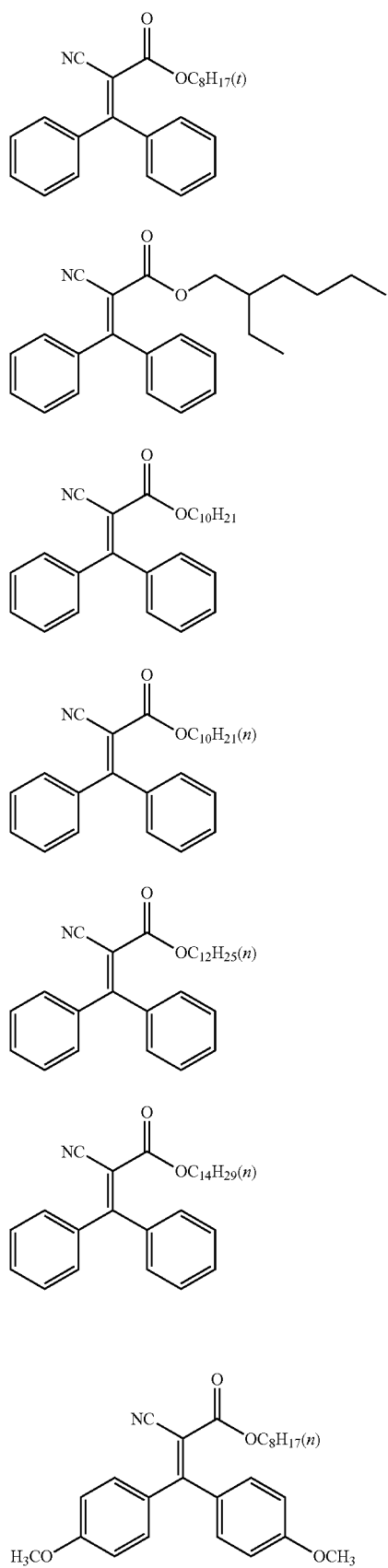

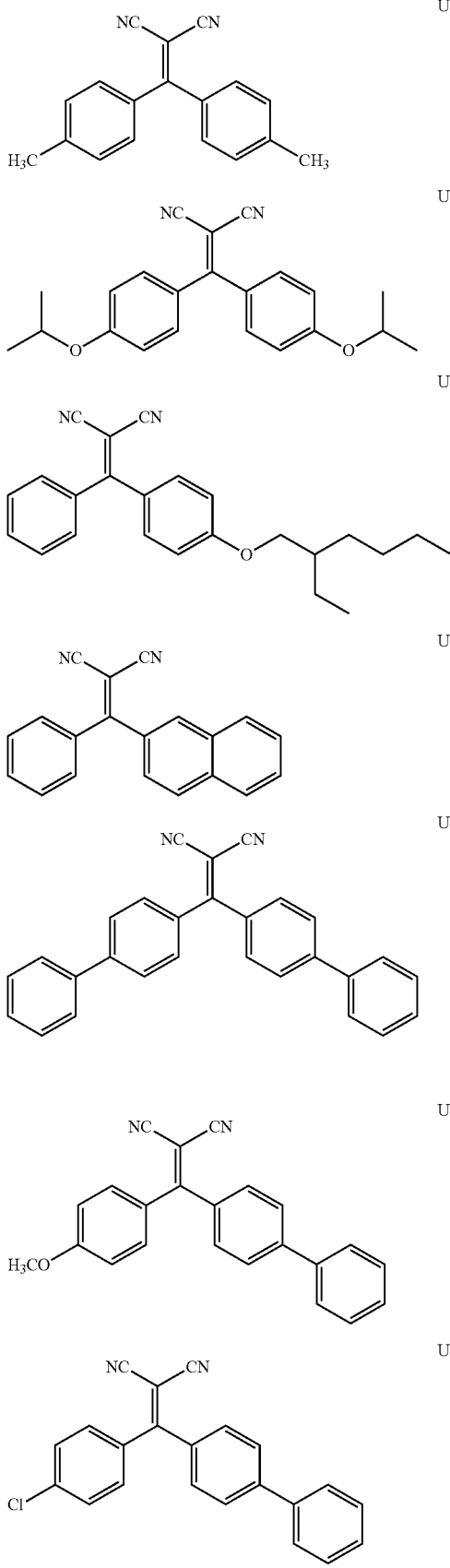

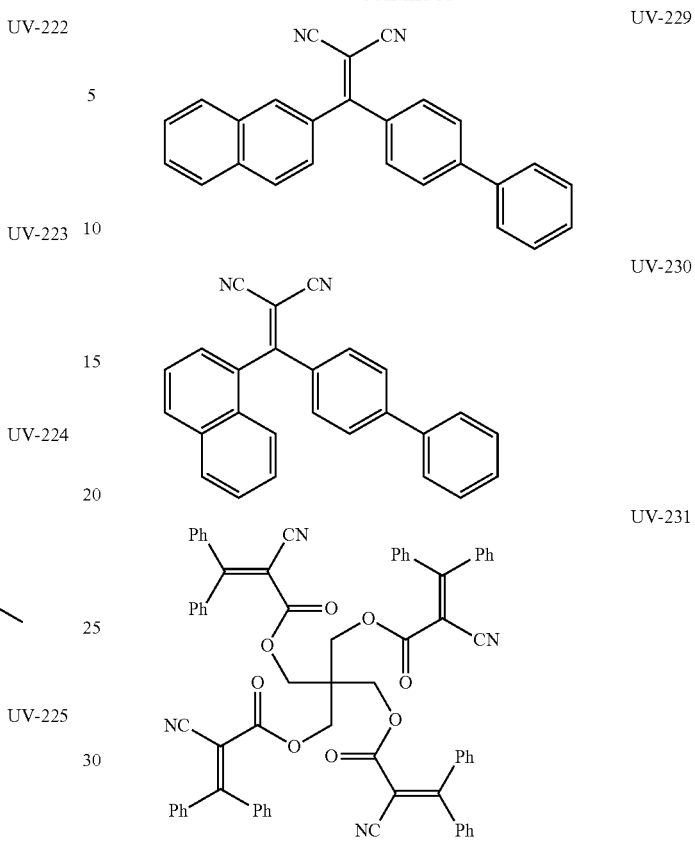

The optical film of the invention may contain at least one each of the compound reducing Rth(550) described above and the compound increasing ΔRth which is represented by a formula (10):

ΔRth=Rth(450)−Rth(650).

(Organic Solvent for Polymer Solution)

In the invention, the producing method for the optical film is not particularly restricted. Any known method may be usable, including a melt film forming method or a solution film forming method. The optical film formed by a polymer is preferably produced by a solvent casting method, in which the film is produced by a solution (dope) prepared by dissolving a raw material polymer in an organic solvent. An organic solvent preferably employed as a principal solvent in the invention is preferably selected from an ester, a ketone or an ether, containing 3 to 12 carbon atoms, and a halogenated hydrocarbon containing 1 to 7 carbon atoms. The ester, ketone and ether may have a cyclic structure. Also a compound, having any one of ester, ketone or ether functional group (namely —O—, —CO— or —COO—) in two or more units, may also be employed as a principal solvent, and it may also have another functional group such as an alcoholic hydroxyl group. In case of a principal solvent having functional groups of two or more kinds, a number of carbon atoms of such solvent may be within a range defined for a compound having either one of such functional groups.

For the optical film of the invention, a chlorine-containing halogenated hydrocarbon may be employed as a principal solvent, or, as described in the Japan Institute of Invention and Innovation, Laid-open Technical Report 2001-1745 (p. 12-16), a chlorine-free solvent may be employed as a principal solvent, and no particular restriction is made for the optical film of the invention.

Also the solvents for a polymer solution and a film, usable in the optical film of the invention, also including a solving method, are described in following patent references and constitute preferable embodiments. The references include, for example, JP-A-2000-95876, JP-A-12-95877, JP-A-10-324774, JP-A-8-152514, JP-A-10-330538, JP-A-9-95538, JP-A-9-95557, JP-A-10-235664, JP-A-12-63534, JP-A-11-21379, JP-A-10-182853, JP-A-10-278056, JP-A-10-279702, JP-A-10-323853, JP-A-10-237186, JP-A-11-60807, JP-A-11-152342, JP-A-11-292988, JP-A-11-60752 and JP-A-11-60752. These references include descriptions not only on solvents preferable for the polymer of the invention but also on physical properties of the solvent and co-existing substances to be made present, thus providing preferable embodiments also in the present invention.

(Producing Process of Optical Film)
(Dissolving Step)

Preparation of a polymer solution (dope) in the invention is not particularly restricted in the dissolving method, and may be executed at the room temperature, or by a cooled dissolving method, a high-temperature dissolving method or a combination thereof. For the preparation of the polymer solution in the invention and a solution concentrating step and a filtering step associated with the dissolving step, a producing method described in detail in the Japan Institute of Invention and Innovation, Laid-open Technical Report (2001-1745, issued Mar. 15, 2001), pages 22-25, may be employed advantageously.

(Transparency of Dope Solution)

The polymer solution (dope) of the invention preferably has a transparency of 85% or higher, more preferably 88% or higher, and further preferably 90% or higher. In the invention, it is confirmed that various additives are sufficiently dissolved in the polymer dope solution. For calculating the dope transparency, the dope solution is filled in a glass cell of 1 cm square, and subjected to a measurement of an absorbance at 550 nm by a spectrophotometer (UV-3150, manufactured by Shimadzu Corp.). A solvent alone is measured in advance as a blank, and the transparency of the polymer solution is calculated from a ratio to the blank absorbance.

(Casting, Drying and Winding Steps)

Then a film producing method utilizing the polymer solution of the invention will be explained. As a method and an equipment for producing the optical film of the invention, there are preferably employed a film producing method by solution casting and a film producing equipment by solution casting, that have been used for producing a cellulose triacetate film. A preferred embodiment of such method will be explained below.

A dope (polymer solution) prepared in a dissolver (pot) is once stored in a storage pot, and is subjected to a final preparation by a defoaming of bubbles contained in the dope. The dope is fed, from a dope exit, to a pressurized die for example through a pressurized constant-rate gear pump, capable of a constant-rate feeding of a high precision by a revolution. The dope is uniformly cast, from an aperture (slit) of the pressurized die, onto a running endless metal support member, and a half-dried dope film (also called a web) is peeled from the metal support member at a peeling point after about a cycle of the metal support member. The obtained web is supported at both ends thereof by clips, then dried by conveying in a tenter under a maintained width, further dried by conveying with rolls in a drying apparatus, and wound in a predetermined length by a winder. A combination of the tenter and the rolls in the drying apparatus is variable depending on the purpose. After the dope film is peeled off as a film from the metal support member, a step of stretching the film may be provided. In such case, it is also possible to regulate a wavelength dependence of the optical properties of the film, by suitably regulating a stretching temperature and a stretching magnification. In the film forming method by solution casting, to be employed for producing a functional protective film as an optical member for an electronic display, which is a principal purpose of the optical film of the invention, and for producing a silver halide photographic material, there is often provided, in addition to the film forming apparatus by solution casting, a coating apparatus for forming an undercoat layer, an antistatic layer, an antihalation layer, a protective layer and the like onto the surface of the film. These matters are described in detail in the Japan Institute of Invention and Innovation, Laid-open Technical Report (2001-1745, issued Mar. 15, 2001), pages 25-30, under items of casting (including co-casting), metal support member, drying, peeling etc., and may be employed advantageously in the present invention.

The optical film of the invention preferably has a film thickness of from 20 to 200 µm, more preferably from 30 to 160 µm, and further preferably from 40 to 120 µm.

(Stacked-Type Optical Compensation Film)

The optical film of the invention may be stacked with an optically anisotropic layer satisfying following relations (13) and (14):

(13) 0≤Re≤400; and
(14) −400≤Rth≤400, and preferably:

(13') 0≤Re≤300; and
(14') −300≤Rth≤300.

In the relations (13) to (14'), Re and Rth are respectively an in-plane retardation (unit: nm) and a retardation in thickness direction (unit: nm), measured with a light of any wavelength within a visible region. The measuring wavelength is preferably from 400 to 700 nm, more preferably from 450 to 650 nm, and most preferably from 500 to 600 nm In the invention, the optically anisotropic layer satisfying the relations (13) and (14) is not limited to a single-layered structure but may have a layered structure of plural layers. In an embodiment of such layered structure, materials for the layers need not be same, and for example optically anisotropic layers utilizing a discotic liquid crystal, a cholesteric liquid crystal or a rod-shaped liquid crystal may be employed singly or in a combination. Also a stacked member of a polymer film and an optically anisotropic layer of a liquid crystalline compound may be utilized. In an embodiment of such layered structure, a coated-type layered member including a layer formed by coating is preferable to a stacked member of stretched polymer films, in consideration of the thickness.

(Optical Compensation Film Formed by a Liquid Crystal Compound)

In preparing an optically anisotropic layer meeting (13) and (14) above, and in case of utilizing a liquid crystalline compound for the preparation of such optically anisotropic layer, since the liquid crystalline compound involves various alignment states, an optically anisotropic layer prepared by fixing the liquid crystalline compound at a specified alignment state can exhibit a desired optical property, by a single layer or by a layered member of plural layers. Thus, the optically anisotropic layer may assume an embodiment formed by a substrate and one or more optically anisotropic layers formed thereon. In such embodiment, a retardation of the entire optically anisotropic layer may be regulated by an optical anisotropy of the optically anisotropic layer. The liquid crystalline compounds are classified, according to a molecular shape thereof, into a discotic liquid crystal, a cholesteric liquid crystal and a rod-shaped liquid crystal. Each includes a low-molecular type and a high-molecular type, each of which is usable.

(Optically Anisotropic Layer Formed by Polymer Film)

As described above, the optically anisotropic layer may be formed by a polymer film. The polymer film is formed from a polymer capable of expressing an optical anisotropy. Examples of such polymer include polyolefin (such as polyethylene, polypropylene or norbornene-type polymer), polycarbonate, polyallylate, polysulfone, polyvinyl alcohol, polymethacrylate ester, polyacrylate ester and cellulose ester (such as cellulose triacetate or cellulose diacetate). Also a copolymer or a mixture of these polymers may be employed.

The optical anisotropy of the polymer film is preferably obtained by stretching. The stretching is preferably executed by a monoaxial stretching method or a biaxial stretching method. More specifically, a longitudinal monoaxial stretching utilizing a peripheral speed difference in two or more rolls, a tenter stretching in which the polymer film is gripped on both sides and stretched in the transversal direction, or a biaxial stretching by combining these, is preferable. Also it is possible to utilize two or more polymer films in such a manner that the entire optical properties of two or more films satisfy the aforementioned conditions. The polymer film is preferably produced by a solvent cast method, in order to reduce an unevenness in the birefringence. The polymer film preferably has a thickness of from 20 to 500 µm, and most preferably from 40 to 100 µm.

Also there is advantageously employed a method of forming a polymer film constituting the optically anisotropic layer, by utilizing at least a polymer material selected from a group of polyamide, polyimide, polyester, polyether ketone, polyamidimide, polyesterimide, and polyallyl ether ketone, coating a solution prepared by dissolving such polymer material in a solvent on a substrate and drying the solvent to obtain a film. In such case, a method of laminating the polymer film and a base material and then stretching both together to express an optical anisotropy as an optically anisotropic layer is also employable advantageously, and the optical film of the invention is preferably employed as the base material. It is also preferable to prepare the polymer film on another base material, then peeling the polymer from the base material and adhere it with the optical film of the invention, as an optically anisotropic layer. Such method allows to reduce the thickness of the polymer film, which is preferably 50 µm or less and more preferably from 1 to 20 µm.

(Surface Treatment)

The optical film of the invention may be subjected to a surface treatment, in certain cases, for achieving an improved adhesion between the optical film and functional layers (for example an undercoat layer and a back layer). The surface treatment can be executed for example by a glow discharge treatment, an ultraviolet irradiation treatment, a corona treatment, a flame treatment, or an acid or alkali treatment. The glow discharge treatment can be executed with a low-temperature plasma generated in a low-pressure gas of $10^{-3}$-20 Torr, or can also be advantageously executed by a plasma treatment under an atmospheric pressure. A plasma exciting gas means a gas capable of exciting a plasma under the aforementioned condition, and can be argon, helium, neon, krypton, xenon, nitrogen, carbon dioxide, a fluorinated gas such as tetrafluoromethane or a mixture thereof. Details of such materials are detailedly described in Japan Institute of Invention and Innovation, Laid-open Technical Report (2001-1745, issued Mar. 15, 2001, JIII), pages 30-32, and may be advantageously utilized in the invention.

(Contact Angle of Film Surface by Alkali Saponification Treatment)

In case of utilizing the optical film of the invention as a transparent protective film for a polarizing plate, an effective surface treatment is an alkali saponification treatment. In such case, the film surface after the alkali saponification treatment preferably has a contact angle of 55° or less, more preferably 50° or less and further preferably 45° or less. The contact angle can be evaluated by an ordinary method of dropping a water drop of a diameter of 3 mm onto the film surface after the alkali saponification treatment and measuring an angle formed by the film surface and the water drop, and can be used as an evaluation of hydrophilicity.

(Polarizing Plate)

The optical film of the invention is preferably employable as a protective film of a polarizing plate. In case of use as a protective film of a polarizing plate, the polarizing plate is not particularly restricted in a producing method and can be prepared by an ordinary producing method. For example there is known a method of alkali treating an obtained optical film and adhering such optical film, with an aqueous solution of a completely saponified polyvinyl alcohol, on both sides of a polarizer prepared by dipping and stretching a polyvinyl alcohol film in an iodine solution. Instead of alkali treatment, there may be employed an adhesion promoting treatment as described in JP-A Nos. 6-94915 and 6-118232.

An adhesive to be employed for adhering a treated surface of the protective film and the polarizer can be, for example, a polyvinyl alcohol-type adhesive such as polyvinyl alcohol or polyvinyl butyral, or a vinylic latex such as butyl acrylate.

The polarizing plate is constituted of a polarizer and protective films for protecting both sides thereof, and a protecting film and a separation film may be adhered respectively on one side and the other side of such polarizing plate. The protecting film and the separation film are used for the purpose of protecting the polarizing plate at a shipping or a product inspection of the polarizing plate. In such case, the protecting film is adhered for the purpose of protecting a surface of the polarizing plate, opposite to the side of the polarizing plate adhered to a liquid crystal panel, while the separation film is employed for the purpose of covering an adhesive layer for adhesion to the liquid crystal panel, on a side of the polarizing plate to be adhered to the liquid crystal panel.

A liquid crystal display usually includes substrates, containing liquid crystal, between two polarizing plates, and the polarizing plate protective film, utilizing the optical film of the invention, may be utilized in any position. For the purpose of the present invention for achieving an optical compensation in all the visible wavelength range, it is effective and preferable to utilize the optical film of the invention as a polarizing plate protecting film at the side of the liquid crystal cell.

(Polarizing Plate Integral with Optical Compensation Film)

In case of utilizing the optical film of the invention as an optical compensation film, for example in case of coating or adhering an optically anisotropic layer on one side of the optical film of the invention, it is possible to adhere the optical compensation film, with an adhesive, to a polarizing plate already prepared by adhering protective films on both sides of a polarizer, or to execute a surface treatment on the optical film of the invention, on a side thereof not coated or adhered with the optically anisotropic layer and to adhere such optical film directly to the polarizer. In such case, for example a polyvinyl alcohol-based polarizing plate is not restricted in a producing method and may be prepared by an ordinary method. For example, there may be employed a method of executing a surface modification on a surface the optical film by an alkali saponification treatment, a plasma treatment or a corona discharge treatment, and applying such optical film on both surfaces of a polarizer prepared by dipping and stretching a polyvinyl alcohol (PVA) film in an iodine solution.

(Functional Layer)

In case of utilizing the optical film of the invention as a protective film of a polarizing plate in a liquid crystal display, various functional layers may be provided on the surface. These include, for example, a cured resin layer (transparent hard coat layer), an antiglare layer, an antireflective layer, an adhesion promoting layer, an optical compensation layer, an alignment layer and an antistatic layer for liquid crystal layer. These functional layers in which the optical film of the invention is applicable, and materials therefor include for example a surfactant, a lubricant, a matting agent, an antistatic layer and a hard coat layer, which are described in detail in Japan Institute of Invention and Innovation, Journal of Technical Disclosure (No. 2001-1745, issued Mar. 15, 2001, JIII), p. 32-45, and are advantageously employable in the invention.

(Liquid Crystal Display)

A liquid crystal display of the present invention an optical film (optical compensation film), a liquid crystal cell and polarizing plates in combination. The optical film (optical compensation film), the liquid crystal cell and the polarizing plates are preferably contacted closely, and a tacky material or an adhesive material already known may be employed for such close contact.

The optical film of the invention, and the optical compensation film or the polarizing plate utilizing the same may be applied to liquid crystal displays of various display modes. Representative display modes proposed include VA (vertically aligned), IPS (in-plane switching), TN (twisted nematic), OCB (optically compensatory bend), STN (super twisted nematic), ECB (electrically controlled birefringence), FLC (ferroelectric liquid crystal), AFLC (anti-ferroelectric liquid crystal), and HAN (hybrid aligned nematic). Also there is proposed a display mode with an alignment division in the above-mentioned display modes. Effects obtained by the optical film of the invention are conspicuous particularly in a liquid crystal display of a large image size, so that it is particularly preferable to utilize the optical film of the invention in the liquid crystal display of VA mode, IPS mode or OCB mode, utilized in large-size televisions.

The optical film of the invention is preferably employed in a display mode in which the liquid crystal molecules are vertically aligned in a black display state, such as VA mode, a display mode in which the liquid crystal molecules are parallel aligned in a black display state, such as IPS or FFS mode, and an OCB mode in which the liquid crystal molecules are bend aligned.

For example, in case of utilizing at least either of the optical film, the optical compensation film and the polarizing plate of the invention in a liquid crystal display, the liquid crystal display may include at least an optically anisotropic layer. Such optically anisotropic layer preferably satisfies following relations (15) and (16):

(15) $0 \leq Re \leq 400$; and
(16) $-400 \leq Rth \leq 400$.

In the relations (15) and (16), Re and Rth are respectively an in-plane retardation (unit: nm) and a retardation in thickness direction (unit: nm), measured with a light of any wavelength within a visible region. The measuring wavelength is preferably from 400 to 700 nm, more preferably from 450 to 650 nm, and most preferably from 500 to 600 nm.

The optically anisotropic layer is not limited to a single-layer structure, but may have a layered structure formed by laminating plural layers. In an embodiment of such layered structure, materials for the layers need not be same, and for example optically anisotropic layers utilizing a discotic liquid crystal, a cholesteric liquid crystal or a rod-shaped liquid crystal may be employed singly or in a combination. Also a laminated member of a polymer film and an optically anisotropic layer of a liquid crystalline compound may be utilized. In an embodiment of such layered structure, a coated-type layered member including a layer formed by coating is preferable to a laminated member of stretched polymer films, in consideration of the thickness.

The optically anisotropic layer may be those cited in the explanation of the laminated optical compensation film.

When the liquid crystal display includes a liquid crystal cell in which the liquid crystal molecules are vertically aligned in a black display state, in order to obtain viewing angle characteristics showing little light leakage and little color shift in the inclined direction, the apparatus preferably includes at least an optically anisotropic layer satisfying $10 \leq Re \leq 150$ and $50 \leq Rth \leq 400$. Such optically anisotropic layer more preferably satisfies $20 \leq Re \leq 120$ and $60 \leq Rth \leq 350$, and most preferably $30 \leq Re \leq 100$ and $80 \leq Rth \leq 300$.

When the liquid crystal display includes a liquid crystal cell in which the liquid crystal molecules are parallel aligned in a black display state, in order to obtain viewing angle characteristics showing little light leakage and little color shift in the inclined direction, the apparatus preferably includes at least an optically anisotropic layer satisfying either one of relations (19) to (22). A more preferable embodiment of the liquid crystal display of the invention includes an optically anisotropic layer satisfying the relation (20) and an optically anisotropic layer satisfying the relation (21). Another further preferable embodiment includes an optically anisotropic layer satisfying the relation (20) and an optically anisotropic layer satisfying the relation (22):

(19) $100 \leq Re \leq 400$, and $-50 \leq Rth \leq 50$;
(20) $0 \leq Re \leq 20$, and $-400 \leq Rth \leq -50$;
(21) $60 \leq Re \leq 200$, and $20 \leq Rth \leq 120$;
(22) $30 \leq Re \leq 150$, and $100 \leq Rth \leq 400$.

When the liquid crystal display includes a liquid crystal cell in which the liquid crystal molecules are bend aligned in a black display state, in order to obtain viewing angle characteristics showing little light leakage and little color shift in the inclined direction, the apparatus preferably includes at least an optically anisotropic layer containing a discotic liquid crystal compound. An alignment state of the discotic liquid crystal compound is preferably such that a disk face is inclined with respect to the surface of the optically anisotropic layer, and more preferably is a hybrid alignment in which an angle of such inclination changes along the thickness direction of the optically anisotropic layer.

In each optically anisotropic layer, Re and Rth are respectively an in-plane retardation (unit: nm) and a retardation in thickness direction (unit: nm), measured with a light of any wavelength within a visible region. The measuring wavelength is preferably from 400 to 700 nm, more preferably from 450 to 650 nm, and most preferably from 500 to 600 nm.

EXAMPLES

In the following, the present invention will be further clarified by examples, but the present invention is not limited to such examples.

Figure 9:
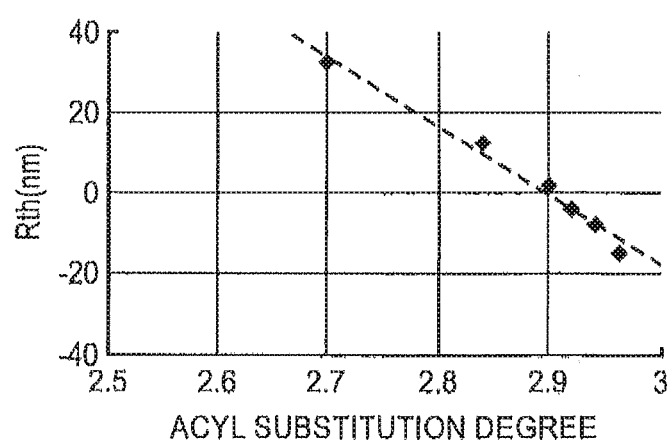
FIG. 9 is a graph showing an example of a relationship between an acyl substitution degree of cellulose acylate and Rth of an optical film.

In executing the present invention, in case of employing cellulose acylate as a polymer material as a reference for selecting the raw material, it is found that a larger acyl substitution degree is effective for reducing the retardation. Rth(550) as a function of acyl substitution degree of cellulose triacetate is shown in FIG. 9.

Figure 10:
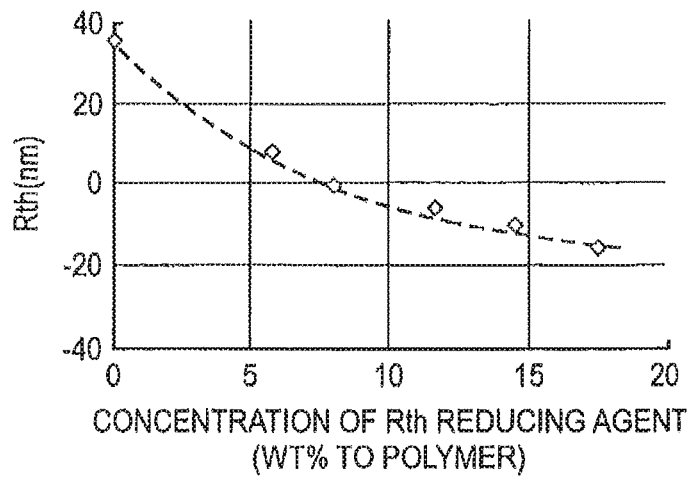
FIG. 10 is a graph showing an example of a relationship between a concentration of an Rth reducing agent and Rth of an optical film.

Also in the present invention, it is found that, as one of additives for controlling the optical characteristics of the optical film of the invention, a larger amount of the Rth reducing agent is effective for reducing the retardation of the film. Rth(550) as a function of the amount of compound 119 is shown in FIG. 10.

Figure 11:
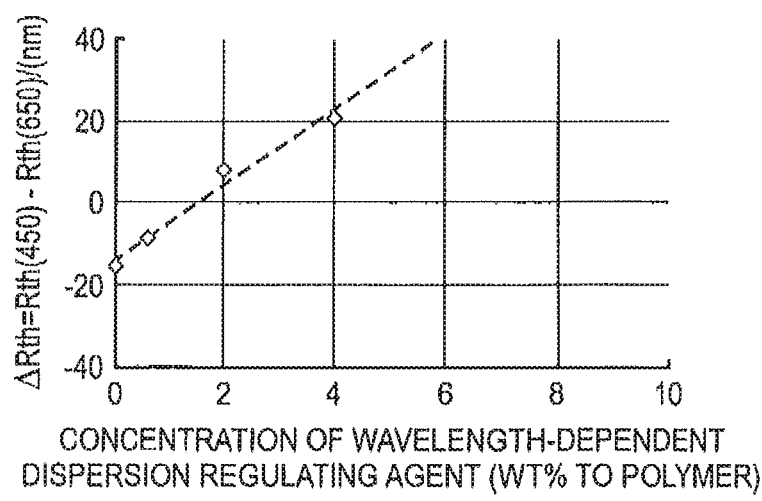
FIG. 11 is a graph showing an example of a relationship between a concentration of a wavelength-dependent dispersion regulating agent and ΔRth.

Also in the present invention, it is found that, as one of additives for controlling the optical characteristics of the optical film of the invention, a larger amount of the wavelength-dependent dispersion regulating agent is effective for increasing $\Delta$Rth of the film. Rth(550) as a function of the amount of compound UV 102 is shown in FIG. 11.

In the optical film of the invention, a kind of the polymer material, and kinds and amounts of the additives for controlling the optical characteristics were suitably selected. FIGS. 9 to 11 show mere examples, and the effects are variable depending for example on the combination of materials, but these concepts were employed as design principles for preparing the optical film.

In the present example, the compounds indicated as the Rth reducing agent and the wavelength-dependent dispersion regulating agent are those described in the specification.

Example 1

(Preparation of Cellulose Acylate Solution CA-1)

A following composition was charged in a mixing tank, and agitated to dissolve components thereby obtaining a cellulose acylate solution CA-1.

| (Composition of cellulose acylate solution CA-1) | |
| --- | --- |
| cellulose acylate with Ac substitution degree: 2.92 | 100.0 parts by weight |
| Rth reducing agent: compound 119 | 14.0 parts by weight |
| methylene chloride (1st solvent) | 402.0 parts by weight |
| methanol (2nd solvent) | 60.0 parts by weight |

(Preparation of Matting Agent Solution MT-1)

20 parts by weight of silica particles of an average particle size of 16 nm (AEROSIL R972, manufactured by Nippon Aerosil Co.) and 80 parts by weight of methanol were well mixed under agitation for 30 minutes to obtain a silica particle dispersion. The dispersion was charged in a disperser together with the following composition and agitated for 30 minutes or longer to dissolve the components, thereby obtaining a matting agent solution MT-1.

| (Composition of matting agent solution MT-1) | |
| --- | --- |
| dispersion of silica particles of average particle size: 16 nm | 10.0 parts by weight |

| (Composition of matting agent solution MT-1) | |
| --- | --- |
| methylene chloride (1st solvent) | 76.3 parts by weight |
| methanol (2nd solvent) | 3.4 parts by weight |
| cellulose acylate solution CA-1 | 10.3 parts by weight |

(Preparation of Additive Solution)

Following composition was charged in a mixing tank and agitated under heating to dissolve the components, thereby obtaining an additive solution AD-1.

| (Composition of additive solution AD-1) | |
| --- | --- |
| wavelength-dependent dispersion regulating agent: UV-208 | 7.6 parts by weight |
| methylene chloride (1st solvent) | 58.4 parts by weight |
| methanol (2nd solvent) | 8.7 parts by weight |
| cellulose acylate solution CA-1 | 12.8 parts by weight |

(Preparation of Optical Film Sample 001)

94.6 parts by weight of the cellulose acylate solution CA-1, 1.3 parts by weight of the matting agent solution MT-1, and 2.3 parts by weight of the additive solution AD-1, after each being filtered, were mixed and cast by a band casting machine. In the above-described composition, the Rth reducing agent and the wavelength-dependent dispersion regulating agent had weight ratios, with respect to cellulose acylate, respectively of 14.0% and 1.0%. A prepared film with a residual solvent amount of 30% was peeled off from the band, and was dried at 135° C. for 20 minutes to obtain a cellulose acylate film. The completed optical film 001 had a residual solvent amount of 0.2% and a film thickness of 80 μm.

The prepared film was subjected to a moisture adjustment for 2 hours or more in an environment of 25° C. and 60% RH, and was subjected to a measurement of three-dimensional birefringence with an auto birefringence meter KOBRA 21ADH (manufactured by Oji Scientific Instruments Ltd.) at wavelengths of 450, 550 and 650 nm in an environment of 25° C. and 60% RH, to obtain an in-plane retardation Re and a retardation Rth in the thickness direction, obtained by Re measurements at different inclination angles, thereby obtaining optical characteristics shown in Table 3.

Example 2

An optical film 002, having a thickness of 80 μm and optical characteristics shown in Table 3 was obtained in the same manner as in Example 1, except that the amount of the compound 119 in the cellulose acylate solution CA-1 in Example 1 was changed to 12.0 parts by weight and the amount of UV-208 in the additive solution AD-1 was changed to 3.0 parts by weight.

Example 3

An optical film 003, having a thickness of 80 μm and optical characteristics shown in Table 3, was obtained in the same manner as in Example 1, except that the amount of the compound 119 in the cellulose acylate solution CA-1 in Example 1 was changed to 10.0 parts by weight and the amount of UV-208 in the additive solution AD-1 was changed to 1.5 parts by weight.

Example 4

An optical film 004, having a thickness of 80 μm and optical characteristics shown in Table 3, was obtained in the same manner as in Example 1, except that UV-208 in the additive solution AD-1 in Example 1 was changed to UV-20.

Example 5

An optical film 005, having a thickness of 80 μm and optical characteristics shown in Table 3, was obtained in the same manner as in Example 1, except that UV-208 in the additive solution AD-1 in Example 1 was changed to UV-3.

Example 6

An optical film 006, having a thickness of 80 μm and optical characteristics shown in Table 34, was obtained in the same manner as in Example 1, except that the amount of the compound 119 in the cellulose acylate solution CA-1 in Example 1 was changed to 16.0 parts by weight, that UV-208 in the additive solution AD-1 was changed to UV-3 and that the amount of UV-3 was changed to 15.2 parts by weight.

Example 7

An optical film 007, having a thickness of 80 μm and optical characteristics shown in Table 3, was obtained in the same manner as in Example 1, except that the amount of UV-3 in the additive solution in Example 6 was changed to 12.2 parts by weight.

Example 8

An optical film 008, having a thickness of 80 μm and optical characteristics shown in Table 3, was obtained in the same manner as in Example 1, except that the amount of the compound 119 in the cellulose acylate solution CA-1 in Example 1 was changed to 12.0 parts by weight, that UV-208 in the additive solution AD-1 was changed to UV-102 and that the amount of UV-102 was changed to 9.1 parts by weight.

Comparative Example 1

As a comparative example, a commercially available cellulose acylate film FUJITAC TD80UL (film thickness 80 μm, manufactured by Fuji Photo Film Co.) was prepared. This film had optical characteristics as shown in Table 3.

Comparative Example 2

As a comparative example, a commercially available cycloolefin film Zeonor ZF-14 (film thickness 100 μm, manufactured by Nippon Zeon Ltd.) was prepared. This film had optical characteristics as shown in Table 3.

TABLE 3

|  |  | Ex. 1 | Ex. 2 | Ex. 3 | Ex. 4 | Ex. 5 | Ex. 6 | Ex. 7 | Ex. 8 | Comp. Ex. 1 | Comp. Ex. 2 |
|---|---|---|---|---|---|---|---|---|---|---|---|
| sample name | | 001 | 002 | 003 | 004 | 005 | 006 | 007 | 008 | TD80UL | ZF-14 |
| raw material polymer | | Ac2.92 | Ac2.92 | Ac2.92 | Ac2.92 | Ac2.92 | Ac2.92 | Ac2.92 | Ac2.92 | — | Zeonor |
| Rth reducing agent (wt %) | | 119 (14%) | 119 (12%) | 119 (10%) | 119 (14%) | 119 (14%) | 119 (16%) | 119 (16%) | 119 (12%) | — | — |
| wavelength-dependent dispersion reg. agent (wt %) | | UV-208 (1.0%) | UV-208 (0.4%) | UV-208 (0.2%) | UV-208 (1.0%) | UV-3 (1.0%) | UV-3 (2.0%) | UV-3 (1.6%) | UV-102 (1.2%) | — | — |
| Re (nm) | 450 | 1.0 | −3.2 | −9.5 | −5.3 | 1.3 | 5.3 | 5.8 | 5.3 | −0.8 | 6.1 |
| | 550 | 1.0 | 1.0 | 0.8 | 0.8 | 1.2 | 1.2 | 1.0 | 1.0 | 2.9 | 6.0 |
| | 650 | 1.0 | 5.1 | 6.8 | 5.3 | 1.2 | −1.6 | −3.2 | −1.8 | 5.0 | 6.0 |
| | I = 450 − 550 | 0.0 | −4.2 | −10.3 | −6.1 | 0.1 | 4.1 | 4.8 | 4.3 | −3.7 | 0.1 |
| | II = 650 − 550 | 0.0 | 4.1 | 6.0 | 4.5 | 0.0 | −2.8 | −4.2 | −2.8 | 2.1 | 0.0 |
| Rth (nm) | 450 | −10.5 | −8.0 | −0.4 | 5.6 | 9.3 | 8.3 | −1.9 | −13.2 | 32.8 | 6.8 |
| | 550 | 0.5 | 0.4 | −0.5 | −0.7 | 2.0 | 2.1 | −1.8 | −2.0 | 42.4 | 6.9 |
| | 650 | 7.7 | 7.3 | −0.5 | −3.2 | −1.3 | −3.5 | −1.8 | 2.8 | 48.5 | 6.9 |
| | III = 450 − 550 | −11.0 | −8.4 | 0.1 | 6.3 | 7.3 | 6.2 | −0.1 | −11.2 | −9.6 | −0.1 |
| | IV = 650 − 550 | 7.2 | 6.9 | 0.0 | −2.5 | −3.3 | −5.6 | 0.0 | 4.8 | 6.1 | 0.0 |
| |I| + |II| + |III| + |IV| | | 18.2 | 23.6 | 16.4 | 19.4 | 10.7 | 18.7 | 9.1 | 23.1 | 21.5 | 0.2 |
| class (Tabs. 2, 3) | | A | A | B | B | C | C | D | D | — | — |
| case (Tables 2, 3) | | (1) | (2) | (3) | (4) | (5) | (6) | (7) | (8) | — | — |
| Ex. 10A (VA color shift) | | (+) | (+) | | | | | | | (−) | (−) |
| Ex. 10B (VA color shift) | | | | (+) | (+) | | | | | (−) | (−) |
| Ex. 10C (VA color shift) | | | | | | (+) | (+) | | | (−) | (−) |
| Ex. 10D (VA color shift) | | | | | | | | (+) | (+) | (−) | (−) |
| Ex. 11 (IPS color shift) | | | | | | | | | (+) | (−) | |
| Ex. 12A (IPS view angle) | | | | | (+) | | | | | (−) | (−) |
| Ex. 12B (IPS view angle) | | | | | (+) | | | | | (−) | (−) |
| Ex. 12C (IPS view angle) | | | | | (+) | | | | | (−) | (−) |
| Ex. 12D (IPS view angle) | | | | | (+) | | | | | (−) | (−) |
| Ex. 13 (OCB color shift) | | (+) | | | | | | | | (±) | (−) |

Example 9

(Working of Polarizing Plate)
(Preparation of Polarizing Plate)

Surfaces of the optical film 001 of the invention were subjected to an alkali saponification process. It was immersed in a 1.5N aqueous solution of sodium hydroxide at 55° C. for 2 minutes, then rinsed in a water rinsing tank of room temperature, and was neutralized with 0.1N sulfuric acid of 30° C. It was rinsed again in a water rinsing tank of room temperature, and was dried with warm air of 100° C. Then a rolled polyvinyl alcohol film of a thickness of 80 μm was continuously stretched 5 times in an aqueous solution of iodine and dried to obtain a polarizing film of a thickness of 20 μm. The alkali-saponified optical film 001 and a similarly alkali-saponified FUJITAC TD80UL (manufactured by Fuji Photo Film Co.) were prepared and adhered, utilizing a 3% aqueous solution of polyvinyl alcohol (PVA-117H, manufactured by Kuraray Co.) as an adhesive, with the polarizing film therebetween, in such a manner that the alkali-saponified surfaces are at the side of the polarizing film, thereby obtaining a polarizing plate 101 in which the optical film 001 and TD80UL constitute protective films of the polarizing film. The adhesion was made in such a manner that the phase retarding axes of the optical film 001 and TD80UL are parallel to the absorption axis of the polarizing film. Similarly the optical films 002-008 of the invention were used to prepare polarizing plates, which will be hereinafter called polarizing plates 102-108. These polarizing plates had sufficient polarizing ability.

Also TD80UL of Comparative Example 1 was used, in a similar manner, to prepare a polarizing plate 201. The polarizing plate 201 is a polarizing plate protected on both sides by TD80UL. Also Zeonor film ZF-14 of Comparative Example 2 was subjected to a corona discharge treatment as a surface treatment instead of alkali saponification, and was otherwise processed similarly to obtain a polarizing plate 202. These polarizing plates 201, 202 had a sufficient polarizing ability.

Example 10

(Mounting on VA Panel)

Evaluation of mounting on a VA panel was conducted in following four classes A to D, according to the type of the optical characteristics of the optical compensation film employed on the liquid crystal display.

(Class A)

The optical film of the invention was evaluated by mounting on a liquid crystal display of VA mode. A VA-mode liquid crystal television (LC-20C5, manufactured by Sharp Inc.) was used, after removing the front and rear polarizing plates and the retardation plate, as a liquid crystal cell for mounting. A polarizing film was prepared in the same manner as in Example 9. An optical compensation film 4-A, subjected to a saponification treatment on a surface, was adhered on a surface of the polarizing film, and a cellulose triacetate film (FUJITAC TD80UL, manufactured by Fuji Photo Film Co.), subjected to a saponification treatment on a surface, was adhered on the other surface of the polarizing film, utilizing a polyvinyl alcohol-based adhesive, thereby obtaining a polarizing plate 4-A. The optical characteristics of the optical compensation film 4-A are shown in Table 4. In a structure shown in FIG. 5, there were employed the polarizing plate 4-A as an optical compensation film 4 and a polarizing plate 1, the aforementioned VA-mode liquid crystal cell as a liquid crystal cell 3, and the polarizing plate 101 prepared in Example 9 as an optical film 5 and a polarizing plate 2, and these were adhered with a tacky adhesive material. The adhesion was made in such a manner that the optical compensation film 4-A of the polarizing plate 4-A was positioned at the side of the liquid crystal cell, and that the optical film 001 of the polarizing plate 101 was positioned at the side of the liquid crystal cell. The adhesion was also made in such a manner that a phase retarding axis of the optical compensation film 4-A was perpendicular to the absorbing axis of the polarizing plate 1. Also a mounting was executed by adhering each of the polarizing plate 102 obtained in Example 9, and the polarizing plate 201 and 202 utilizing Comparative Example 1 and 2, in combination with the optical compensation film 4-A shown in Table 4.

TABLE 4

| wavelength (nm) | Re (nm) | Rth (nm) |
|---|---|---|
| 450 | 48 | 264 |
| 550 | 75 | 228 |
| 650 | 91 | 217 |

(Class B)

In a structure similar to that of Example 10 (class A), a mounting was executed by employing the polarizing plate 103, 104, 201 or 202 instead of the polarizing plate 101, and employing an optical compensation film 4-B of the optical characteristics shown in Table 5 instead of the optical compensation film 4-A.

TABLE 5

| wavelength (nm) | Re (nm) | Rth (nm) |
|---|---|---|
| 450 | 45 | 215 |
| 550 | 59 | 242 |
| 650 | 62 | 258 |

(Class C)

In a structure similar to that of Example 10 (class A), a mounting was executed by employing the polarizing plate 105, 106, 201 or 202 instead of the polarizing plate 101, and employing an optical compensation film 4-C of the optical characteristics shown in Table 6 instead of the optical compensation film 4-A.

TABLE 6

| wavelength (nm) | Re (nm) | Rth (nm) |
|---|---|---|
| 450 | 68 | 242 |
| 550 | 63 | 224 |
| 650 | 61 | 217 |

(Class D)

In a structure similar to that of Example 10 (class A), a mounting was executed by employing the polarizing plate 107, 108, 201 or 202 instead of the polarizing plate 101, and employing an optical compensation film 4-D of the optical characteristics shown in Table 7 instead of the optical compensation film 4-A.

TABLE 7

| wavelength (nm) | Re (nm) | Rth (nm) |
|---|---|---|
| 450 | 73 | 205 |
| 550 | 65 | 228 |
| 650 | 63 | 234 |

The optical compensation films 4-A, 4-B, 4-C and 4-D shown in Tables 5-8 were prepared in the following manner
(Preparation of Optical Compensation Film)
(Preparation of Cellulose Acylate Solution CA-2)

A following composition was charged in a mixing tank, and agitated to dissolve components thereby obtaining a cellulose acylate solution CA-2.

| (Composition of cellulose acylate solution CA-2) | |
| --- | --- |
| cellulose acylate with Ac substitution degree: 2.81 | 100.0 parts by weight |
| TPP (triphenyl phosphate) | 7.8 parts by weight |
| BDP (biphenyldiphenyl phosphate) | 3.9 parts by weight |
| methylene chloride (1st solvent) | 402.0 parts by weight |
| methanol (2nd solvent) | 60.0 parts by weight |

(Preparation of Matting Agent Solution MT-2)

20 parts by weight of silica particles of an average particle size of 16 nm (AEROSIL R972, manufactured by Nippon Aerosil Co.) and 80 parts by weight of methanol were well mixed under agitation for 30 minutes to obtain a silica particle dispersion. The dispersion was charged in a disperser together with the following composition and agitated for 30 minutes or longer to dissolve the components, thereby obtaining a matting agent solution MT-2.

| (Composition of matting agent solution MT-2) | |
| --- | --- |
| dispersion of silica particles of average particle size: 16 nm | 10.0 parts by weight |
| methylene chloride (1st solvent) | 76.3 parts by weight |
| methanol (2nd solvent) | 3.4 parts by weight |
| cellulose acylate solution CA-2 | 10.3 parts by weight |

(Preparation of Additive Solution)

Following composition was charged in a mixing tank and agitated under heating to dissolve the components, thereby obtaining an additive solution AD-2.

| (Composition of additive solution AD-2) | |
| --- | --- |
| following retardation expressing agent X | 11.5 parts by weight |
| methylene chloride (1st solvent) | 58.4 parts by weight |
| methanol (2nd solvent) | 8.7 parts by weight |
| cellulose acylate solution CA-2 | 12.8 parts by weight |

Retardation expressing agent X

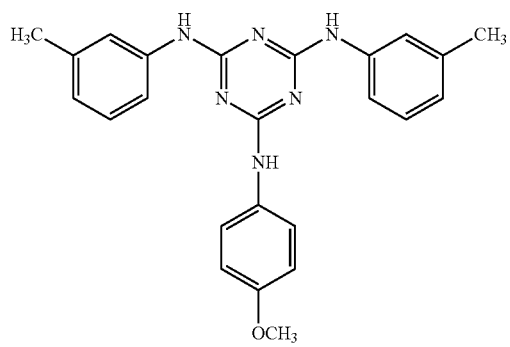

(Preparation of Cellulose Acylate Film Sample 401)

94.6 parts by weight of the cellulose acylate solution CA-2, 1.3 parts by weight of the matting agent solution MT-2, and 2.3 parts by weight of the additive solution AD-2, after each being filtered, were mixed and cast by a band casting machine. In the above-described composition, the retardation expressing agent had a weight ratio, with respect to cellulose acylate, of 1.0%. A prepared film with a residual solvent amount of 30% was peeled off from the band, and was dried at 140° C. for 40 minutes to obtain a cellulose acylate film. The completed cellulose acylate film 401 had a residual solvent amount of 0.2% and a film thickness of 140 µm.

(Preparation of Optical Compensation Film 4-A)

The cellulose acylate film 401 obtained above was fed to a stretching apparatus, including a step of stretching a continuous web film in a transversal direction by means of a tenter of a structure in which a longitudinal pitch of tenter clips becomes narrower in the course of holding and conveying of the film, and, a stretching was started after setting the film temperature at 180° C. and at 30 seconds after passing a heating zone, for contracting the film under relaxation by 0.72 times in the longitudinal direction and for stretching the film by 1.23 times in the transversal direction by means of the tenter clips, thereby obtaining an optical compensation film 4-A having a thickness of 182 µm after the stretching.

(Preparation of Optical Compensation Film 4-B)

A process was executed in the same manner as in the preparation of the optical compensation film 4-A, except that the cellulose acetate of Ac substitution degree of 2.81, in the composition of the cellulose acylate solution CA-2, was replaced by cellulose acetate of Ac substitution degree of 2.92, thereby obtaining a cellulose acylate film sample 402. It was used in a process similar to that for preparing the optical compensation film 4-A to obtain an optical compensation film 4-B.

(Preparation of Optical Compensation Film 4-C)

A process was executed in the same manner as in the preparation of the optical compensation film 4-A, except that the cellulose acetate of Ac substitution degree of 2.81, in the composition of the cellulose acylate solution CA-2, was replaced by cellulose acetate of Ac substitution degree of 2.86, thereby obtaining a cellulose acylate film sample 403. It was subjected to a fixed biaxial stretching, which was started after setting the film temperature at 180° C. and at 30 seconds after passing a heating zone, to stretch the film by 1.2 times in the longitudinal direction and by 1.1 times in the transversal direction, thereby obtaining an optical compensation film 4-C having a thickness of 180 µm after the stretching.

(Preparation of Optical Compensation Film 4-D)

A process was executed in the same manner as in the preparation of the optical compensation film 4-A, except that the amount of the retardation expressing compound X in the composition of the additive solution AD-2, was changed from 11.5 parts by weight to 8.6 parts by weight, thereby obtaining a cellulose acylate film sample 404. It was subjected to a fixed biaxial stretching, which was started after setting the film temperature at 180° C. and at 30 seconds after passing a heating zone, to stretch the film by 1.2 times in the longitudinal direction and by 1.1 times in the transversal direction, thereby obtaining an optical compensation film 4-D having a thickness of 180 µm after the stretching.

(Evaluation of Viewing Angle-Dependent Color of Panel)

Each of the mounted VA-mode panels prepared in (class A) to (class D) above was used as a liquid crystal display of the structure shown in FIG. 5, with a backlight provided at the side of the polarizing plate 1, and, for each sample, a color shift in an inclined direction with an azimuthal angle of 45° and a polar angle of 60° in a black image display state. Results are shown in Table 3. In the color evaluation, a case without any color shift (yellowish or reddish color) is represented by (+), while a case, where a color shift is observed at a polar angle of 60° but is removed when the polar angle is reduced from 60° to 30°, is represented by (±), and a case where a color shift is observed at any polar angle is represented by (−). Results are shown in Table 3. Any of the samples prepared in Examples utilizing the optical films 001-008 of the invention did not show a color shift nor a light leakage when observed in an inclined direction. On the other hand, in liquid crystal panels utilizing the films of Comparative Examples 1 and 2, a light leakage was observed in an observation from an inclined direction, and a coloration (slightly reddish) in the leaking light was confirmed. This is because the optical characteristics Re, Rth of TD80UL in Comparative Example 1, particularly a large absolute value of Rth, do not provide a sufficient optical compensation. Also Zeonor ZF-14 in Comparative Example 2 lacks wavelength dependence in contrast to the optical film of the invention, so that the polarized lights of wavelengths of R, G and B, having moved to different points after passing the liquid crystal cell as shown in FIG. 6, cannot be matched by the optical film 5 shown in FIG. 5. Measurements were also made in a white image display state to determine a contrast ratio to the black display state, and it was confirmed that the optical films of the invention had an excellent contrast ratio.

Based on the foregoing, it was confirmed that the optical film of the invention, having desired Re and Rth, was capable of suppressing a color shift and had a high contrast ratio over a wide range, and that the polarizing plate and the liquid crystal display, utilizing the same had excellent performance Example 11

(Mounting on IPS Panel)

In a structure shown in FIG. 2, there were employed the polarizing plate 108 prepared in Example 9 as a polarizing plate 1, the polarizing plate 201 prepared in Example 9 as a polarizing plate 2, and a commercial IPS-mode liquid crystal cell as a liquid crystal cell 3, and these were adhered with a tacky adhesive material to prepare a liquid crystal display (IPS-1). In this operation, the liquid crystal cell was adhered with the side of the optical 008 of the polarizing plate 108. Also the transmission axes of the upper and lower polarizing plates were made perpendicular each other, and the transmission axis of the upper polarizing plate was made parallel to the direction of the molecular longer axis of the liquid crystal cell (namely the phase retarding axis of the optical compensation layer and the direction of the molecular longer axis of the liquid crystal cell being perpendicular each other). The liquid crystal cell, electrodes and substrates may be those used in the prior IPS mode. The liquid crystal cell had a horizontal alignment, and the liquid crystal had a positive dielectric anisotropy. As an example, a liquid crystal cell, obtained by removing polarizing plates and other components from a commercial IPS-mode liquid crystal television (TH-32LX500, manufactured by Matsushita Electric Industrial Co.), may be employed advantageously.

As a Comparative Example, a liquid crystal display (IPS-2) was prepared, in a structure shown in FIG. 2, employing the polarizing plate 201 prepared in Example 9 as polarizing plates 1 and 2, and the commercial IPS-mode liquid crystal cell as a liquid crystal cell 3, and adhering these with a tacky adhesive material.

On thus prepared liquid crystal display IPS-1 and IPS-2, a light leak rate in a black display state was measured in an evaluation method similar to that in Example 10 and in a direction of an azimuthal angle of 45° and a polar angle of 60° from a frontal direction to the apparatus. Results are shown in Table 3. The liquid crystal display IPS-1, employing the polarizing plate 108 utilizing the optical film of the invention, showed little light leakage and no color shift in the observation from the inclined direction, while the liquid crystal display IPS-2, employing the polarizing plate 201 utilizing the optical film of Comparative Example 1, showed a light leakage and a color shift. It was also found that IPS-1 was superior in the viewing angle property of contrast.

Figure 12:
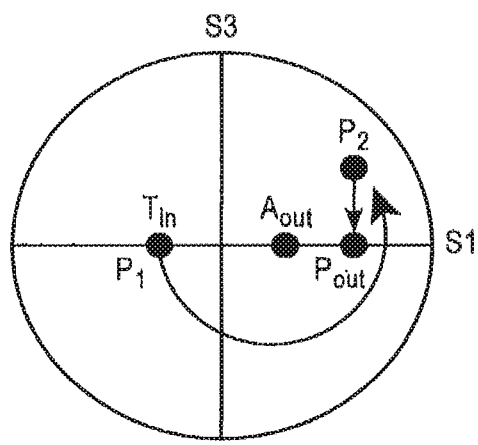
FIG. 12 is a schematic view of a Poincare sphere, used for explaining a change in a polarized state in an incident light in a liquid crystal display of the present invention (IPS-1 in Example 11)
Figure 13:
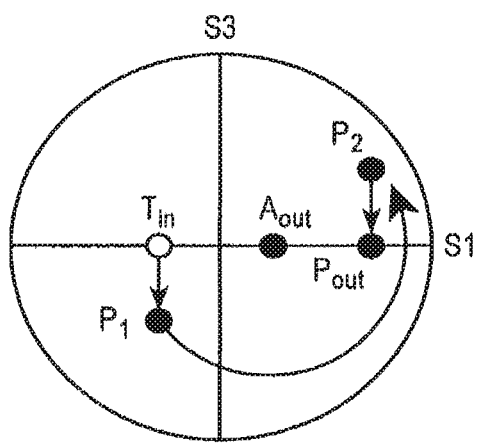
FIG. 13 is a schematic view of a Poincare sphere, used for explaining a change in a polarized state in an incident light in a liquid crystal display of the present invention (IPS-2 in Example 11)

The Example 11 and Comparative Example are represented, on a Poincare sphere, as shown in FIGS. 12 and 13. In FIG. 12, $T_{in}$ indicates an incident light at the side of the polarizing plate 1, and $P_{out}$ indicates an emergent light at the side of the polarizing plate 2. As an ideal point for the emergent light is $A_{out}$, a smaller distance between $P_{out}$ and $A_{out}$ is closer to the ideal state. This distance corresponds to the light leakage in the black display state. In FIG. 13, a movement from $T_{in}$ to $P_1$ is caused by the retardation of the film of Comparative Example, employed in the polarizing plate 201. Also a movement from $P_1$ to $P_2$ is an arc about $A_{out}$, caused by the retardation of the liquid crystal cell. Also a movement from $P_2$ to $P_{out}$ is caused by the retardation of the film of Comparative Example, employed in the polarizing plate 2. On the other hand, in FIG. 12, there is scarce movement from $T_{in}$ to $P_1$, because the optical film 108 of the invention has scarce retardation. Because of this fact, the movement from $P_1$ to $P_2$ has a smaller arc radius, whereby the distance between $P_{out}$ and $A_{out}$ becomes smaller than in the case of FIG. 13. This fact also explains the smaller light leakage in case of employing the optical film of the invention.

Example 12

(Preparation of Optical Compensation Film 5-A)

A solution containing cellulose acylate was prepared in the same manner as in Example 10. 100 parts by weight of the cellulose acylate solution CA-2 and 1.3 parts by weight of the matting agent solution MT-2 were mixed, and the additive solution AD-2 was mixed in such a manner that the retardation expressing agent X was present in 6 parts by weight, with respect to 100 parts by weight of cellulose acetate, thereby obtaining a film forming dope.

The obtained dope was cast with a casting machine, having a band of a width of 2 m and a length of 65 m. A film with a residual solvent amount of 15 wt % was transversally stretched by a tenter with a stretching magnification of 20% under a condition of 130° C., then maintained at a width after stretching for 30 seconds at 50° C. and then unclipped to obtain a cellulose acetate film. After the stretching, it was further dried to a residual solvent amount less than 0.1 wt %, thereby obtaining a cellulose acetate film (T1). The cellulose acylate employed had Tg of 140° C.

The prepared film was passed through induction heated rolls of a temperature of 60° C. to elevate the film surface temperature to 40° C., then coated with an alkali solution of a following composition in an amount of 14 ml/m² by a bar coater, then made to stay for 10 seconds under a steam-type far infrared heater (manufactured by Noritake Company) heated at 110° C., and was further coated with purified water in an amount of 3 ml/m² by a bar coater. In this state, the film had a temperature of 40° C. It was then subjected to a water rinsing by a fountain coater and a water removal by an air-knife, repeated 3 cycles, and was dried by staying in a drying zone of 70° C. for 2 seconds. In this manner the surface of the cellulose acetate film was subjected to a saponification treatment.

| (Composition of alkali solution) | |
|---|---|
| potassium hydroxide | 4.7 parts by weight |
| water | 15.7 parts by weight |
| isopropanol | 64.8 parts by weight |
| propylene glycol | 14.9 parts by weight |
| $C_{16}H_{33}O(CH_2CH_2O)_{10}H$ (surfactant) | 1.0 part by weight |

The obtained cellulose acetate film T1 had a width of 1340 mm and a thickness of 88 μm. An auto birefringence meter KOBRA 21ADH (manufactured by Oji Scientific Instruments Ltd.) was used to measure the optical characteristics of the prepared cellulose acetate film (T1). At 590 nm, the in-plane retardation (Re) was 60 nm, and the retardation in thickness direction (Rth) was 190 nm. In the optically anisotropic layer, an average direction of the phase retarding axis was substantially perpendicular to the longitudinal direction of the film.

On a saponified surface of thus prepared continuous web cellulose acetate film (T1), an alignment film coating liquid of a following composition was continuously coated with a wired bar of #14. An alignment film was formed by drying with a warm air of 60° C. for 60 seconds and with a warm air of 100° C. for 120 seconds.

| (Composition of alignment film coating liquid) | |
|---|---|
| following denatured polyvinyl alcohol | 10 parts by weight |
| water | 371 parts by weight |
| methanol | 119 parts by weight |
| glutaraldehyde | 0.5 parts by weight |

Denatured polyvinyl alcohol

—(CH₂—CH)₈₆.₃—(CH₂—CH)₁₂—(CH₂—CH)₁.₇—
  |                  |                  |                  CH₃
  OH               OCOCH₃          OCONHCH₂CH₂OCOC=CH₂

A coating liquid of a following composition, containing a rod-shaped liquid crystal compound, was continuously coated with a wired bar of #5.0 on the prepared alignment film. The film was conveyed at a speed of 20 m/min. The solvent was removed in a step of continuously heating from the room temperature to 80° C., and a heating was then conducted in a drying zone of 80° C. for 90 seconds thereby aligning the rod-shaped liquid crystal compound. Subsequently, the film was maintained at a temperature of 60° C., and the alignment of the liquid crystal compound was fixed by a UV irradiation to obtain an optically anisotropic layer B1. Subsequently, the prepared film was immersed in a 1.5 mol/L aqueous solution of sodium hydroxide of 55° C. for 2 minutes, and then was immersed in water to sufficiently wash off sodium hydroxide. Then it was immersed in a 5 mmol/L aqueous solution of sulfuric acid of 35° C. for 1 minute, and then was immersed in water to sufficiently wash off the dilute aqueous solution of sulfuric acid. Finally, the sample was sufficiently dried at 120° C. In this manner an optical compensation film 5-A, in which an optically anisotropic layer B1 was laminated on the cellulose acetate film T1, was prepared.

| (Composition of coating liquid containing rod-shaped liquid crystal compound) | |
|---|---|
| following rod-shaped liquid crystal compound (I) | 100 parts by weight |
| photopolymerization initiator | 3 parts by weight |
| (Irgacure 907 manufactured by Ciba-Geigy Ltd.) | |
| sensitizer (Kayacure DETX, manufactured by Nippon Kayaku Co.) | 1 part by weight |
| following fluorinated polymer | 0.4 parts by weight |
| following pyridinium salt | 1 part by weight |
| methyl ethyl ketone | 172 parts by weight |

Rod-shaped liquid crystal compound (I)

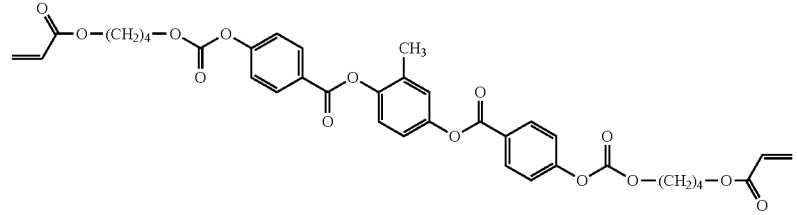

Fluorinated polymer

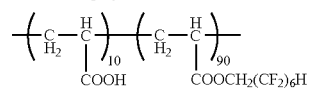

Pyridinium salt

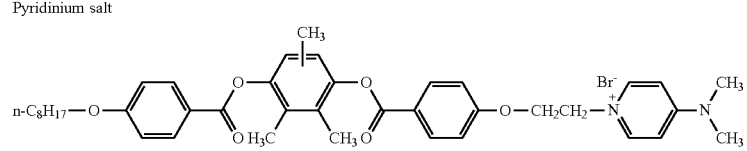

From the prepared optical compensation film 5-A, the optically anisotropic layer B1 alone, containing the rod-shaped liquid crystal compound, was peeled off and subjected to a measurement of optical characteristics with an auto birefringence meter KOBRA 21ADH (manufactured by Oji Scientific Instruments Ltd.). In a measurement at 590 nm, the optically anisotropic layer B1 alone had Re of 0 nm and Rth of −260 nm. It was also confirmed that an optically anisotropic layer, in which the rod-shaped liquid crystal molecules were substantially vertically aligned to the film surface, was formed.

(Preparation of Optical Compensation Film 5-B)

Heat-shrinkable films were adhered, by acrylic tacky adhesive layers, on both surfaces of a polycarbonate film, which was then stretched with a stretching apparatus under heating to cause shrinkage of the heat-shrinkable films, and the heat-shrinkable films were then peeled off. In this manner an optical compensation film 5-B was prepared with Re of 268 nm, Rth of 1 nm and a thickness of 60 μm.

(Preparation of Optical Compensation Film 5-C)

Heat-shrinkable films were adhered, by acrylic tacky adhesive layers, on both surfaces of an Arton film (manufactured by JSR Corp.), which was then stretched with a stretching apparatus under heating to cause shrinkage of the heat-shrinkable films, and the heat-shrinkable films were then peeled off. In this manner an optical compensation film 5-C was prepared with Re of 195 nm, Rth of −20 nm and a thickness of 135 μm.

(Preparation of Optical Compensation Film 5-D)

An Arton film (manufactured by JSR Corp.) was monoaxially stretched to obtain a film A1 with Re of 170 nm, Rth of 85 nm and a thickness of 70 μm.

A surface of the Arton film A1 was subjected to a corona treatment, and an alignment film was formed thereon in the same manner as described above. Then an optically anisotropic layer B2 was formed with a coating liquid containing the aforementioned rod-shaped liquid crystal compound. The optically anisotropic layer B2 alone had Re of 0 nm and Rth of −135 nm. It was also confirmed that an optically anisotropic layer, in which the rod-shaped liquid crystal molecules were substantially vertically aligned to the film surface, was formed. In this manner an optical compensation film 5-D, in which an optically anisotropic layer B2 was laminated on the Arton film A1, was prepared.

(Preparation of Polarizing Plate 5-A)

A polarizing film was prepared in the same manner as in Example 9. A surface of the prepared optical compensation film 5-A, not bearing the optically anisotropic layer B1 (namely a rear surface of the cellulose acetate film T1) was adhered to a surface of this polarizing film, while a cellulose triacetate film (FUJITAC TD80UL, manufactured by Fuji Photo Film Co.) having a saponified surface was adhered to the other surface, with a polyvinyl alcohol-based adhesive, whereby a polarizing plate 5-A was prepared. In this operation, the absorbing axis of the polarizing film and the phase retarding axis of the cellulose acetate film T1 were made perpendicular each other.

(Preparation of Polarizing Plate 5-B)

The optical compensation film 5-B prepared above and the polarizing plate 104 of Example 9 were adhered with an acrylic tacky adhesive. In this operation, the absorbing axis of the polarizing film and the phase retarding axis of the optical compensation film 5-B were made parallel each other. In this manner a polarizing plate 5-B with an optical compensation film was prepared.

(Preparation of Polarizing Plate 5-C)

A polarizing film was prepared in the same manner as in Example 9. On both surfaces of the polarizing film, cellulose triacetate films (FUJITAC T40UZ, manufactured by Fuji Photo Film Co., Re=1 nm, Rth=35 nm, thickness 40 nm) having a saponified surface were adhered with a polyvinyl alcohol-based adhesive, whereby a polarizing plate 301 was prepared.

The optical compensation film 5-C prepared above and the polarizing plate 301 were adhered with an acrylic tacky adhesive. In this operation, the absorbing axis of the polarizing film and the phase retarding axis of the optical compensation film 5-C were made perpendicular each other. In this manner a polarizing plate 5-C with an optical compensation film was prepared.

(Preparation of Polarizing Plate 5-D)

The optical compensation film 5-D prepared above and the polarizing plate 301 were adhered with an acrylic tacky adhesive. In this operation, the optically anisotropic layer B2 contained in the optical compensation film 5-D was positioned at the side of the polarizing plate 301, and the absorbing axis of the polarizing film and the phase retarding axis of the optical compensation film 5-D were made parallel each other. In this manner a polarizing plate 5-D with an optical compensation film was prepared.

(Mounting Evaluation on IPS Panel)

Evaluation of mounting on an IPS panel was conducted in following four classes A to D, according to the type of the optical characteristics of the optical compensation film employed on the liquid crystal display.

(Class A)

In a structure shown in FIG. 5, there were employed the polarizing plate 5-A as an optical compensation film 4 and a polarizing plate 1, an IPS liquid crystal cell as a liquid crystal cell 3, and the polarizing plate 104 prepared in Example 9 as an optical film 5 and a polarizing plate 2, and these were adhered with a tacky adhesive material. The adhesion was made in such a manner that the optical compensation film 5-A of the polarizing plate 5-A was positioned at the side of the liquid crystal cell, and that the optical film 004 of the polarizing plate 104 was positioned at the side of the liquid crystal cell. The absorbing axes of the upper and lower polarizing plates were made perpendicular each other, and the absorbing axis of the lower polarizing plate was made perpendicular to the direction of the molecular longer axis of the liquid crystal cell (namely the phase retarding axis of the optical compensation film 5-A being parallel to the direction of molecular longer axis of the liquid crystal cell). A liquid crystal cell was taken out from a liquid crystal television TH-32LX500 (manufactured by Matsushita Electric Industrial Co.), and was used as the liquid crystal cell 3, after removing the polarizing plates provided at the observing side and at the backlight side, and the optical film. In this liquid crystal cell, the liquid crystal molecules were substantially parallel aligned between the glass substrates in a state without voltage application and in a black display state, with a phase retarding axis parallel to the imaging surface. Also a mounting was executed with a similar layered structure, employing each of the polarizing plates utilizing the optical films of Comparative Example 1, 2, obtained in Example 9, instead of the optical film of the invention.

(Class B)

In a structure shown in FIG. 5, there were employed the polarizing plate 5-B as an optical compensation film 4 and a polarizing plate 1, the IPS liquid crystal cell as a liquid crystal cell 3, and the polarizing plate 104 prepared in Example 9 as an optical film 5 and a polarizing plate 2, and these were adhered with a tacky adhesive material. The adhesion was made in such a manner that the optical compensation film 5-B of the polarizing plate 5-B was positioned at the side of the liquid crystal cell, and that the optical film 004 of the polarizing plate 104 was positioned at the side of the liquid crystal cell. The absorbing axes of the upper and lower polarizing plates were made perpendicular each other, and the absorbing axis of the lower polarizing plate was made perpendicular to the direction of the molecular longer axis of the liquid crystal cell (namely the phase retarding axis of the optical compensation film 5-B being perpendicular to the direction of molecular longer axis of the liquid crystal cell). The liquid crystal cell employed was a parallel alignment cell, same as in the class A. Also a mounting was executed with a similar layered structure, employing each of polarizing plates utilizing the optical films of Comparative Example 1, 2, obtained in Example 9, instead of the optical film of the invention.

(Class C)

In a structure shown in FIG. 5, there were employed the polarizing plate 5-C as an optical compensation film 4 and a polarizing plate 1, the IPS liquid crystal cell as a liquid crystal cell 3, and the polarizing plate 104 prepared in Example 9 as an optical film 5 and a polarizing plate 2, and these were adhered with a tacky adhesive material. The adhesion was made in such a manner that the optical compensation film 5-C of the polarizing plate 5-C was positioned at the side of the liquid crystal cell, and that the optical film 004 of the polarizing plate 104 was positioned at the side of the liquid crystal cell. The absorbing axes of the upper and lower polarizing plates were made perpendicular each other, and the absorbing axis of the lower polarizing plate was made perpendicular to the direction of the molecular longer axis of the liquid crystal cell (namely the phase retarding axis of the optical compensation film 5-C being parallel to the direction of molecular longer axis of the liquid crystal cell). The liquid crystal cell employed was a parallel alignment cell, same as in the class A. Also a mounting was executed with a similar layered structure, employing each of the polarizing plates utilizing the optical films of Comparative Example 1, 2, obtained in Example 9, instead of the optical film of the invention.

(Class D)

In a structure shown in FIG. 5, there were employed the polarizing plate 5-D as an optical compensation film 4 and a polarizing plate 1, the IPS liquid crystal cell as a liquid crystal cell 3, and the polarizing plate 104 prepared in Example 9 as an optical film 5 and a polarizing plate 2, and these were adhered with a tacky adhesive material. The adhesion was made in such a manner that the optical compensation film 5-D of the polarizing plate 5-D was positioned at the side of the liquid crystal cell, and that the optical film 004 of the polarizing plate 104 was positioned at the side of the liquid crystal cell. The absorbing axes of the upper and lower polarizing plates were made perpendicular each other, and the absorbing axis of the lower polarizing plate was made perpendicular to the direction of the molecular longer axis of the liquid crystal cell (namely the phase retarding axis of the optical compensation film 5-D being perpendicular to the direction of molecular longer axis of the liquid crystal cell). The liquid crystal cell employed was a parallel alignment cell, same as in the class A. Also a mounting was executed with a similar layered structure, employing each of the polarizing plates utilizing the optical films of Comparative Example 1, 2, obtained in Example 9, instead of the optical film of the invention.

In the liquid crystal display thus prepared, a light leak rate and a color shift in a black display state were evaluated in a direction with an azimuthal angle of 45° and a polar angle of 60° from the frontal direction to the apparatus. Results are shown in Table 3. The liquid crystal displays employing the polarizing plate 104 utilizing the optical films of the invention showed no color shift and little light leakage when observed from an inclined direction, while the liquid crystal displays employing the polarizing plates utilizing Comparative Examples 1, 2 showed a large color shift and a large light leakage.

Example 13

(Evaluation of Mounting on OCB Panel)

The optical film 001 of the invention obtained in Example 1 was evaluated utilizing a liquid crystal display described in Example 1 of JP-A-10-48420, an optically anisotropic layer containing discotic liquid crystal molecules described in Example 1 of JP-A-9-26572, an alignment film formed by coating polyvinyl alcohol, and an OCB-mode liquid crystal display described in FIGS. 10 to 15 of JP-A-2000-154261, and provided a satisfactory performance in the viewing angle-dependent contrast, and a satisfactory result was obtained in the color shift in an evaluation as in Example 10. The optical films of Comparative Examples 1, 2 were inferior, in a similar evaluation, to those of the invention. These results are shown in Table 3.

As explained in the foregoing, the optical film of the invention, and the optical compensation film and the polarizing plate utilizing the same are identified as an optical film which is capable of suppressing a color shift and providing a high contrast ratio over a wide viewing angle.

It will be apparent to those skilled in the art that various modifications and variations can be made to the described embodiments of the invention without departing from the spirit or scope of the invention. Thus, it is intended that the invention cover all modifications and variations of this invention consistent with the scope of the appended claims and their equivalents.

The present application claims foreign priority based on Japanese Patent Application Nos. JP2005-262304 and JP2006-63026, filed Sep. 9, 2005 and Mar. 8, 2006, respectively, the contents of which are incorporated herein by reference.

What is claimed is:

1. An optical film having retardations satisfying relations (1) to (3):
(1) 1 nm≤Re(550)≤5 nm;
(2) −15 nm≤Rth(550)≤15 nm; and
(3) 0.5 nm<|I|+|II|+|III|+|IV|≤9.0 nm,
with definitions:
I=Re(450)−Re(550);
II=Re(650)−Re(550);
III=Rth(450)−Rth(550); and
IV=Rth(650)−Rth(550),
wherein Re(450), Re(550) and Re(650) are in-plane retardations of wavelength of 450, 550 and 650 nm, respectively; and Rth(450), Rth(550) and Rth(650) are retardations in a thickness direction of the optical film, which are of wavelength of 450, 550 and 650 nm, respectively,
wherein I, II, III and IV satisfy relations (4-D) to (7-D):
(4-D) 0<I≤50;
(5-D) −50≤II<0;
(6-D) −50≤III≤0; and
(7-D) 0≤IV≤50, wherein a material for forming the optical film comprises an acrylic polymer, a styrenic polymer, or cellulose acylate.

2. The optical film according to claim 1, wherein Re(450) is a positive value.

3. The optical film according to claim 2, wherein $0 \leq Rth(550) \leq 15$ nm.

4. The optical film according to claim 3, wherein the material for forming the optical film is a cellulose acylate.

5. The optical film according to claim 4, wherein the cellulose acylate has an acyl substituent, the acyl substituent is substantially only an acetyl group, and a total substitution degree of the acyl substituent is from 2.56 to 3.00.

6. A polarizing plate comprising a polarizer and the optical film according to claim 5.

7. A liquid crystal display comprising:
a substrate;
the polarizing plate according to claim 6; and
a liquid crystal cell containing liquid crystal molecules aligned to be substantially parallel to the substrate in a black display state of the liquid crystal display.

8. The optical film according to claim 2, wherein $-15$ nm $\leq Rth(550) \leq 0$.

9. The optical film according to claim 8, wherein the material for forming the optical film is an acrylic polymer.

10. A polarizing plate comprising a polarizer and the optical film according to claim 9.

11. A liquid crystal display comprising:
a substrate;
the polarizing plate according to claim 10; and
a liquid crystal cell containing liquid crystal molecules aligned to be substantially parallel to the substrate in a black display state of the liquid crystal display.

12. The optical film according to claim 2, wherein Re(650) is a negative value.

13. The optical film according to claim 1, wherein the optical film is stretched.

14. The optical film according to claim 1, wherein the optical film has a thickness of from 20 μm to 200 μm.

* * * * *